United States Patent
Lee

(10) Patent No.: US 10,523,514 B2
(45) Date of Patent: *Dec. 31, 2019

(54) SECURE CLOUD FABRIC TO CONNECT SUBNETS IN DIFFERENT NETWORK DOMAINS

(71) Applicant: ZENTERA SYSTEMS, INC., San Jose, CA (US)

(72) Inventor: Jaushin Lee, Saratoga, CA (US)

(73) Assignee: Zentera Systems, Inc., San Jose, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/641,089

(22) Filed: Jul. 3, 2017

(65) Prior Publication Data

US 2017/0302535 A1 Oct. 19, 2017

Related U.S. Application Data

(63) Continuation of application No. 14/339,259, filed on Jul. 23, 2014, now Pat. No. 9,699,034, which is a continuation-in-part of application No. 14/187,091, filed on Feb. 21, 2014, now Pat. No. 9,525,564.

(60) Provisional application No. 61/770,320, filed on Feb. 28, 2013, provisional application No. 61/769,691, filed on Feb. 26, 2013.

(51) Int. Cl.
*H04L 12/24* (2006.01)
*H04L 29/08* (2006.01)
*H04L 29/06* (2006.01)

(52) U.S. Cl.
CPC .............. *H04L 41/12* (2013.01); *H04L 41/26* (2013.01); *H04L 63/0272* (2013.01); *H04L 67/10* (2013.01); *H04L 67/2866* (2013.01)

(58) Field of Classification Search
CPC ......... H04L 41/12; H04L 41/26; H04L 67/10; H04L 67/2866; H04L 63/0272
USPC ......................................................... 709/223
See application file for complete search history.

(56) References Cited

U.S. PATENT DOCUMENTS

| 5,386,417 A | 1/1995 | Daugherty |
| 6,717,956 B1 | 4/2004 | Fan |
| 6,914,905 B1 * | 7/2005 | Yip ..................... H04L 12/4641 370/395.53 |

(Continued)

FOREIGN PATENT DOCUMENTS

| EP | 1443701 A1 | 8/2004 |
| WO | WO 2012130523 | 10/2012 |

OTHER PUBLICATIONS

Cisco, Understanding Issues Related to inter-VLAN Bridging, Sep. 9, 2005, www.cisco.com. 11072.

*Primary Examiner* — Zi Ye
(74) *Attorney, Agent, or Firm* — Staniford Tomita LLP

(57) ABSTRACT

A secure virtual network platform connects two or more subnets in different or separate network domains. The secure virtual network can use the under layer physical networks in various domains as an IP forwarding fabric without changing any existing firewalls, security settings, or network topology. A first type of connection across the virtual network involves connecting server groups. A second type of connection across the virtual network involves connecting a server group to a physical network. A third type of connection across the virtual network involves connecting a physical network to another physical network.

6 Claims, 32 Drawing Sheets

(56) References Cited

U.S. PATENT DOCUMENTS

| | | |
|---|---|---|
| 7,013,345 B1 | 3/2006 | Brown |
| 7,043,757 B2 | 5/2006 | Hoefelmeyer |
| 7,966,388 B1 | 6/2011 | Pugaczewski |
| 8,250,642 B2 | 8/2012 | Bartholomy et al. |
| 8,640,218 B2 | 1/2014 | Bartholomy et al. |
| 9,224,003 B2 | 12/2015 | Andersen |
| 9,240,962 B2 | 1/2016 | Jung |
| 9,253,166 B2 | 2/2016 | Gauda |
| 2002/0073210 A1 | 6/2002 | Low |
| 2002/0188862 A1 | 12/2002 | Trethewey |
| 2003/0016664 A1 | 1/2003 | MeLampy |
| 2003/0016678 A1* | 1/2003 | Maeno .......... H04L 45/10 370/400 |
| 2003/0051169 A1 | 3/2003 | Sprigg |
| 2004/0024903 A1* | 2/2004 | Costatino ....... H04L 45/00 709/238 |
| 2004/0047322 A1* | 3/2004 | O'Neill ......... H04L 12/4633 370/338 |
| 2004/0059827 A1 | 3/2004 | Chiang |
| 2004/0181694 A1 | 9/2004 | Cox |
| 2005/0257264 A1 | 11/2005 | Stolfo et al. |
| 2006/0031472 A1 | 2/2006 | Rajavelu et al. |
| 2007/0019622 A1 | 1/2007 | Alt |
| 2008/0060055 A1 | 3/2008 | Lau |
| 2008/0165957 A1 | 7/2008 | Kandasamy et al. |
| 2008/0168523 A1 | 7/2008 | Ansari |
| 2008/0276313 A1 | 11/2008 | Kummu et al. |
| 2008/0295114 A1 | 11/2008 | Argade |
| 2009/0006538 A1 | 1/2009 | Risney, Jr. |
| 2009/0016358 A1* | 1/2009 | Lee ............... H04L 12/2854 370/395.53 |
| 2009/0037382 A1 | 2/2009 | Ansari |
| 2009/0264095 A1 | 10/2009 | Khetawat |
| 2010/0131960 A1 | 5/2010 | Suganthi |
| 2010/0325419 A1 | 12/2010 | Kanekar |
| 2010/0325420 A1 | 12/2010 | Kanekar |
| 2010/0325429 A1 | 12/2010 | Saha |
| 2011/0090911 A1 | 4/2011 | Hao |
| 2011/0162062 A1 | 6/2011 | Kumar |
| 2011/0191442 A1 | 8/2011 | Ovsiannikov |
| 2011/0202609 A1 | 8/2011 | Chaturved |
| 2012/0005724 A1 | 1/2012 | Lee |
| 2012/0124566 A1 | 5/2012 | Federighi et al. |
| 2012/0207160 A1* | 8/2012 | Yadav .......... H04L 12/1886 370/390 |
| 2012/0284770 A1 | 11/2012 | Bartholomy |
| 2012/0290732 A1 | 11/2012 | Suganthi |
| 2012/0307682 A1* | 12/2012 | Johnsen ......... H04L 9/3234 370/254 |
| 2013/0091198 A1 | 4/2013 | Yu |
| 2013/0152156 A1 | 6/2013 | Allison |
| 2013/0182604 A1 | 7/2013 | Moreno |
| 2013/0188514 A1 | 7/2013 | Jain |
| 2013/0198304 A1 | 8/2013 | Jung |
| 2013/0227286 A1 | 8/2013 | Brisson |
| 2014/0068698 A1 | 3/2014 | Burchfield et al. |
| 2014/0068701 A1 | 3/2014 | Burchfield et al. |
| 2014/0122865 A1 | 5/2014 | Ovsiannikov |
| 2014/0136635 A1 | 5/2014 | Jeng |
| 2014/0304409 A1 | 10/2014 | Kamath |
| 2014/0337408 A1 | 11/2014 | Workman |
| 2015/0106489 A1 | 4/2015 | Duggirala |
| 2015/0113279 A1 | 4/2015 | Andersen |
| 2016/0373304 A1 | 12/2016 | Sharma |
| 2017/0012949 A1 | 1/2017 | Boren |

* cited by examiner

SECURE CLOUD FABRIC TO CONNECT SUBNETS IN DIFFERENT NETWORK DOMAINS

CROSS-REFERENCE TO RELATED APPLICATIONS

This patent application is a continuation of U.S. patent application Ser. No. 14/339,259, filed Jul. 23, 2014, which is a continuation-in-part of U.S. patent application Ser. No. 14/187,091, filed Feb. 21, 2014, now U.S. Pat. No. 9,525,564, issued Dec. 20, 2016, which claims priority to U.S. provisional patent application 61/769,691, filed Feb. 26, 2013, and also claims the benefit of U.S. provisional patent application 61/770,320, filed Feb. 28, 2013, which are all incorporated by reference along with all other references cited in this application.

BACKGROUND

The present invention relates to the field of information technology, including, more particularly, to systems and techniques for networking.

Enterprise cloud computing is becoming inevitable. The advancement of mobile devices such as smart phones and touch pads has further pushed the deployment of cloud computing infrastructure to support various business applications online. According to market research analysts, by end of 2016, more than 15 percent of worldwide enterprise IT spending will be on public or hybrid cloud computing environments.

While much of the world is embracing cloud computing, cloud deployments still require intensive customization efforts and remain challenging for enterprises to establish a hybrid infrastructure, on demand, connecting applications (e.g., client-server software) and computing resources in public and private computing environments without compromising enterprise security and compliance.

The conventional IT network and infrastructure security technology does not directly apply to the hybrid environments. To brute force a connection, enterprise IT is facing a tremendous amount of operating risks and efforts to accomplish their mission. A next-generation platform is needed to address the needs.

The world's top-tier cloud service providers have extensive experience in deploying a flat cloud computing infrastructure inside a single datacenter. To facilitate ease of management and on-demand services, these implementations feature a unified network and infrastructure security supporting the cloud. This approach significantly simplifies the management of applications running in the cloud by eliminating the complexity for network and infrastructure security. While this approach may be appropriate within the environment of a single datacenter, it is difficult to apply in a hybrid cloud environment, where the underlying network and infrastructure security are distributed, segregated, and belong to multiple authorities.

More particularly, in modern enterprises, the network and security infrastructure are specifically designed to implement corporate security and compliance governance. The critical business data and operations are typically deployed in the inner layer of a network domain behind layers of firewalls. Such a secure network and firewall system block the external malicious access intents or at least make it extremely challenging to penetrate. However, on the other hand, if there is any new business initiative that requires an access connection from an external location to reach the inner most layers, it can be extremely difficult or could require a tremendous amount of corporate IT efforts to re-provision the environment and to allow the traffic to travel through.

Today's high-tech industry (e.g., semiconductor and EDA (Electronic Design Automation)) is consolidating, converging, and moving toward a service-oriented industry. The technology products being developed by the enterprises in this industry are becoming extremely sophisticated, and the enterprises frequently require some form of collaboration from their eco-system partners and vendors. These enterprises typically place their valuable IP (Intellectual Property) and development resources behind layers of firewalls for protection. This security infrastructure, however, makes the legitimate access extremely difficult. As a result, the business suffers with poor productivity and lengthy delays in resolving technical and business oriented issues.

Thus, there is a need to provide systems and techniques to facilitate secure communications between two or more network domains.

BRIEF SUMMARY OF THE INVENTION

A secure virtual network platform connects two or more subnets in different, remote, or separate network domains. The secure virtual network can use the under layer physical networks in various domains as an IP forwarding fabric without changing any existing firewalls, security settings, or network topology. A first type of connection involves connecting server groups, a second type of connection involves connecting a server group to a physical network, and a third type of connection involves connecting a physical network to another physical network.

In a specific embodiment, a method for using a wide area network (WAN) virtual network platform to connect first and second network domains that are physically segregated from each other by firewalls and managed by different network administration parties includes prompting a user to select a first server group within the first network domain, the first server group being associated with a first virtual subnet, prompting the user to select a second server group within the second network domain, remote from the first network domain, mapping the first virtual subnet of the first server group to a first virtual forwarding subnet representing the second server group, and forwarding a first communication from the first network domain to the second network domain, where a forwarding path of the first communication is from the first server group to the first virtual forwarding subnet, through the WAN virtual network platform, and to the second server group.

In another specific embodiment, a method includes identifying a first virtual subnet associated with a first server group in a first network domain, providing a first virtual gateway coupled to a first physical subnet in a second network domain, remote from the first network domain, mapping the first virtual subnet to a first virtual forwarding subnet, and forwarding a first communication from the first network domain to the second network domain, where a forwarding path of the first communication is from the first virtual subnet to the first virtual forwarding subnet to a first physical forwarding subnet associated with the first virtual gateway to the first physical subnet in the second network domain.

In another specific embodiment, a method includes providing a first virtual gateway coupled to a first physical subnet in a first network domain, providing a second virtual gateway coupled to a second physical subnet in a second network domain, prompting a user to specify a first physical forwarding subnet to be associated with the first virtual gateway, the first physical forwarding subnet being routable to the first physical subnet, receiving the specified first physical forwarding subnet, storing at the first virtual gateway first information mapping the first physical forwarding subnet to the second virtual gateway, receiving at the first physical forwarding subnet a first communication from the first physical resource subnet, and forwarding, using the first information, the first communication to the second virtual gateway for the second virtual gateway to forward to the second physical subnet.

Other objects, features, and advantages of the present invention will become apparent upon consideration of the following detailed description and the accompanying drawings, in which like reference designations represent like features throughout the figures.

DETAILED DESCRIPTION

Figure 1:
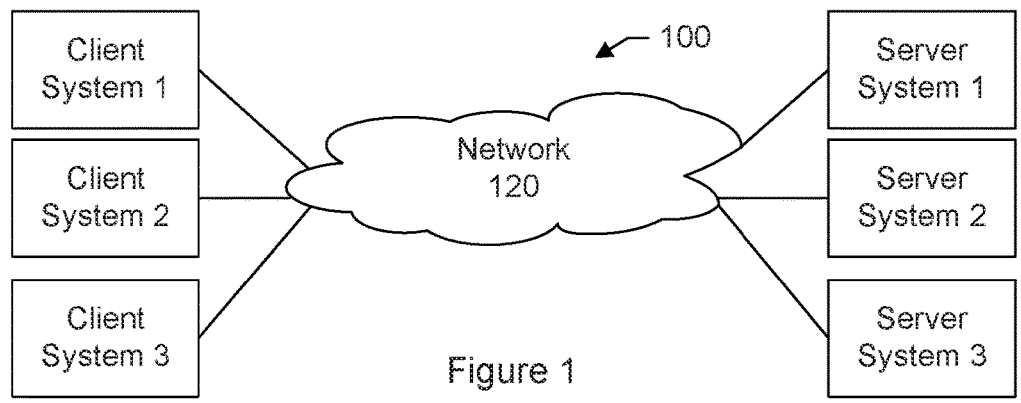
FIG. 1 shows a computer network system within which the present system may be embodied.

FIG. 1 shows a computer network system 100 within which the present system may be embodied. There may be any number of servers and clients in the system. For example, there may be hundreds, thousands, or even millions of servers and clients. In this system, there are three servers, server 1, server 2, and server 3, and there are three clients, client 1, client 2, and client 3. The client and server can represent application software. The hardware machine can be but is not limited to a server host machine or any type of client hardware machines such as desktop PC, laptop, and mobile devices. The servers communicate with the clients by exchanging packets over a network 120. The computer network system is representative of many different environments including a LAN (local area network) system, a wide area network (WAN) system, an Internet system, Ethernet, computer network, intranet, cellular phone network, or other.

Distributed computer network 100 in FIG. 1 is merely illustrative of an embodiment and is not intended to limit the scope of the invention as recited in the claims. One of ordinary skill in the art would recognize other variations, modifications, and alternatives. Client systems typically request information from server systems which provide the information. For this reason, server systems typically have more computing and storage capacity than client systems. However, a particular computer system may act as both a client or a server depending on whether the computer system is requesting or providing information.

Additionally, although some aspects of the system are described using a client-server environment or client-server application program, it should be apparent that the system may also be embodied in any environment where one system communicates with another system over a network. For example, in a hybrid cloud environment, there can be servers implementing the "client software" and other servers implementing the "server software." Those servers communicate with each other across cloud domains. The communication can be facilitated via a virtual network platform as discussed in this patent application.

As another example, there can be an access application where a "client machine" for a user is accessing servers in the "cloud." In this case, using GDB (GNU Debugger) as an example, the client software is then running on the client user machine. This client GDB software may to connect to the server GDB software that is running on the "server" in the cloud. The connection can be facilitated via a virtual network platform as discussed in this patent application.

A network generally includes: (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 7 or Windows Server 2012, Linux Red Hat 5, Ubuntu 13, Novell NetWare, AppleShare, or Artisoft LANtastic.

A network may include a hub, switch, or router. Hubs interconnect groups of users. Hubs can forward data packets—including e-mail, word-processing documents, spreadsheets, graphics, print requests—they receive over one port from one workstation to all their remaining ports.

Switches can offer more dedicated bandwidth to users or groups of servers. A switch can forward a data packet only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

Figure 2:
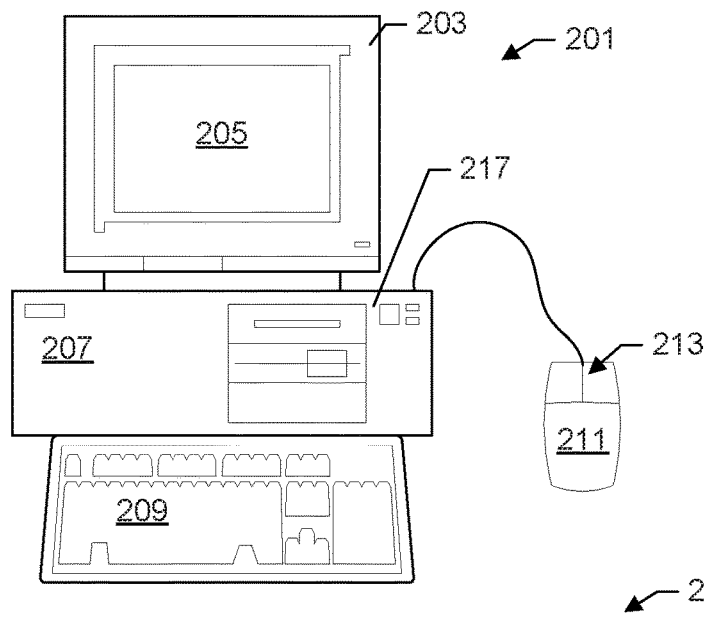
FIG. 2 shows a more detailed diagram of an example of a client or computer which may be used in an implementation of the system.

FIG. 2 shows an example of a client or server system that may be used to execute software of the present system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
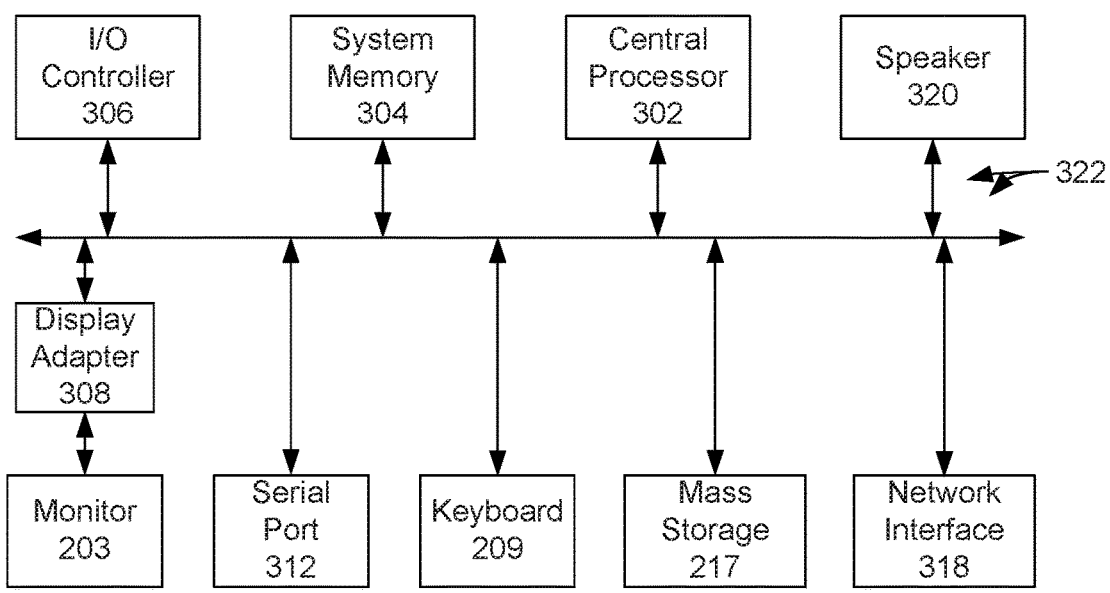
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows Server 2008, 2012, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (e.g., URLs) to identify resources on the Web and hypertext transfer protocol (HTTP) in transferring files on the Web.

Figure 4:
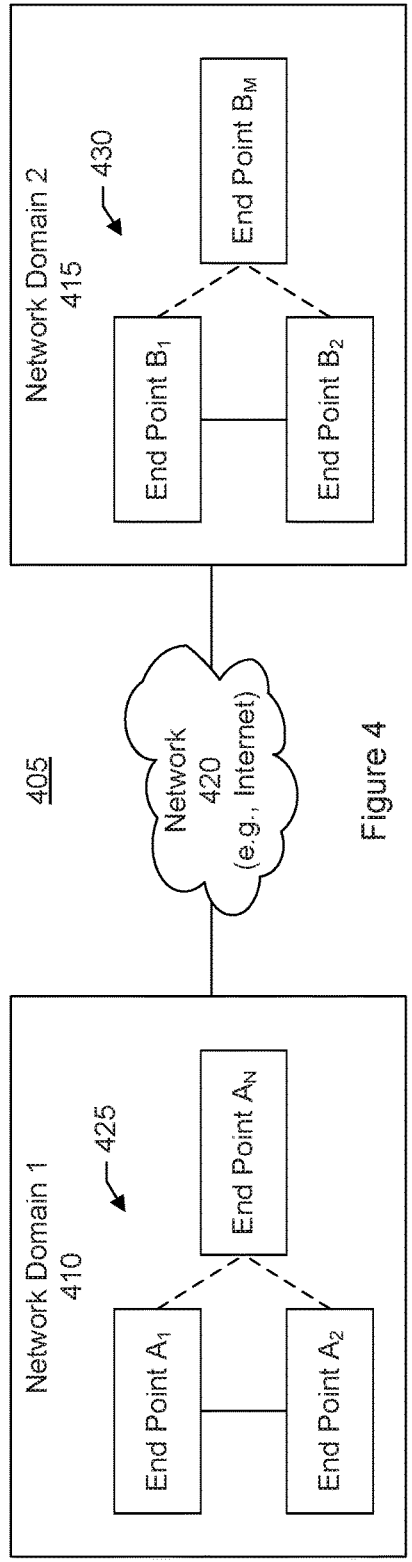
FIG. 4 shows a block diagram of end points within two network domains.

FIG. 4 shows a simplified block diagram of a distributed computing environment 405 in which a virtual network platform may be implemented. This environment includes a first network domain 410, a second network domain 415, and a network 420 that connects the first and second network domain. The first network domain includes a first set of end points 425 (e.g., end point $A_1$, end point $A_2$, ... end point $A_n$). The second network domain includes a second set of end points 430 (e.g., end point $B_1$, end point $B_2$, ... end point $B_m$). The end points in a network domain may be interconnected themselves such as through a network or local network.

The network may be as shown in FIG. 1. An end point may be referred to as a node or computing node. In a specific embodiment, the first and second network domains are separate and interconnected via the Internet. One of the first or second network domains may include a private cloud infrastructure. Another of the first or second network domains may include a public cloud infrastructure. In this specific embodiment, the architecture shown in the example of FIG. 4 may be referred to as a hybrid cloud.

Security in a hybrid cloud environment is a concern because the underlying network and infrastructure are distributed, segregated, and owned by multiple authorities. Coordination among all parties for security re-provisioning can be overwhelming and prohibited, even if the change request is driven by a validated and approved business case. In a specific implementation, systems and techniques are provided for a secure virtual network platform that connects client and server applications deployed in two (or more) separate network domains interconnected via the Internet.

A network domain may include any number of end points. For example, there can be hundreds, thousands, or even millions of end points. An end point may include a physical device, a virtual device, or both. An end point can include a physical server (e.g., blade servers or rack-mounted servers), a virtual machine (VM), a virtual network edge gateway, or other physical or virtual appliance.

More particularly, an end point may include a general purpose computing system having one or more components such as that shown in FIGS. 2-3. For example, an end point may include a user interface, one or more processors, a network interface, mass storage, and memory. Alternatively, some embodiments may not include the user interface or the user interface may not be connected directly to the hardware platform. For example, user interaction may be automated or occur remotely in connection with data center administration. A first end point can include a client. A second end point, remote from the first end point, can include a server. The server may host application services for the client.

In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on the "host" hardware platform.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an internet protocol (IP) address.

An end point including a virtual network edge gateway provides a network entry point to services, applications, or both that are behind the gateway. For example, an edge device can connect an internal local area network to the virtual network.

A network domain can be an enterprise local area network (LAN), server farm environment, or an Infrastructure as a Service (IaaS) cloud datacenter, which can be protected by conventional peripheral firewalls. The two network domains can be interconnected via Internet or any TCP/IP network.

In an embodiment, the first network domain is different, remote, or separate from the second network domain. For example, the domains may be in different physical or geographic locations, have different capabilities, have different computer architectures, have different network environments, have different physical devices, networking infrastructure may be owned, operated, and administered by different entities, companies, enterprises, authorities, parties, or organizations, have different administrative policies, have different storage policies, have different security policies, or combinations of these.

Both domains may be owned by the same enterprise, but may be in different geographic locations. For example, one domain may be in San Francisco. Another domain may be in London. As another example, one domain or networking infrastructure may be privately owned such as by an enterprise. Another domain or networking infrastructure may be owned by a different or third-party that leases computing resources to the enterprise. A domain may be or be a part of a cloud computing or multi-tenant data center. There can be multiple private domains. There can be multiple public domains.

In a specific embodiment, the first and second domains are connected by the Internet. The Internet is a global system of interconnected computer networks that use the standard Internet protocol suite (TCP/IP) to serve users worldwide. It is a network of networks that includes millions of private, public, academic, business, and government networks, of local to global scope, that are linked by a broad array of electronic, wireless, and optical networking technologies.

In a specific embodiment, one of the first or second domains is a private cloud. Another of the first or second domains is a public cloud. A private cloud refers to a computing infrastructure (e.g., hardware, software, or both) that may be operated, controlled, or owned by a single enterprise. The computing infrastructure is internal to the enterprise. A public cloud refers to a computing infrastructure in which services are rendered over a network that is open for public use (e.g., Internet). The public cloud can offer on-demand network access to a shared pool of configurable computing resources (e.g., networks, servers, storage, applications, and services).

Some characteristics of a public cloud include on-demand self-service (e.g., consumer can unilaterally provision computing capabilities such as server time and network storage), resource pooling (e.g., the provider's computing resources are pooled to serve multiple consumers using a multi-tenant model, with different physical and virtual resources such as storage, processing, memory, and network bandwidth dynamically assigned and reassigned according to consumer demand), elasticity (e.g., capabilities can be elastically provisioned and released to scale outward and inward based on demand), and metering (e.g., resource usage can be monitored and reported for billing).

Some examples of cloud computing service providers include Amazon Web Services (AWS), Microsoft Azure, HP Public Cloud, IBM SmartCloud, and many others. The number of computing end points in a private network domain for an enterprise may be different from the number of computing end points in a public cloud network domain. For example, the enterprise may include several thousand end points. The public cloud may include hundreds of thousands or millions of end points.

In this specific embodiment, the computing architecture may be referred to as a hybrid cloud. A hybrid cloud is a composition of two or more clouds such as a private cloud and a public cloud. A hybrid cloud allows an enterprise to extend its computing capabilities without having to make large capital investments in assets such as physical space and computing hardware. A hybrid cloud can also be used by an enterprise to accommodate spikes in demands for computing resources. An organization can pay for computing resources when they are needed. The organization may have a rental, lease, or other contractual agreement with a cloud services provider for the computing resources. An organization may utilize the services of multiple cloud service providers.

As discussed above, however, security and the network connection in a hybrid cloud environment is a concern because the underlying network and infrastructure are distributed, segregated, and owned by multiple authorities. Each authority may have different approaches and practices regarding security, privacy, administration, and compliance.

Figure 5:
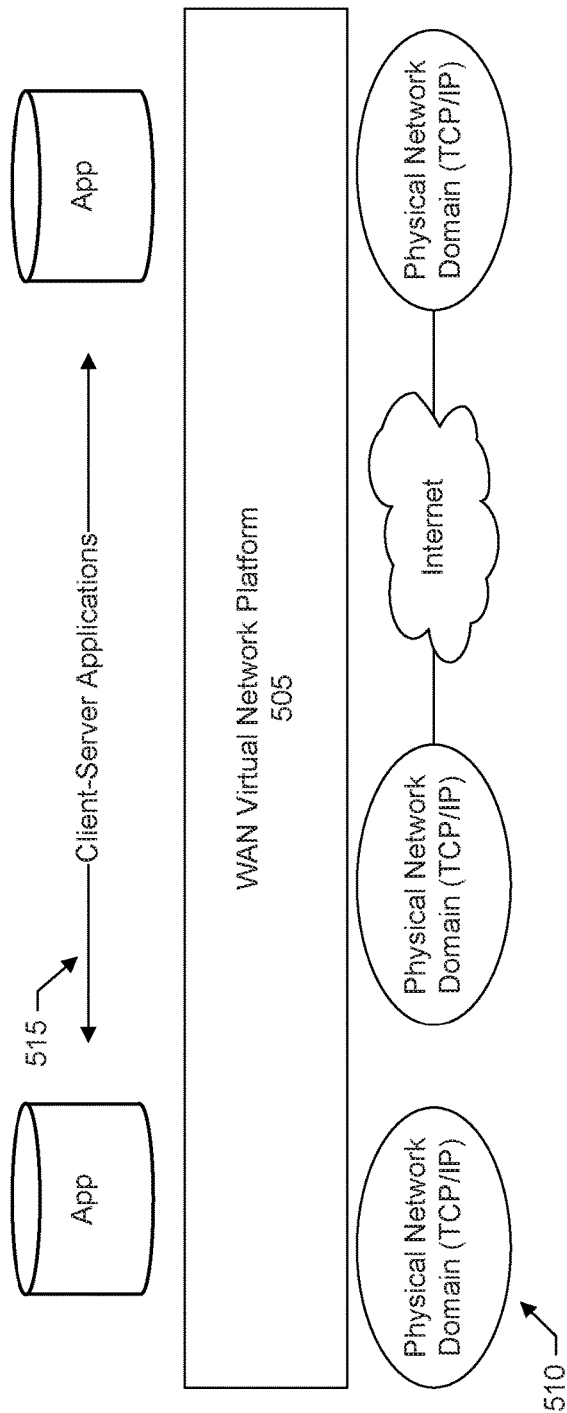
FIG. 5 shows a block diagram of a secure virtual network platform connecting the two or more network domains.

FIG. 5 shows a simplified block diagram of a secure virtual network platform or system 505. The virtual network platform may be referred to as a software-defined network (SDN), however, this SDN is not limited to an enterprise LAN (Local Area Network) or a local network in a cloud datacenter only. It is a WAN (Wide Area Network) based virtual network platform that is across multiple network domains. In a specific embodiment, the virtual network platform connects different physical network domains 510 in a hybrid cloud environment. The virtual network platform may be referred to as a wide area virtual network because it goes across or connects different network domains. As shown in the example of FIG. 5, the virtual network platform is layered on top of the physical network domains. The physical network domains may be running TCP/IP (Transmission Control Protocol/Internet Protocol). TCP/IP is one of several protocols that operating systems can use to process application requests for transmission over a network. The physical network domains may be controlled by different groups or IT departments.

Applications, such as client-server applications 515, are layered on top of the virtual network platform. In other words, the virtual network platform is positioned between the applications and the network domains. The applications can use the services provided by the virtual network platform to send and receive information across different domains. The virtual network platform helps to isolate the applications from the complexity of transmitting and receiving data across the different network domains.

For example, a client-server application may include a client application component and a server application component. The client application component may be executing on a first end point in a first network domain. The server application component may be executing on a second end point in a second network domain. The second network domain may be separate, remote, or different from the first network domain. In a specific implementation, the client application component can be a web browser. A client web browser requests an action or service from the provider of service (e.g., server or web server). In another specific implementation, the client application component executes independently of the web browser, such as an email client that connects to an email server.

When appropriate, the virtual network platform can be used to securely communicate or exchange information (e.g., data packets) between the network domains. For example, depending on the source of a particular data packet, destination of a particular data packet, security policy, application program, or combinations of these, it may or may not be appropriate to use the virtual network for the transport.

Figure 6:
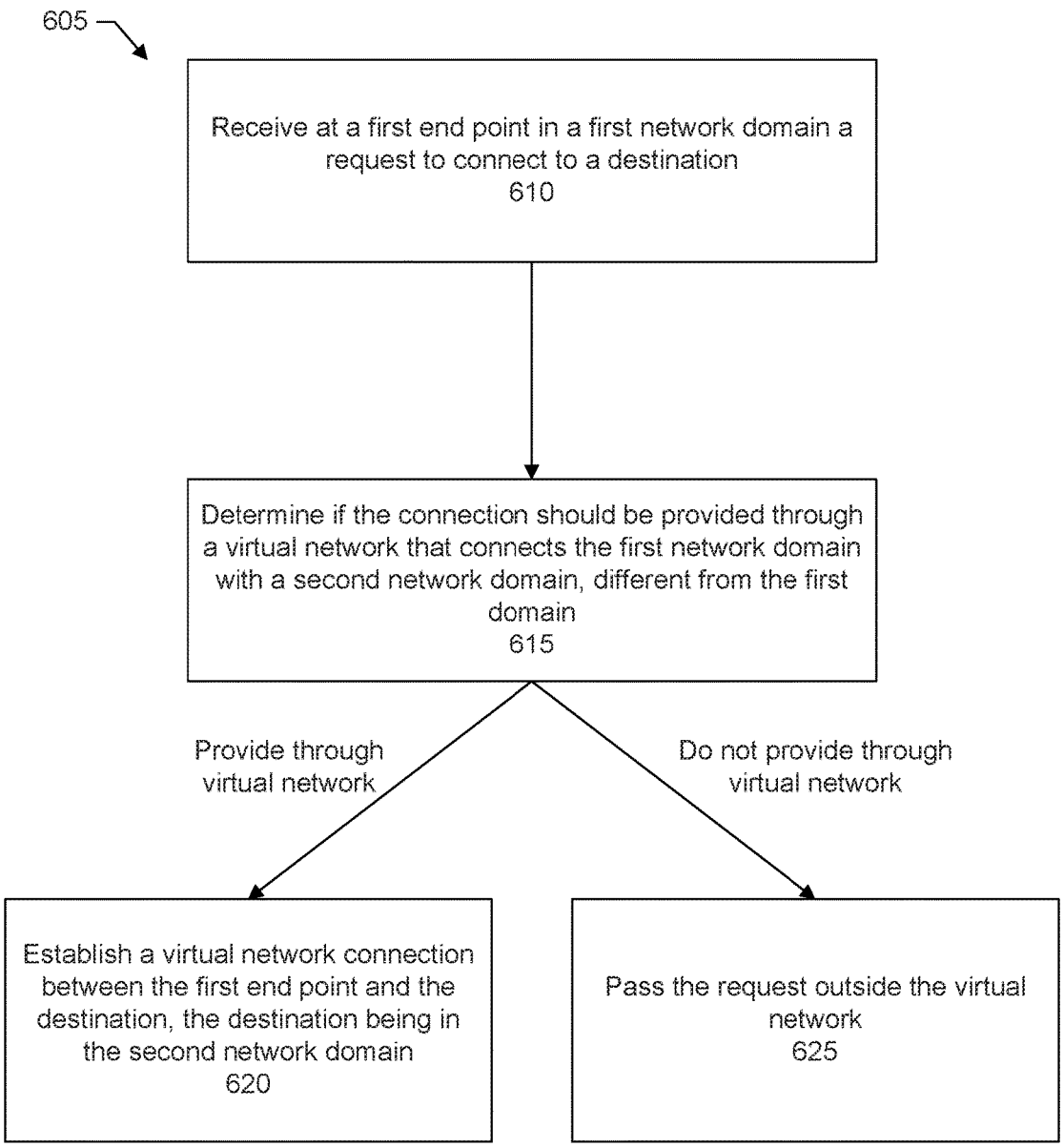
FIG. 6 shows an overall flow diagram for the virtual network platform.

FIG. 6 shows an example of an overall flow 605 for a specific implementation of the virtual network platform. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, a data packet (e.g., request) is received at a first end point in a first network domain to be sent to a destination. The data packet can indicate a request to connect to the destination. In a specific implementation, the request is from a client application component of an application program to connect with a server component of the application program.

It should be appreciated, however, that the request or connection can involve any type of source in one domain connecting to any type of destination in another domain and vice-versa. For example, in a hybrid cloud environment, there are servers implementing the "client software" and other servers implementing the "server software." The virtual network platform facilitates the servers communicating with each other across cloud domains. In another specific implementation, there is an access application where a "client machine" for a user is accessing servers in the "cloud." In this case, using GNU Debugger (GDB) as an example, the client software is then running on the client user machine. This client GDB software can connect to the server GDB software that is running on the "server" in the cloud.

In a step 615, a determination is made as to whether the connection should be provided through a virtual network that connects the first network domain with a second network domain, different, remote, or separate from the first network domain.

In a step 620, if the connection should be provided through the virtual network, a virtual network connection is established between the first end point in the first network domain and the destination, the destination being at a second end point in the second network domain.

Alternatively, in a step 625 if the connection should not be provided through the virtual network, the data packet is passed outside the virtual network. In other words, the data packet may be forwarded to a destination outside or external to the virtual network. In a specific implementation, the data packet is passed to the local TCP/IP network inside the first network domain. The local TCP/IP network can include a physical networking device (e.g., hardware router or hardware switch) within the first network domain. The physical networking device may include its own set of rules and logic for processing and forwarding the data packet. These rules and logic are separate from or independent of the rules and logic of the virtual network platform.

In a specific implementation, the decision as to whether the virtual network should be used can be made locally or without traversing the virtual network. For example, the decision can be made within the originating domain (e.g., the first domain). This feature helps to conserve the computing resources of the virtual network, reduce network traffic across the virtual network, and prevent bottlenecks. The virtual network platform provides IT administrators with the flexibility to decide the conditions, circumstances, or contexts for when the virtual network should be used (or not be used) to transmit data across two or more network domains. For example, the administrator can use the system to control which applications will use the virtual network, which applications will not use the virtual network, or both.

In a specific implementation, the system stores a list of applications that are authorized or allowed to use the virtual network. This list may be referred to as a white list. In various other specific implementations, the system stores a list of applications that are not authorized or allowed to use the virtual network. This list may be referred to as a black list. In a specific implementation, an application not listed in the black list is allowed to use the virtual network.

Figure 7:
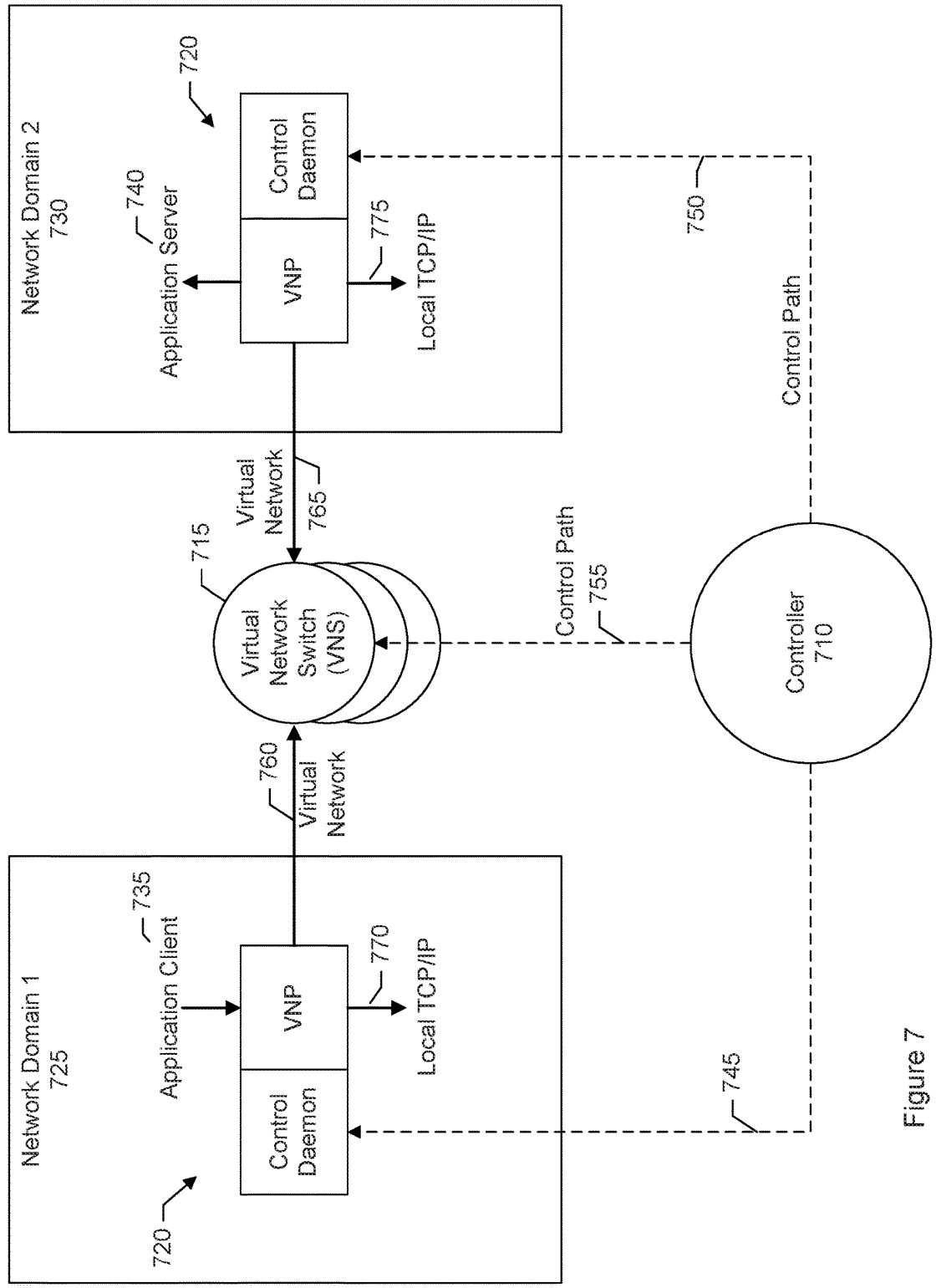
FIG. 7 shows a block diagram of a secure virtual network with L4 control paths.
Figure 8:
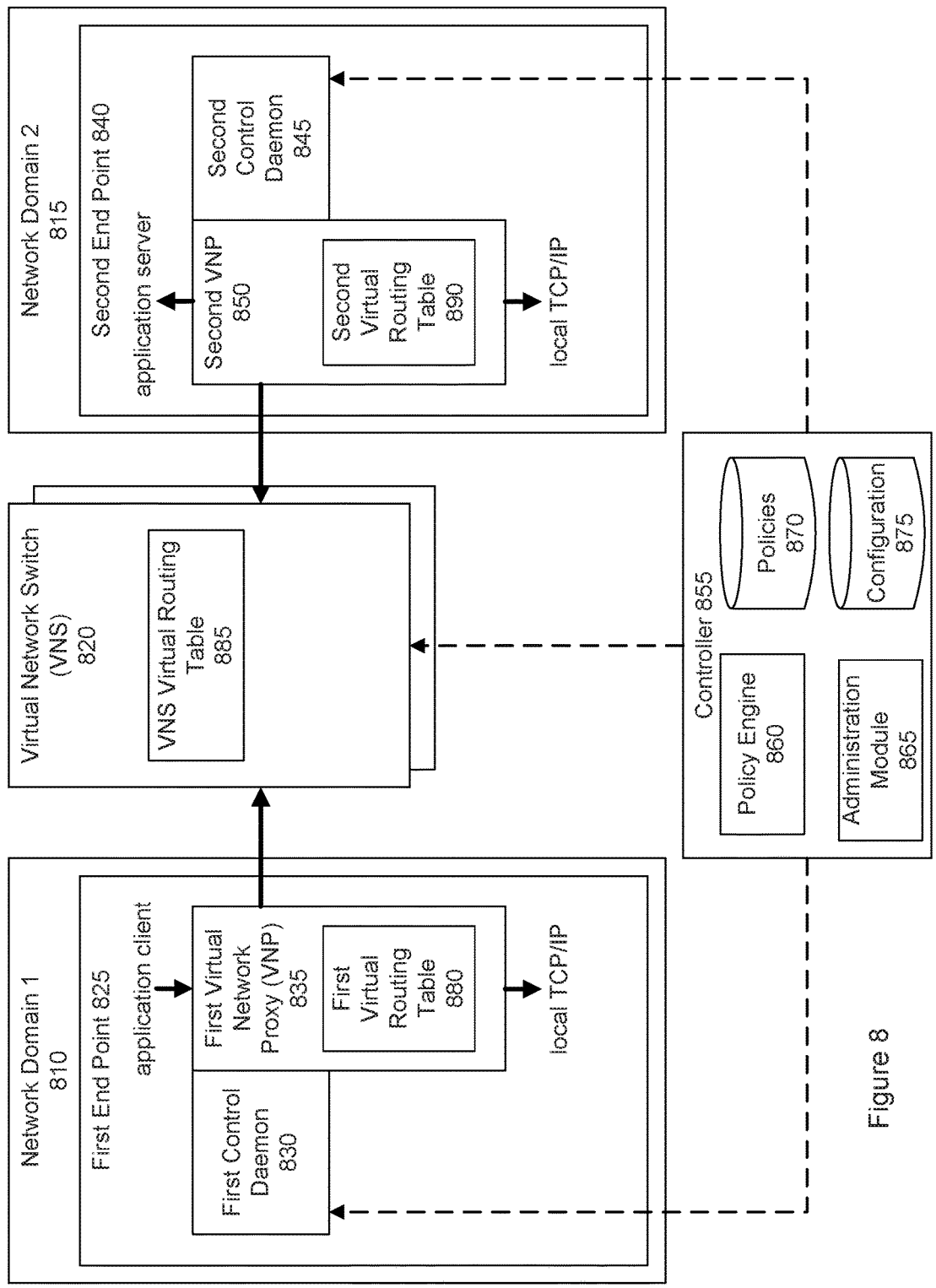
FIG. 8 shows a more detailed block diagram of the secure virtual network platform including virtual routing tables.

FIGS. 7 and 8 show more detailed block diagrams of the virtual network platform shown in FIG. 6. Referring now to FIG. 7, in a specific implementation, this secure virtual network platform design features a central controller 710, a virtual network switch (VNS) 715, and various end point modules 720 to form an end-to-end closed virtual network system. The controller, switch, and modules can include executable code, code components, or logic stored in memory of a hardware component.

In a specific implementation, the central controller is responsible for implementing and maintaining security policies in a central database, evaluating the security policies, approving (or denying) virtual network connections, directing the virtual switches to allow (or block) the virtual network connections, and directing the virtual network proxies to establish connections to the virtual switches. A specific example for such a security policy can be a rule for a GDB server application that is running on certain server machines in a network domain which can be accessed by a certain group of client machines running the GDB client software in a different network domain.

The virtual network switches are responsible for switching operations such as receiving a data packet and forwarding the data packet to the appropriate end point or port for the intended recipient. The virtual network switches can act as a bridge for exchanging communication between two different components of an application (e.g., a client component and a server component), where the application components are on two different end points in two different or separate network domains. Each network domain can remain independently configured. A virtual switch may execute within the virtualization software or firmware of a hardware component.

In a specific implementation, an end point module includes a control daemon and virtual network proxy. The control daemon, virtual network proxy, or both may be referred to as a virtual network agent. In a specific implementation, the end point modules are independent application programs or code modules. The modules may be external to the end point OS. A module may include code that is not native to the OS. In another specific implementation, the modules may function at the OS level or may be part of the OS. That is, a module may be internal to the OS. A module may include code that is native to the OS. A module may be implemented via add-ins, plug-ins, scripts, macros, extension programs, libraries, filters, device drivers, or combinations of these. Further discussion is provided below.

FIG. 7 shows a design with L4 (OSI layer 4) control paths between components that assure a tight security control for the use of the virtual network platform. The OSI (Open Systems Interconnection) Reference Model divides the functionality of the networking process into a seven-layer structure. The layers from top to bottom include application, presentation, session, transport, network, data link, and physical. The TCP/IP protocols are also divided into layers representing some of the same processes as their counterparts in the OSI model. There are four layers of the TCP/IP stack including application, transport, Internet, and link. The transmission of data from a source computer to a destination computer involves passing a request down through the various layers of the protocol stack.

The end point modules in a first network domain (e.g., network domain 1) 725 and a second network domain (e.g., network domain 2) 730 each include a virtual network proxy (VNP) and a control daemon connecting to the central controller. As discussed above, an example for an end point can be a physical server or a VM (virtual machine). Another example can be a virtual network edge gateway. In this specific implementation, a VNS is also or always connected to the controller. The network domain can be an enterprise LAN, server farm environment, or IaaS cloud datacenter, which can be protected by conventional peripheral firewalls. The two network domains can be interconnected via Internet or any TCP/IP network.

In a specific implementation, the enterprise IT defines a virtual routing table in the controller that defines how a client application 735 can find a server application 740 in a hybrid cloud environment. A set of virtual IP addresses is defined to connect a particular client-server application. This table is defined in the controller and the detail information is then pushed 745 and 750 to all control daemons and implemented in the VNPs.

In this specific implementation, when the application client software is making a connection to the application server in a separate network domain (e.g., the second network domain) in a hybrid cloud environment, it follows a TCP/IP routing table and requests a TCP connection with the VNP on the client side. The VNP confirms with the virtual routing table and then requests the control daemon to set up a virtual network connection.

The control daemon then makes the request to the central controller. The central controller checks the security policy, approves the connection, and then informs 755 VNS to allow virtual network connections 760 and 765 from both VNPs, respectively, and switch the packets. Upon receiving the confirmation from the VNS, the controller requests both VNPs (via the control daemon) to establish a virtual network connection to VNS. The VNPs will then operate or function as a TCP proxy for data transfer. The VNS switches the data sent/received from the two virtual network connections.

In an implementation, the VNS only accepts virtual network connections when it is requested by the central controller for security control. The connections are always in pairs. When one connection is terminated by a VNP, the VNS will terminate the other virtual network in the same pair. In an implementation, the virtual network is always encrypted to protect the data transport.

The VNPs work as a TCP proxy and reverse proxy for the traffic defined in the virtual routing table. For the traffics not defined in the virtual routing table (i.e., traffic not using secure virtual network), the VNP will pass 770 and 775 the packets to the local TCP/IP network inside the respective network domain.

In an implementation, the virtual network connection (e.g., a TCP connection) is always initiated by the VNP at an end point to the central VNS. The data is then switched in the VNS. This architecture design is suitable for most of the TCP/IP network and peripheral firewall implementations in enterprise legacy networks. This architecture design allows the secure virtual network provisioning to be decoupled from the physical network and firewalls underneath and helps to avoid changing any legacy infrastructure. More specifically, the VNP initiates TCP traffic to the VNS, as this direction follows the typical enterprise firewall rules of "outbound first, inbound reply."

In a specific implementation, the virtual network switch (VNS) operates as a switching mechanism between the first and second network domains. In this specific implementation, the VNS can remove or extract a payload received from the first virtual network proxy in the first network domain and place the payload into return traffic to the second virtual network proxy in the second network domain.

The architecture of the virtual network platform allows the platform to be deployed without having to make extensive changes to the underlying network layer such as the legacy or exiting security firewall settings. For example, typically, as discussed an enterprise's firewall setting will allow outbound traffic to a destination gateway and then an inbound return. The virtual network switch between the domains provides an outbound traffic destination for end points in the first network domain, and an outbound traffic destination for end points in the second domain. This helps to reduce or eliminate the need for an enterprise to change their existing firewall settings. A new security policy can be implemented in the virtual network layer via the controller 710 as an easy add-on layer to the enterprise legacy network.

In other words, for many enterprises outbound traffic is allowed. The returning traffic for inbound is also allowed. The inbound first traffic is typically blocked by the corporate firewall for the reasons of protecting the corporate networks. That is, an enterprise may block unsolicited inbound traffic. The system architecture design shown in FIG. 7 recognizes such corporate firewall system policies by having the VNPs initiate outbound connections to the VNS for the establishment of a virtual network connection. An enterprise wishing to implement the virtual network platform will not have to make many changes to the corporate firewall because many corporate firewalls, while blocking unsolicited inbound traffic, will allow outbound network traffic and the subsequent inbound traffic associated with the outbound connections, e.g., return, response, or reply traffic.

In a specific implementation, a method for establishing a virtual connection between a first end point in a first network domain and a second end point in a second network domain, different from the first network domain, includes instructing a first virtual network proxy at the first end point to initiate a first connection outbound to a virtual network switch between the first and second network domains, the first connection thereby being outbound network traffic to the virtual network switch, instructing a second virtual network proxy at the second end point to initiate a second connection outbound to the virtual network switch, the second connection thereby being outbound network traffic to the virtual network switch, receiving at the virtual network switch a data packet from the first end point for the second end point, and forwarding a payload of the data packet to the second end point as return traffic associated with the second connection.

In another specific implementation, a method for establishing a virtual network connection between a first end point in a first network domain and a second end point in a second network domain, different from the first network domain, includes initiating or making a first connection from the first end point to a virtual network switch between the first and second network domains, initiating or making a second connection from the second end point to the virtual network switch, the second connection thereby including an outbound request from the second end point to the virtual network switch, receiving at the virtual network switch a data packet from the first end point via the first connection, and forwarding a payload of the data packet to the second end point as a response to the outbound request.

In another specific implementation, a method includes receiving at a virtual network switch between first and second network domains a data packet from the first end point, receiving at the virtual network switch outbound traffic from the second end point, and forwarding a payload of the data packet as return traffic associated with the outbound traffic.

In another specific implementation, the end points also always initiate the control traffic, connecting to the central controller. Again, a reason is because corporate firewalls typically block inbound traffics and allow outbound traffic and the inbound return traffic. The "control path" is designed for such firewalls in that the end points always initiate the control traffic to the central controller to avoid any corporate firewall issue. When the controller is communicating with the second end point, asking it to initiate a traffic to the VNS, the controller is using the "return traffic" to talk to the second end point (since the second end point initiates the traffic to the controller first).

In a hybrid cloud environment, the virtual routing table can be dynamically updated when end points are added to or deleted from the virtual network. The updated virtual routing table will be pushed by the controller to each involved control daemon and then implemented in each VNP.

FIG. 8 shows a more detailed diagram of a specific implementation of a virtual network platform. As shown in the example of FIG. 8, there is a first network domain 810, a second network domain 815, and a virtual network switch 820 between the first and second network domains. The first network domain includes a first end point 825. The first end point includes a first control daemon 830 and a first virtual network proxy 835.

Similarly, the second network domain includes a second end point 840. The second end point includes a second control daemon 845 and a second virtual network proxy 850. There is a controller 855 that is connected to the virtual network switch, and first and second control daemons. The controller includes a policy evaluation engine 860, an administration module 865, a database 870 for storing security policies, and a database 875 for storing configuration data. The VNPs and VNS include virtual routing tables for filtering and routing data packets between the two network domains. Further discussion is provided below.

Figure 9:
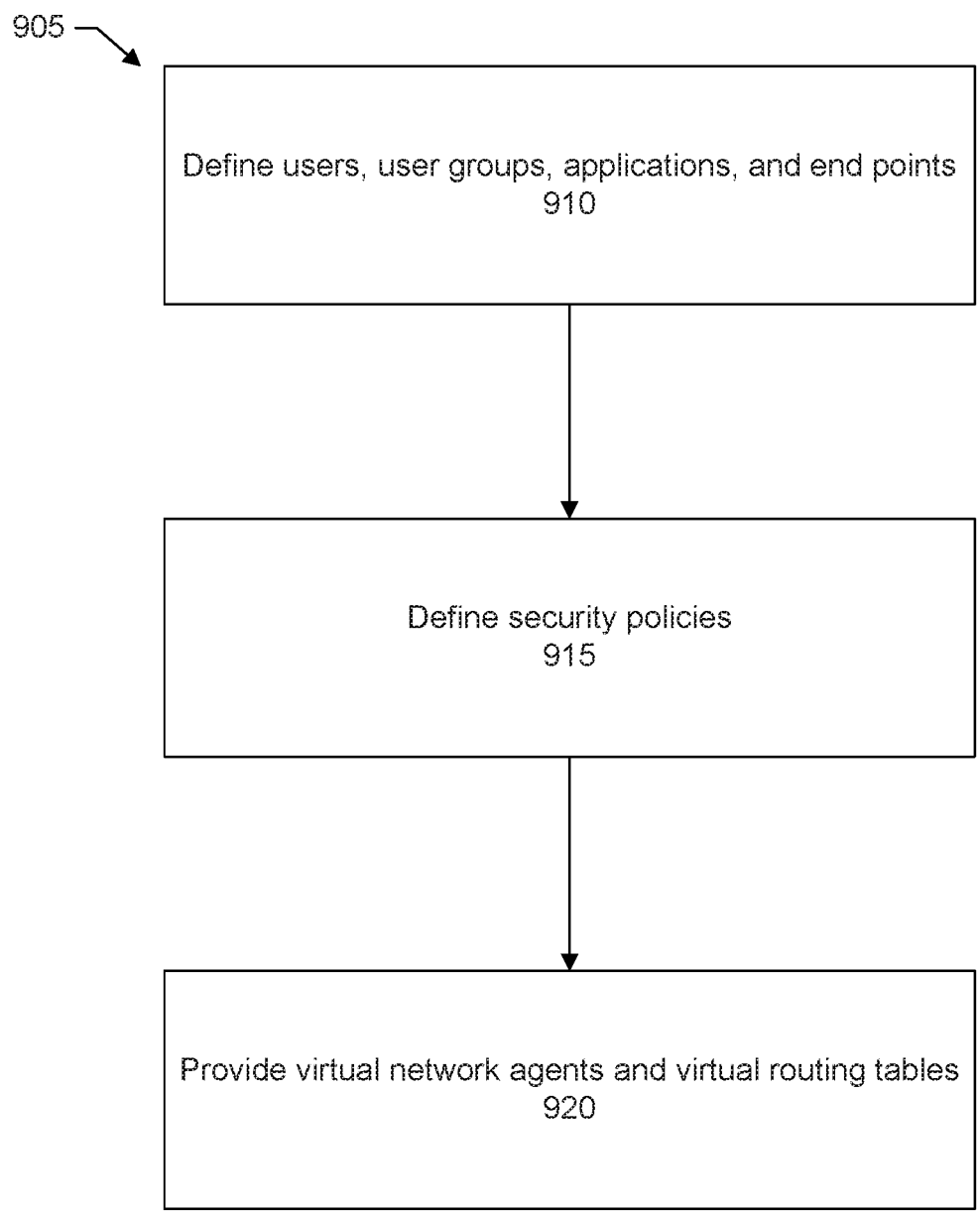
FIG. 9 shows a flow diagram for configuring the secure virtual network platform.

FIG. 9 shows a flow 905 for configuring a specific implementation of the virtual network. In this specific implementation, an IT administrator will program the central controller to define users and user groups (therefore, their computer (e.g., laptop computer) will automatically become end-points when they are on the computer and logged in to the system), and the servers or VMs that are running some enterprise applications for access on the virtual network platform. And then the administrator will define the access rules (security) for who can access what, in what circumstances, and running what applications (e.g., what specific servers that have loaded these applications). Once these security rules are defined, users (e.g., their client computers as end-points) will be able to use the virtual network platform to securely access provisioned applications running on other end-points in segregated network domains.

More particularly, in a step 910, the IT administrator uses the administration module of the controller to define users, user groups, applications, and end points. The definitions may be stored in a configuration file or database. The administration module may include a graphical user interface (GUI) so that the administrator can easily manage the system. Using the administration module, an administrator can identify, create, add, update, delete, modify, alter, and remove users, groups, applications, and end points for the virtual network.

Table A below shows an example listing of users that may be defined through the administration module.

TABLE A

| Name | User Name |
|---|---|
| John Kent | jkent |
| Mark Smith | msmith |
| Ben Carver | bcarver |
| Violet Sun | vsun |

In table A above, a first column lists the user first and last name. A second column lists the user name corresponding to the user.

Table B below shows an example listing of user groups that may be defined through the administration module.

TABLE B

| Group | Users |
|---|---|
| Marketing | jkent, msmith |
| Engineering | bcarver, vsun |

In table B above, a first column lists the name of the group. A second column lists the users who belong to the corresponding group.

Table C below shows an example listing of applications that may be defined through the administration module.

TABLE C

| Application | Version |
|---|---|
| GDB Debug | 5.1.3 |
| VNC Access and Collaboration | 10.7 |
| Zshell Secure Access | 8.4.2 |

In table C above, a first column lists the name of an application. A second column lists the version of the application.

The administrator can use the administration module to define the virtual network routing tables. In a specific implementation, the virtual network routing tables identify the type of network traffic—based on traffic source, destination, or both—that will use the virtual network. Other traffic, e.g., traffic not identifying the specific IP destinations listed in the virtual routing tables, will be routed to the local or lower level TCP/IP network. The local TCP/IP network may then use a different set of routing tables to forward the traffic to the appropriate destination.

In a step 915, security policies are defined and stored in the policies database. As discussed above, a policy can include rules for who can access what, in what circumstances, and running what applications (e.g., what specific servers that have loaded these applications). A policy may include a programmatic expression to be evaluated, a conditional statement (e.g., if X then do Y else do Z), nested conditionals, multiple conditionals, boolean operators (e.g., OR, AND, or NOT), or combinations of these. For example, an access rule or policy may be structured or formatted as follows:

If <condition> then ALLOW, else DENY

In the above example, use of the virtual network is allowed when the <condition> evaluates to TRUE. Use of the virtual network is not allowed or denied when the <condition> evaluates to FALSE.

Consider, as an example, the following:

If <X> accesses <Y> then ALLOW, else DENY

The X and Y variables can identify users, user groups, application programs, application program versions, application program client components, application program server components, end points, physical machines, physical devices, virtual machines, virtual devices, network domains, or combinations of these that will be allowed to use the virtual network.

A policy can specify, for example, the end points in a particular network domain (e.g., private cloud) that will be allowed to connect to end points in another network domain (e.g., public cloud). Instead or additionally, there can be a policy that specifies the end points a particular network domain that will not be allowed to connect to end points in another network domain.

Below is an example of a policy:

If <user=vsun> accesses <end point=50.63.103.1> then ALLOW, else DENY

In this example, the user "vsun" (or "Violet Sun") will be allowed use of the virtual network to connect to the end point associated with IP address "50.63.103.1." Other users may be denied use of the virtual network. Another similar example is: If <end point=172.64.0.1> accesses <end point=50.63.103.1> then ALLOW, else DENY. In this example, it is one end-point server accessing another end-point server in a different network domain.

Below is another example of a policy:

If <user group = NOT Engineering> accesses <end point = 50.63.103.1> then DENY, else
    ALLOW In the above example, users not in the engineering group will be denied use of the virtual network to connect to the end point. Users in the engineering group will be allowed use of the virtual network to connect to the end point. From the example data in table B above, users "jkent" and "msmith" will be denied use of the virtual network because they are in the Marketing group which is not the Engineering group. Users "bcarver" and "vsun" will be allowed use of the virtual network.

As can be appreciated, an administrator can create very granular policies, very broad policies, or both that define the conditions in which use of the virtual network is allowed or not allowed. This allows enterprises to control communication across different network domains in a hybrid cloud environment without having to open their protected legacy networks. An add-on virtual network easily addresses new connection and business requirements.

Security can be specified based on specific computing nodes or machines (e.g., machine A in first domain can connect only to machine B in second domain) or groups of computing nodes or machines (e.g., all machines in machine group A in first domain can connect only to the machines in machine group B in second domain). Security can be specified based on specific application version (e.g., only application version 2.3 in first domain can connect to second domain) such that a security hack by altering application software can be blocked by virtual network access control. Security can be specified based on specific machines executing a specific version of an application (e.g., only application version 2.3 executing on machine A in first domain can connect to machine B in second domain). And so, forth.

As a specific example, consider a scenario where user-A can access a particular application that is running on server-A in the second network domain. When user-A is connected to the server-A and accessing the application, under that situation another user-B is allowed to access server-A at the same time and access a second application. In other words, there can be a policy such that the access right for user-B is only granted while user-A is conducting the access to the same server. Such a policy can be advantageous to security where user-A is an employee to the domain where server-A is deployed. User-B is a vendor who is helping user-A who is working on some application. According to the policy, the vendor, user-B, is never allowed to access the server-A alone. His access is only granted when user-A is connected to server-A. Thus, the "circumstances" for when the virtual network can (or cannot) be used can be a logical condition, a time condition, a geographical condition, a user role condition, a multiple user role condition, a dependency condition, or combinations of these.

Further, because the virtual network is decoupled from the physical network infrastructure, the control can be achieved without having to engage in extensive reconfiguration of the legacy infrastructure.

In a specific implementation, policy evaluation is centralized. In this specific implementation, policy evaluation is at the controller and is not at the individual end points and virtual switches. The policies are not distributed to the end points or switches. This centralized approach helps to reduce the resources needed to execute the end point modules (e.g., control daemon) and virtual switches because the logic for the policy evaluation will be the responsibility of the policy engine at the controller. The centralized approach is more secure as the controller can be strategically protected by enterprise IT and it is not easily reached or altered by users. Furthermore, there will be no storage space requirement at an end point for policies because the policies are stored at the controller. Such a centralized approach can also facilitate scaling and clustering of virtual network infrastructure.

In another specific implementation, policy evaluation is decentralized or a portion of policy evaluation is decentralized. In this specific implementation, there can be policy enforcement end point modules. Policies may be provided to the various end points so that policy evaluation can occur at an end point, virtual switch or both. In such a decentralized approach, it can be easier to scale the intelligence of security policies if there is a requirement for a complex security system.

In a step 920, virtual network agents (e.g., control daemons and virtual network proxies) and virtual routing tables are provided to the end points and virtual network switches. In a specific implementation, the agents, tables, or both are distributed from a central location (e.g., central control server) to the end points. In another specific implementation, the agents, tables, or both are provisioned in conjunction with the provisioning of an end point. For example, there can be a virtual machine template that provides for the installation of an agent, table, or both when a virtual machine is created or cloned from the template.

Figure 10:
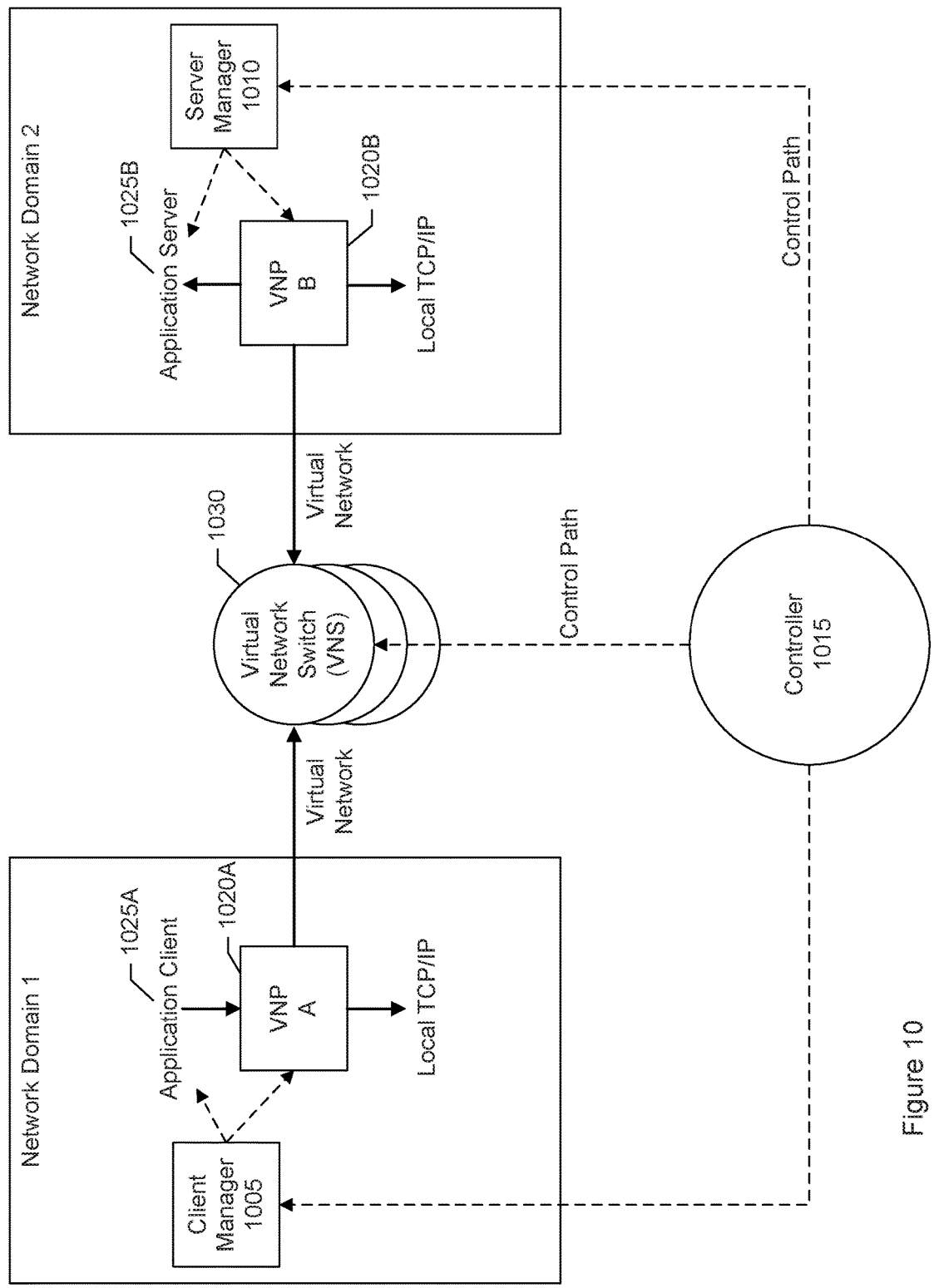
FIG. 10 shows a block diagram of a secure virtual network with L7 control paths.

FIG. 10 shows a block diagram of another specific implementation of a virtual network platform. The system shown in FIG. 10 is similar to the system shown in FIGS. 7-8. In the system of FIG. 10, however, the end points include a manager module to provide enhanced functionality. For example, as shown in FIG. 10, there is a client manager 1005 and a server manager 1010. The client manager is executing at the first end point in the first network domain. The server manager is executing at the second end point in the second network domain.

More particularly, FIG. 10 shows an example of a secure virtual network design with L7 (OSI Layer 7) control paths. The uniqueness of this virtual network design is the enhanced security control on the client-server applications using the virtual network platform. In this specific implementation, there is a client manager and a server manager that manage the client and server applications, as well as to interact with the central controller and control VNPs.

This design facilitates a feature that may be referred to as an "interlock" or "application interlock" or "computing interlock." The "interlock" mechanism helps to ensure that only the authorized client-server applications can use the virtual network for hybrid cloud connections. With the L7 management software at the end point, more intelligence can be built-in to support advanced security functions and application features in a hybrid cloud environment. When it comes to security control, it can be desirable to "integrate" or "interlock" the application level access with the network level access. In a specific implementation, the control is owned by the central controller. Therefore, in this case the virtual network access is then only available to specific applications that are provisioned by the controller at a higher level.

In this specific implementation, security can be implemented at the application layer, operating system layer, or both. The architecture of the platform allows for such security without having to program the network, the computing node on the network, and the application executing in the node.

The "interlock" mechanism facilitates vertical integration for security policy protection. For example, the system can be used to provision servers (or VMs) in two (or more) network domains such that the client-server applications can find each other using the virtual network platform. In this case, the IT administrator configures the central controller and defines an application profile that includes the valid computing flows among the end-points (as the security policy for communication). When a cloud manager adds more VMs into this application profile, the security rules (application profile and the computing flows) are automatically enforced in all end-points. When the end-points need to access each other (e.g., the client-server applications running inside these end-points are trying to reach each other), they will be able to use the pre-defined/allowed virtual networks.

Figure 11A:
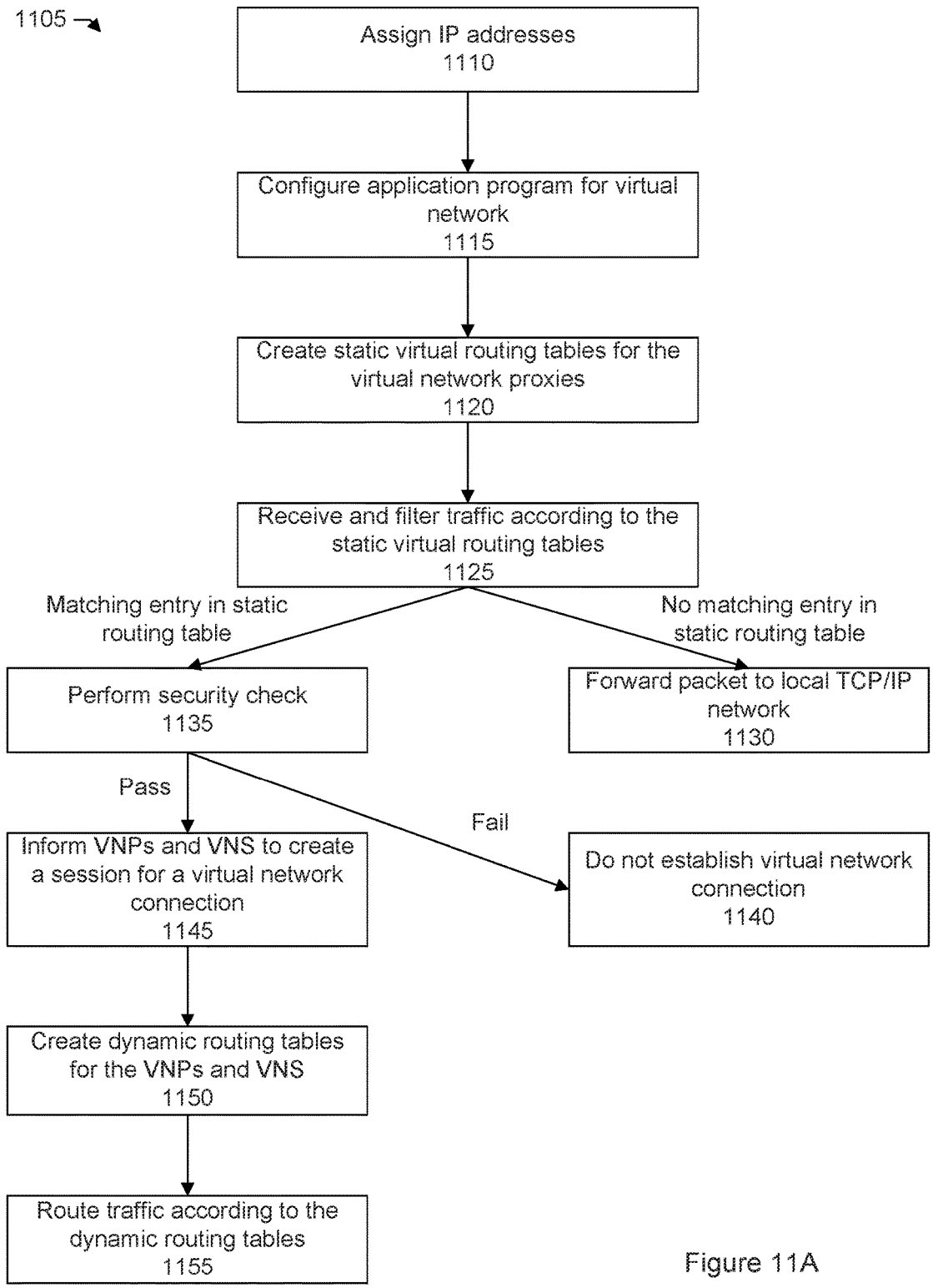
FIG. 11A shows a flow diagram of an operation of the secure virtual network platform.

FIG. 11A shows a flow diagram 1105 of a technique of a virtual network platform as shown in the example of FIG. 10. The virtual routing tables in the virtual network proxies and virtual network switches may be referred to as IP forwarding tables. In a specific implementation, there can be two types of end points when considering the virtual network connections. A first type of end point ("type-1") includes an end point machine where the application client software (or application server software) is a process that is in the same end point machine.

A second type of end point ("type-2") includes an end point gateway where the application client software (or application server software) is a process that is running on the network, not in the end-point gateway. In this specific implementation, in these two types of end points, the network routing considerations are different. The "virtual network routing table" and the way the connections are routed can be different. There can be a case where an end-point in a virtual network is a machine as well as a gateway.

A first type of end point can connect to another end point that is of the first type (e.g., "type-1" connects to "type-1"). A second type of end point can connect to another end point that is of the second type (e.g., "type-2" connects to "type-2"). As can be appreciated, the platform can support many more different connection conditions.

Regarding the first type of end point connections, in a step 1110, IP addresses are assigned. Consider, as an example, a specific implementation of the virtual network platform shown in FIG. 10. For this example, the virtual network will be provisioned to connect an end-point A in a network domain 1 to an end point B in a virtual domain 2. A controller 1015 assigns a first virtual IP address (e.g., "vIPa") to a first virtual network proxy ("VNPA") 1020A, a second virtual IP address (e.g., "vIPb") to a second virtual network proxy ("VNPB") 1020B. The first and second virtual IP address ("vIPa" and "vIPb") are virtual IP addresses which may or may not be routable in the physical TCP/IP network in domain 1 and domain 2.

In a step 1115, an application program is configured to use the virtual network. In this example, the application client software is configured so that it understands that the second virtual IP address ("vIPb") is the IP address to reach the application server software.

In a step 1120, static virtual routing tables are created for the virtual network proxies. These tables help the virtual network proxies (e.g., VNPA or VNPB) to filter traffic and decide whether to forward the packets via the virtual network or to the local TCP/IP network.

Figure 11B:
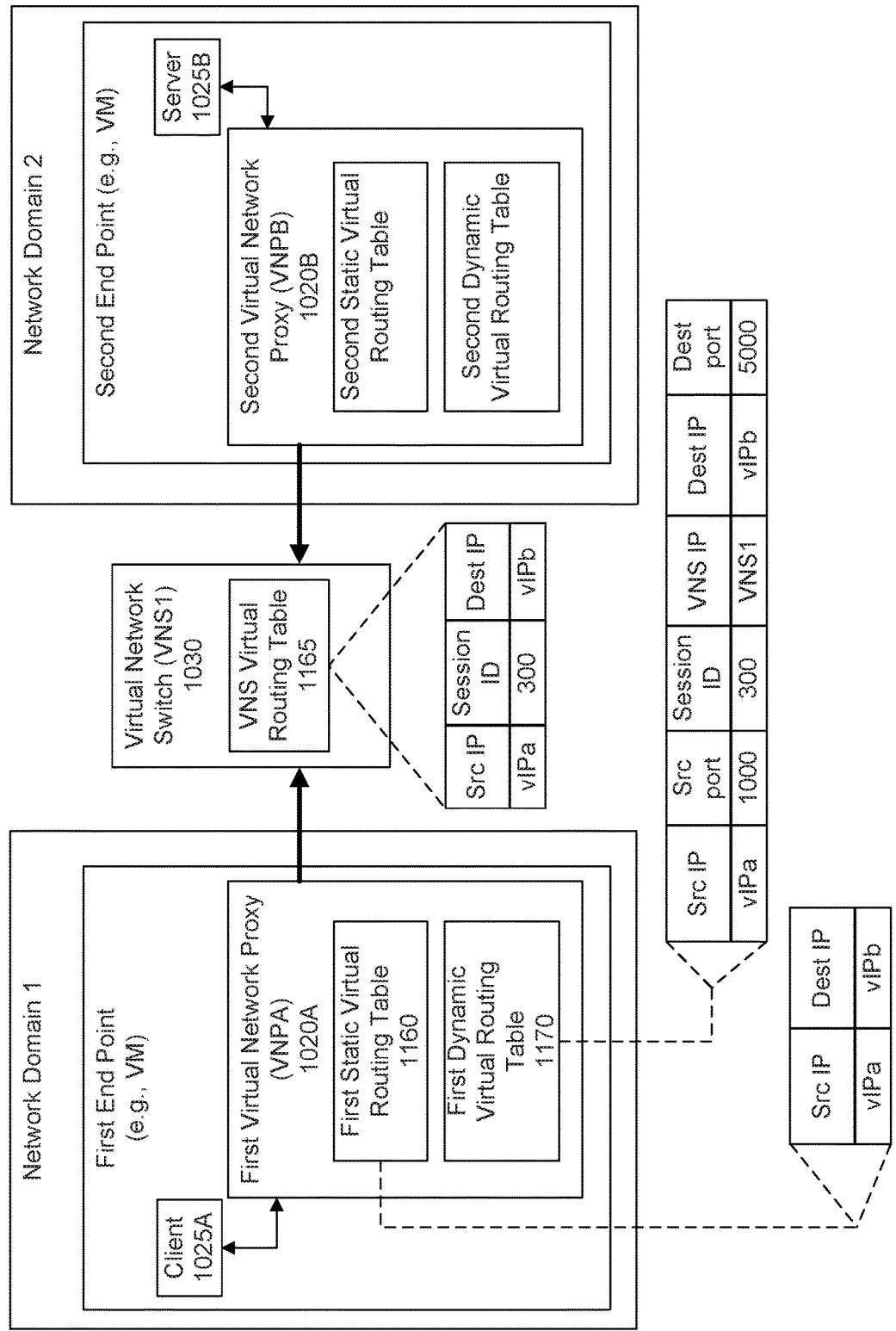
FIG. 11B shows an example of virtual routing tables being generated for connecting end points across the virtual network.

Referring now to FIG. 11B, table D below shows an example of a static virtual routing table 1160 that may be created for first virtual network proxy (VNPA) 1020A.

TABLE D

| Source IP | Destination IP |
|-----------|----------------|
| vIPa      | vIPb           |

A first column of the table lists the source IP addresses. A second column of the table lists the destination IP addresses that correspond or map to the source IP addresses. In this example, the first virtual IP address ("vIPa") is mapped to the second virtual IP address ("vIPb"). A virtual routing table similar to the routing table shown in table D is created for the second virtual network proxy (VNPB) 1020B. In the type-1 case, both end points can initiate a network connection. That is, a client-server application can be deployed in both directions. In this case, for VNPB initiating a connection to VNPA, its routing table is a swapped version from what is shown in table D. Specifically, in this example, the source IP will be "vIPb" and the destination IP will be "vIPa."

As discussed above, in a specific implementation, the IT administrator uses the controller to create or generate the tables and distribute the information (e.g., tables) to the virtual network proxies at the end points. For example, the controller may include a user interface that includes a set of input boxes. Using the input boxes, the administrator can input or enter the addresses and their corresponding address mappings. Alternatively, in another specific implementation, a virtual routing table may be created at an end point.

In a step 1125, traffic or data packets are received and filtered according to the static virtual routing tables. Data packets not having a routing address listed in the static routing table are forwarded to the local TCP/IP network (step 1130). In a specific implementation, determining if the connection should be provided through a virtual network connection includes comparing one or more than one Internet Protocol (IP) addresses associated with the second end point against a list of IP addresses stored at the first end point. In this specific implementation, when the one or more than one IP addresses associated with the second end point are not listed in the list of IP addresses, the connection should not be provided through the virtual network. One or more than one IP address can be associated with an end point. Each IP address can represent one "application server" in the other (e.g., second) network domain that the client wants to address.

Alternatively, if a data packet includes a routing address that matches an entry in the static virtual routing table, a security check 1135 is performed to determine whether a virtual network connection should be established. For example, assuming that an entry in the virtual routing table 1160 at first virtual network proxy (VNPA) 1020A can be found for a data packet, when application client 1025A is making a connection to application server 1025B, client manager 1005 checks with controller 1015 for security permission.

In other words, the manager will seek permission from the controller for the virtual network connection. There can be cases where a routing address is found in the static virtual routing table, but the controller denies the virtual network connection. This can be the result of a policy evaluation by the controller where, for example, one or more parameters of the policy have or have not been satisfied as described in the discussion of policies accompanying FIG. 9, step 915.

The local filtering via the static routing tables (step 1125) at the end points helps to reduce network congestion and bottlenecks. For example, a data packet will not have to be forwarded to a gateway device only to be returned because it is to be routed to the local TCP/IP network rather than the virtual network. The architecture helps to ensure that the system can be easily implemented without having to make expensive investments in upgrading, for example, the switching capacity of the existing network.

If the security check fails (step 1140), the application client is blocked from connecting to the application server. In other words, based on a policy evaluation by the controller, the controller may deny permission to use the virtual network. An alert such as an email, text message, or other notification for the administrator may be generated. The security check failure may be recorded in a log.

Alternatively, if the security check passes (step 1145), the controller informs the virtual network proxies and virtual network switches to create a session for the virtual network connection. For example, when the security check passes, the controller 1015 (FIG. 10) will inform first virtual network proxy (VNPA) 1020A, second virtual network proxy (VNPB) 1020B, and a first virtual network switch (VNS1) 1030, between the first and second virtual network proxies, to create a session for connection. It should be appreciated that there can be multiple (e.g., two or more) virtual network switch units for scalability.

In a step 1150, dynamic virtual network routing tables are created for the virtual network proxies and virtual network switch. Traffic between the first and second network domains is then routed according to the dynamic routing tables (step 1155). Dynamic virtual routing tables can refer to tables that are automatically generated, provisioned, or updated as part of establishing (or terminating) the virtual network connection. For example, the tables may be provisioned after a connection request is received. The tables can be created and updated without user intervention. Static virtual routing tables can refer to tables that are manually provisioned by an administrator as part of a configuration phase for the virtual network. For example, the tables may be provisioned before a connection request is received.

Table E below shows an example of a dynamic routing table 1165 (FIG. 11B) that may be created for first virtual network switch (VNS1) 1030.

TABLE E

| Source IP | Session ID | Destination IP |
|---|---|---|
| vIPa | 300 | vIPb |

A first column of the table lists the source IP address. A second column lists the corresponding session ID. A third column of the table lists the corresponding destination IP address. In a specific implementation, only the controller is able to provision an entry in the virtual network switch (VNS) table. The restriction on access helps to ensure the security of the virtual network platform.

Table F below shows an example of a dynamic virtual network routing table 1170 (FIG. 11B) that may be created for first virtual network proxy (VNPA) 1020A.

TABLE F

| Source IP | Source Port | Session ID | VNS IP | Destination IP | Destination Port |
|---|---|---|---|---|---|
| vIPa | 1000 | 300 | VNS1 | vIPb | 5000 |

A first column of the table lists the source IP address. A second column lists the corresponding source port. A third column lists the session ID. A fourth column lists identifies the corresponding virtual network switch for the virtual connection. A fifth column lists the corresponding destination IP address. A sixth column lists the corresponding destination port. A similar table is also created in the second virtual network proxy (VNPB) 1020B.

In this example, application client software 1025A sends packets to the second virtual IP address ("vIPb") inside or within the end point machine A in the first network domain. The first virtual network proxy (VNPA) 1020A captures the packets via the static virtual routing table filter function (see table D above).

All packets captured in first virtual network proxy (VNPA) 1020A following the table above are forwarded to virtual network switch (VNS1) 1030 with the session ID, port information, as well as the destination IP information.

All packets received at virtual network switch (VNS1) 1030 are routed based on the dynamic VNS table above (see, e.g., table E). As discussed above, in a specific implementation, provisioning the dynamic VNS table is the responsibility of the controller. The VNS can compare the forwarded information from a VNP with the information provided in the dynamic VNS table to determine where a data packet should be routed. In a specific implementation, the session ID in the forwarded information and the session ID in the dynamic routing table help to identify the proper routing. If the session IDs do not match or correspond, the VNS may not transmit the data packet to the destination IP listed in the routing information forwarded by the VNP. The VNS (via the controller) thus helps to ensure the security of the virtual network.

It should be appreciated, however, that any competent technique may be used to determine whether or not routing information forwarded by a VNP to a VNS corresponds to routing information provisioned in the dynamic VNS table by the controller. Such techniques can include, for example, logic to identify a session, hashing, security tokens, encryption, cryptography, cookies, other variables instead of or in addition to session identifiers, or combinations of these.

All packets that arrive at second virtual network proxy (VNPB) 1020B with the destination IP address of "vIPb" will be forwarded to the process that owns port 5000 (destination port) on the same end point machine B in the second network domain.

In a specific implementation, a method includes storing at a first end point in a first network domain a static routing table including a list of virtual destination Internet Protocol (IP) addresses, receiving at the first end point a request from a client to connect to a destination, and scanning the static routing table to determine whether an IP address of the destination is listed in the static routing table. The method further includes if the IP address is not listed, passing the request to a TCP/IP network that is local to the first network domain, and if the IP address is listed, seeking permission from a controller to use a virtual network connecting the first network domain to a second network domain, different from the second network domain, the destination being in the second network domain, and upon a determination by the controller that use of the virtual network is permitted, establishing for the client a virtual network connection between the first end point and the destination.

In a specific implementation, the method further includes upon the determination that use of the virtual network is permitted, creating at the first end point a first dynamic routing table having first routing information, the first routing information including a first session identifier that identifies the virtual network connection, and forwarding the first routing information to a virtual network switch between the first and second network domains. The virtual network switch consults a second dynamic virtual routing table having second routing information. The second routing information includes a second session identifier. When the second session identifier corresponds to the first session identifier, the virtual network switch forwards a payload of a data packet from the client to the destination according to the second routing information.

Figure 11C:
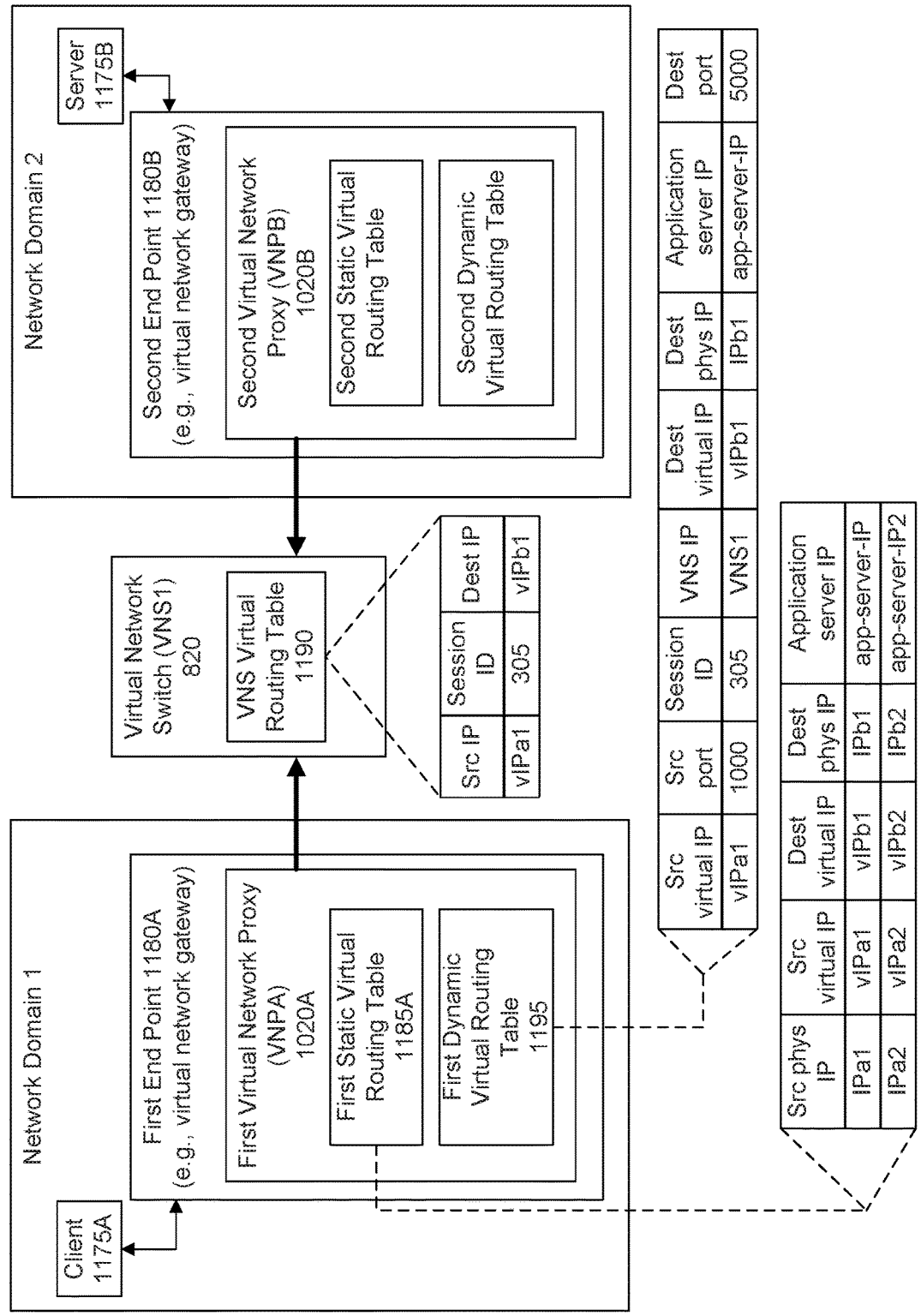
FIG. 11C shows an example of virtual routing tables being generated for connecting gateway end points across the virtual network.

For the second type of end point connections, the application client software and application server software are running outside of or are external to the end-point machines. FIG. 11C shows an example of application client software and application server software 1175A and 1175B, respectively that are not located in end point machines 1180A and 1180B. The end-point machines in this case can be considered as virtual network gateways, not an end point server. In this case, each "client-server" application will be provisioned in the virtual network so that the routing can be accomplished. FIG. 11C shows how a single IP address is using the virtual network to connect to another IP address in a remote domain. That is, FIG. 11C shows a single or "one virtual network connection" being made.

Consider again, as an example, the virtual network platform and flow shown in FIGS. 10-11A. In step 1110, IP addresses are assigned. When a first client-server application is provisioned on a virtual network that connects end point A as a virtual network gateway in network domain 1 to the end point B as a virtual network gateway in the virtual domain 2, controller 1015 assigns a first IP address ("IPa1") and a first virtual IP address ("vIPa1") to first virtual network proxy ("VNPA") 1020A. The controller assigns a second IP address ("IPb1") and a second virtual IP address ("vIPb1") to second virtual network proxy ("VNPB") 1020B, as well as the application server IP, app-server-IP.

The first virtual IP address ("vIPa1") and the second virtual IP address ("vIPb1") are virtual IP addresses which may or may not be routable in the physical TCP/IP network in first network domain 1 and second network domain 2. The first IP address ("IPa1"), second IP address ("IPb1"), and the address for the application server ("app-server-IP") are physical IP addresses.

In step 1115, the application program is configured for the virtual network. In this example, the application client software, is configured so that it understands the first IP address ("IPa1") is the physical IP address to reach the application server software running in network domain 2.

In step 1120, static virtual routing tables are created for the virtual network proxies. As discussed above, these tables help the virtual network proxies to filter traffic and forward the packets via the virtual network or to the local TCP/IP network (or drop the packets). Table G below shows an example of an entry in a static virtual routing table 1185A (FIG. 11C) that may be created for first virtual network proxy (VNPA) 1020A (which, in this example, is a virtual network gateway).

TABLE G

| Source Physical IP | Source Virtual IP | Destination Virtual IP | Destination Physical IP | Application Server IP |
|---|---|---|---|---|
| IPa1 | vIPa1 | vIPb1 | IPb1 | app-server-IP |

A first column of the table lists a physical IP address of the source gateway. A second column lists the virtual IP address of the source gateway. A third column lists the virtual IP address of the destination gateway. A fourth column lists the physical IP address of the destination gateway. A fifth column lists the IP address of the application server. A similar virtual routing table is created in second virtual network proxy (VNPB) 1020B.

Entries may be added to the virtual routing tables as needed. For example, when a second client-server application is provisioned to route through the virtual network, another entry can be added to the static virtual table as shown in the example of table H below.

TABLE H

| Source Physical IP | Source Virtual IP | Destination Virtual IP | Destination Physical IP | Application Server IP |
|---|---|---|---|---|
| IPa1 | vIPa1 | vIPb1 | IPb1 | app-server-IP |
| IPa2 | vIPa2 | vIPb2 | IPb2 | app-server-IP2 |

In step 1125, as discussed above, traffic or data packets are received and filtered according to the static virtual routing tables. Data packets not having a routing address listed in the static routing table are forwarded to the local TCP/IP network (step 1130). Alternatively, data packets having an address listed in the static routing table trigger a security check. In a specific implementation, when the application client is making a connection to the application server, the IP network in first network domain 1 routes the packets to the first virtual network proxy (VNPA). Client manager 1005 then checks with controller 1015 for security permission, on demand (step 1135).

When the security check passes, controller 1015 will inform the first virtual network proxy (VNPA), second virtual network proxy (VNPB), and the virtual network switch (VNS1) to create a session for connection (step 1145). There can be multiple VNS units for scalability.

In step 1150, dynamic routing tables are created. Table I below shows another example of a dynamic routing table 1190 (FIG. 11C) that may be created for the virtual network switch.

TABLE I

| Source IP | Session ID | Destination IP |
|-----------|------------|----------------|
| vIPa1     | 305        | vIPb1          |

As discussed above, in a specific implementation, only the controller is able to provision an entry in the VNS table to ensure the security of the system. In other specific implementations, where, for example, security is not too high of a concern, the VNS table may be provisioned by a module other than the controller. Such provisioning can help to increase response time and network performance.

Table J below shows an example of a dynamic virtual network routing table 1195 (FIG. 11C) created for the first virtual network proxy (VNPA).

TABLE J

| Source Virtual IP | Source Port | Session ID | VNS IP | Destination Virtual IP | Destination Physical IP | Application Server IP | Destination Port |
|---|---|---|---|---|---|---|---|
| vIPa1 | 1000 | 305 | VNS1 | vIPb1 | IPb1 | app-server-IP | 5000 |

A first column of the table lists the virtual IP address of the source gateway. A second column lists the port of the source gateway. A third column lists the session ID. A fourth column lists the IP address of the virtual switch. A fifth column lists the virtual IP address of the destination gateway. A sixth column lists the physical IP address of the destination gateway. A seventh column lists the IP address of the application server. An eighth column lists the destination port. A similar table is also created in the second virtual network proxy (VNPB) 1020B.

In this example, all packets captured in the first virtual network proxy (VNPA) following the table above are forwarded to the virtual network switch (VNS1) with the session ID, the port information as well as the destination IP information. All packets received at the virtual network switch (VNS1) will be routed based on the dynamic VNS table above. All packets arriving at the second virtual network proxy (VNPB) with the destination virtual IP address of "vIPb1" will be forwarded to app-server-IP with port 5000. In this forwarding traffic, the source IP will be "IPb1," i.e., the physical IP address of the destination gateway from the table above.

Figure 12:
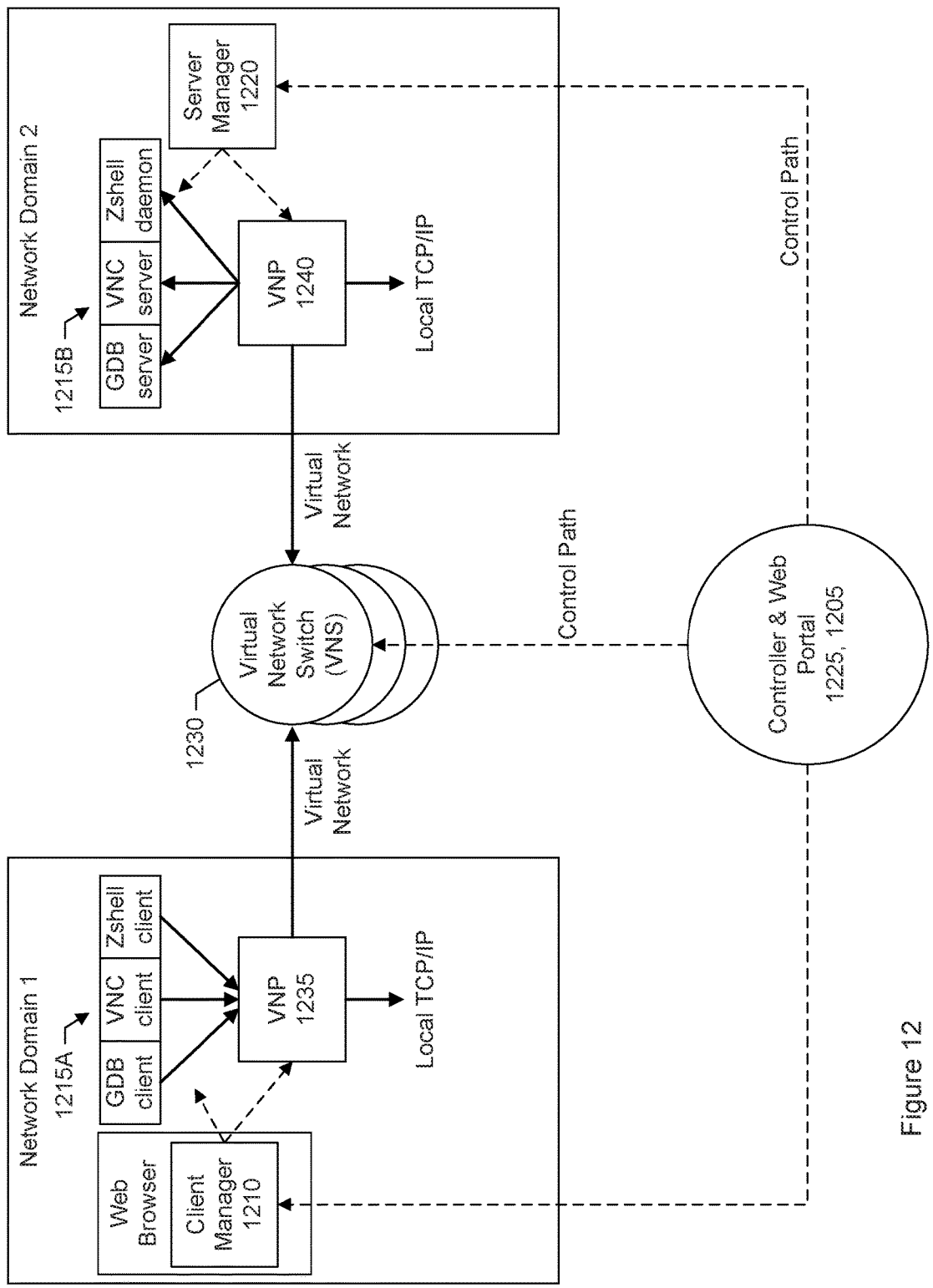
FIG. 12 shows a block diagram of a secure virtual network for secure remote access, debug and collaboration applications.

FIG. 12 shows a block diagram of another specific implementation of a virtual network platform. The system shown in FIG. 12 is similar to the system shown in FIG. 10. In the system of FIG. 12, however, the platform is further enhanced with a central web portal 1205, a web browser with client manager 1210, and various client-server applications 1215A, B that are managed by the client manager and a server manager 1220. The virtual network interlock capability is built in and enforced by the client manager and server manager to lock the application software and the usage of virtual network.

The platform supports secure remote access, operation, debug, and collaboration without re-engineering or re-provisioning enterprise existing network and security infrastructure. During the access, the enterprise IP (Intellectual Property) and secure data stay behind their layers of firewalls. A specific version of the application software can be locked and used on the remote access platform for security compliance. In a specific implementation, only the packets generated by the authorized access, debug, and collaboration tools are allowed to travel through the virtual network.

The example of the secure remote access platform shown in FIG. 12 includes virtual network controller 1225, a virtual network switch (VNS) 1230, virtual network proxy (VNP) 1235 and 1240 on both client and server sides, respectively, central web portal system 1205, client manager 1210 managing application client software 1215A, and server manager 1220 managing application server software 1215B.

All client-server applications on this platform (e.g. access, collaboration, GDB debug, and Zshell) are controlled end-to-end horizontally between network domains and top-down from application layer to the secure network layer vertically. The client-server application connections are realized via the virtual network infrastructure underneath.

Table K below shows a flow of a specific implementation of the system.

TABLE K

| Step | Description |
|------|-------------|
| 1 | A user can log on to the web portal via a web browser. Given a privilege control, the user can choose to use an access and collaboration tool (e.g., VNC), a remote debug tool (e.g., GDB), and a secure shell access tool (e.g., Zshell) from links offered on a web page. By clicking the link, the system platform will execute one or more of the following steps 2-8: |
| 2 | A package including the client manager software, application client software, and VNP is dynamically downloaded via web browser plug-in. |
| 3 | Client manager requests security permission from the controller for the operation associated with the link. |
| 4 | Controller allows it (or denies it based on policy) and informs server manager to prepare application server and turn on virtual network with connection controlled by VNP, connecting to VNS. Prior to the connection request, deploy the access server with the server manager and application server software. |
| 5 | Controller informs VNS to allow two connections from VNPs on both the client and server ends. The two connections will be formed in a pair and the data are securely switched in VNS. |
| 6 | Controller informs client manager that the permission granted. |
| 7 | Client manager starts application client software, connecting to VNP, and then connects to VNS via virtual network. |
| 8 | The end-to-end client-server applications are then connected and interlocked with the virtual network. |

In a specific implementation, the virtual network platform is used in conjunction with a debugging application referred to as GNU Project debugger (GDB). In this specific implementation, with this secure remote access platform, a client-server GNU GDB tool can connect between two network domains to perform source code debug without changing any of the underlying network infrastructure. With this capability, the data files stay behind the firewall in a network domain (e.g., second network domain). The source code of the application software under debug stay in another network domain (e.g., first network domain). The data files and source codes are considered sensitive corporate IP and can be prevented from being transferred out of the enterprises.

It can be desirable to ensure that a specific version of the GDB client and software tools are used on this platform. The original GNU GDB tools include some special functions that are considered security violations for many enterprises when used in a cross domain environment. In this specific implementation, a special version of the GDB software with the malicious (or undesired) functions removed can be "locked" in this platform for usage.

In another specific implementation, the virtual network platform is used in conjunction with a desktop sharing application referred to as VNC Access and Collaboration. VNC is very popular and has been widely used in the high tech industry for remote virtual desktop access and collaboration. In this specific implementation of the secure remote access platform, a special version of VNC can be embedded to support remote access and collaboration function.

More particularly, VNC carries some native features that may be undesirable to the enterprises in terms of security when used in a cross domain environment. A special version of VNC with these features removed can be embedded and "locked" in this platform for usage.

VNC supports a collaboration mode with a view sharing for the virtual desktop. On this specific implementation of the secure remote access platform with web portal a browser control, one can implement a desirable collaboration feature where a "guest" can be invited to join a live VNC session owned by another user. The guest can only join this VNC session when it is live. The owner of the VNC session does not need to release his or her secure password to the guest for signing on. The platform hides the complexity and makes the collaboration session very simple and yet secure.

Another example of a desirable function that can be offered on this specific implementation of the platform is an "administrator enforced join" into any live VNC session. With a proper privilege control on the web portal system, one user can have a high privilege to actively join into a VNC session that is owned by another user.

In another specific implementation, the virtual network platform is used in conjunction with a shell application referred to as Zshell. Zshell is a secure shell feature that allows one party to execute a specific and pre-defined set of shell commands in another domain without opening the network. When two companies are collaborating across domains, frequently a specific set of tasks need to be executed by guests in a secure environment.

However, given the constraints in the modern enterprise environment, the network and computing environment have to be "open" even just to support running a small set of tasks. However, once the network and computing environment are open to support these tasks, it becomes extremely difficult to ensure that only the set of tasks was executed in the environment. The corporate compliance could be compromised in such a scenario.

Zshell is a function designed to avoid the overhead and yet achieve the goal of executing the limited set of tasks via a shell. In this specific implementation, when Zshell is integrated in the secure remote access platform, the Zshell feature along with the "interlock" capability of the platform enables the "guest" to execute only a given set of commands in the remote domain. No other network connection is open. No other computing capability is granted in such a case. The same benefits from avoiding "opening" the network via the "interlock" capability with the virtual network applies to other applications such as and not limited to GDB and VNC.

In this specific implementation, a pre-defined set of shell commands is associated with each server manager. The association can be enforced by the central web portal. The user access of Zshell is then offered through the front-end web browser and client manager. Once the Zshell client tool is connected to the Zshell daemon, the corresponding set of shell commands will be associated by the Zshell daemon to limit the tasks that can be executed by the user. Note that the server manager can be deployed in an access server, where the access server can be easily deployed anywhere inside a company network domain. The programmability of a specific set of commands (i.e., task execution) can be dynamically inserted anywhere inside a corporation for business needs and made available to external guests without compromising security.

In various specific implementations, a novel platform is provided for secure remote access, operation, debug, and collaboration. GDB Debug, VNC Access and Collaboration, and Zshell Secure Access are some examples of client-server applications that can be locked on this platform to support secure functions and features for enterprise remote operations. It should be appreciated, however, that the merits of this platform and technology are not limited to the presented functions and features. The design principles and aspects discussed in this patent application can be applied to many other client-server applications that can be integrated and locked on this platform and achieve business benefits.

To support a fairly complex operations scenario, multiple features on this secure remote access platform can be applied and used in a mixed format. Multiple access servers with different features selected and enabled can be offered in parallel and to users with different role and privilege.

Figure 13:
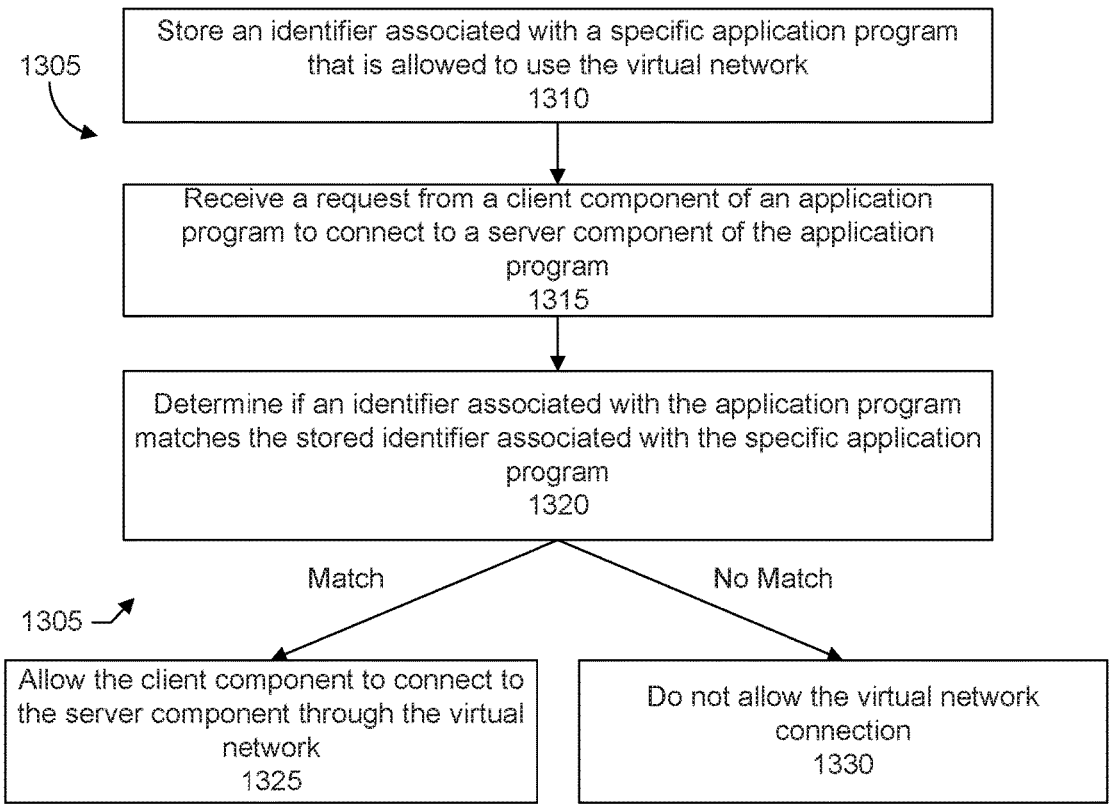
FIG. 13 shows a flow diagram of an "interlock" mechanism of the secure virtual network platform.

FIG. 13 shows an overall flow 1305 of a specific implementation of the "interlock" mechanism. In a step 1310, the system stores an identifier or predetermined identifier associated with a specific application program (or a specific version of the application program) that is authorized or allowed to use the virtual network. The identifier may be calculated by the system. Alternatively, the identifier may be calculated using an algorithm that is external to the system. The identifier can be any unit of data that helps to uniquely identify a particular version of the application program. In a specific implementation, the identifier includes a checksum associated with a particular version of the application program. An identifier for an application can include a signature, hash value, fingerprint, or combinations of these. In a specific implementation, the identifier may be provided to and stored at one or more end points in a network domain.

In a step 1315, a request is received from a client component of an application program to connect to a server component of the application program. For example, the request may be received at an end point module (e.g., client manager) at the end point.

In a step 1320, a determination is made by the respective client or server manager (see, e.g., FIG. 12) as to whether an identifier associated with the application program matches the stored identifier associated with the specific application program. If there is a match, in a step 1325, the client component may be allowed to connect to the server component through the virtual network. In a specific implementation, use of the virtual network is subject to further approval by the controller. In another specific implementation, use of the virtual network is allowed without further approval from the controller. This specific implementation can be desirable in cases where security is less of a concern than, for example, response time and network performance.

Alternatively, if there is not a match, in a step 1330, the client component is not allowed to connect to the server component through the virtual network. In other words, in a specific implementation, an identifier is associated with each application program authorized to use the virtual network. In a specific implementation, when the client application at the first end point in the first network domain attempts to connect to the server application at the second end point in the second network domain via the virtual network, a check is performed to determine if the application is authorized to use the virtual network. The check includes comparing an identifier associated with the application against the list of identifiers associated with the authorized applications (step 1320). If there is a match, a virtual network connection may be allowed between the two end points (step 1325). If there is not a match, the virtual network connection is not allowed (step 1330).

Consider, as an example, table L below. Table L lists the identifiers for application program versions shown in table C.

TABLE L

| Application | Version | Identifier |
|---|---|---|
| GDB Debug | 5.1.3 | ID1 |
| VNC Access and Collaboration | 10.7 | ID2 |
| Zshell Secure Access | 8.4.2 | ID3 |

The example data shown in table L shows the specific versions of the application programs that are authorized or allowed to use the virtual network. From the data above, the application "VNC Access and Collaboration" version 10.7 having the identifier ID2 is allowed use of the virtual network. A different version of the application (e.g., version 9.0) will have a different identifier, e.g., ID7. In this example, version 9.0 of the application will not be allowed to use the virtual network because the identifiers (ID2 and ID7) do not match.

As discussed above, the "interlock" mechanism helps to ensure that only specific applications (or specific versions of applications) will be able to use the virtual network. For example, an application program (e.g., GDB Debug, VNC Access and Collaboration, or Zshell Secure Access) may include functions, services, options, modules, or capabilities that an IT administrator wishes to disable or modify. The disablement or modification can be for any number of reasons. One reason can include security. For example, a function of an application program may be disabled to help prevent employees of the enterprise from using the function to steal sensitive corporate information. Another reason can include application performance. For example, a service of an application program may be disabled to reduce the application size or space requirements, to improve application response time, and so forth.

In another specific implementation, the system stores a list of identifiers associated with banned application programs or application programs that are not allowed to use the virtual network. In this specific implementation, a check includes comparing an identifier associated with the application against a list of identifiers associated with banned or unauthorized applications. If there is a match, a virtual network connection is not allowed between the two end points. If there is not a match, a virtual network connection is allowed between the two end points.

Figure 14:
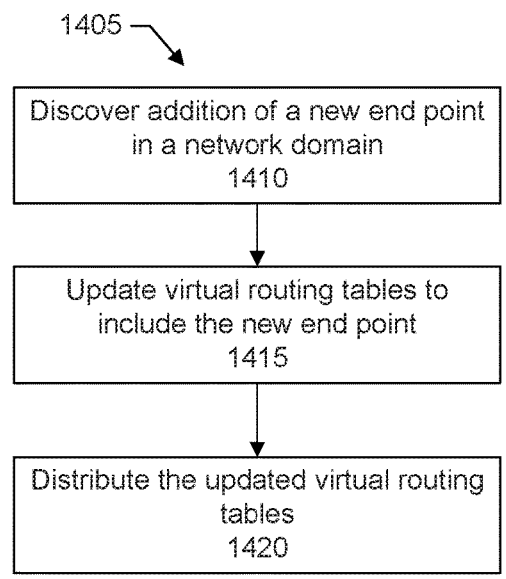
FIG. 14 shows a flow diagram for discovering a new end point in a network domain.
Figure 15:
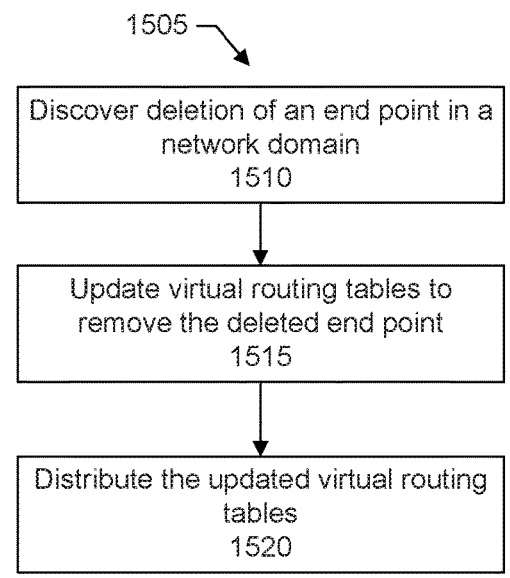
FIG. 15 shows a flow diagram for discovering a deleted end point in a network domain.

FIGS. 14-15 show flow diagrams for updating the virtual routing tables based on end point changes in a network domain. More particularly, FIG. 14 shows a flow 1405 when an end point is added in a network domain. In a step 1410, the system discovers an addition of a new end point in a network domain.

In a specific implementation, the discovery is facilitated through a cloud manager component of the controller. In this specific implementation, the cloud manager component provides a tool or an automated mechanism that the administrator uses to provision the network with a new end point such as a new virtual machine. The provisioning operation can include providing the new end point with the end point modules and appropriate application software such as, for example, the control daemon, virtual network proxy, client or server manager, and so forth. The end point module in the newly added end point may execute a set of instructions to notify the controller of its existence.

In another specific implementation, the end point may be created within a network domain that may belong to another authoritative entity. For example, the network domain may belong to a third-party cloud services provider. In this specific implementation, the controller includes a programmatic interface that communicates with an application programming interface (API) of the cloud service provider to discover the new end point and information about the new end point. The information can include, for example, an inventory of application programs that have been provided at the new end point, application version information, configuration information, and so forth.

The cloud manager tool can compare the inventory and configuration information of the newly provisioned end point with an approved inventory listing of applications and configurations. This check helps to ensure that the new end point has been provisioned with the appropriate application programs, application program versions, configuration settings, and so forth. If the new end point has not been properly provisioned, the system may prevent the addition of the end point to the virtual network platform. Instead or additionally, the cloud manager tool may provide the new end point with the appropriate application software, configuration settings, end point modules, or combinations of these so that the end point module can be incorporated into the virtual network platform.

In a step 1415, the controller, upon discovering the new end point, automatically updates the virtual routing tables to include the new end point, inside the new end point as well as in other existing end points that relate to this new end point. For example, the controller may make an entry in a virtual routing table of an existing end point to include an IP address and a virtual IP address to connect to the new end point. The IP address can identify the new end point in the domain. The virtual IP address can identify the source device for packets originating from the new end point.

As an example, in the case of the first type of end point connection when adding a new end-point server, the system will add entries in the static virtual routing table that represents all other end-point servers in other network domains that this new server can connect to via the virtual network.

In a step 1420, the updated virtual routing tables are distributed throughout the virtual network platform. The previous virtual routing tables may then be replaced with the updated virtual routing tables.

FIG. 15 shows a flow 1505 when an end point is deleted from a network domain. In a step 1510, the system discovers the deletion of an end point in a network domain. The method of discovery may be similar to the method described in step 1410 (FIG. 14). For example, in a specific implementation, deletion of the end point may be through the cloud manager component of the controller. In this specific implementation, the cloud manager may include a user interface that allows the administrator to identify and delete a particular end point.

In a case where the end point is created in a network domain of a third-party cloud services provider, the cloud manager provisioned by the provider may notify the controller of the deletion. The notification may be a message, email, or other alert. The deletion may be under the direction of the controller or is executed by the external cloud manager. For example, the controller may programmatically (e.g., through an API) instruct the cloud services provider to delete, remove, deactivate, or disable an end point if it is under the direction of the controller.

In a step 1515, the controller, upon discovering that an end point has been deleted from the network domain, automatically updates the virtual routing tables to remove the deleted end point. For example, the controller may remove entries in the virtual routing tables that reference or are associated with the deleted end point.

As an example, in the case of the first type of end point connection, when deleting an end point, the system deletes this end point server and deletes the corresponding entry in all other end point servers. When the application client software is using the virtual network for a connection, the system will then generate an entry in the dynamic virtual routing table where each entry includes more information or updated information as appropriate based on the end point changes.

In a step 1520, the updated virtual routing tables are distributed throughout the virtual network platform. The distribution may be similar to the process described in step 1420 (FIG. 14).

The flow for adding and deleting end points or end point servers accommodates the "application interlock" checking mechanism. As discussed above, in a specific implementation, the system includes a "client manager" that can also control the validated application client and server software. In this specific implementation, when the application client software is triggering the "dynamic virtual routing table", the system will ask or request the client manager to check in the operating system (OS) if the application client software that is creating the network traffic is the one validated by the system. Only the validated applications are allowed when using VNP and the virtual network.

Referring now to FIGS. 5, 7-8, and 10-11A, the architecture of the virtual network platform shown in these figures offers a number of benefits and advantages. In a specific implementation, a controller cluster can be implemented to support control path connections to a very large amount of end points. There can be a master controller that implements and maintains security policy (write and read) in the central database. Cluster controllers may implement read-only function for security policy and connect to end points for policy enforcement. In a specific implementation, one controller can connect to multiple virtual network switches in parallel. However, each VNS may connect to only one controller.

A virtual network switch cluster can be implemented to support virtual network connections to a very large amount of end points. In a specific implementation, a VNS is considered as a "slave device" fully controlled by the controller. In this specific implementation, the VNS does not include security intelligence. All security policies are implemented and controlled by the controller. In a specific implementation, there is no inter-dependency among VNS clusters. The lack of interdependency eases scalability. Load balancing can also be easily implemented.

In a specific implementation, a virtual network proxy includes a virtual network gate keeper on an end point that implements the virtual routing table and TCP proxy and reverse proxy functions. In a specific implementation, there is no intelligence for security policy. The VNP is responsible for encryption and decryption of the virtual network transport. The VNP works with and is controlled by the control daemon and client/server manager.

In a modern enterprise environment, the network and infrastructure security have complex requirements. It can be challenging to deploy a client-server application across such an environment without modifying the underneath infrastructure and setting. The secure virtual network platform as discussed in this patent application solves this problem without compromising enterprise security and compliance requirements.

In a specific implementation, the client-server application is provisioned at the virtual network layer and does not require opening the physical firewalls or changing the subnets or network topology underneath. The specific client-server application is provisioned in this virtual layer so that only a particular application is allowed to connect in this layer for security control. The security policy and provisioning setting is at a central control. All connections are automatically verified and executed end-to-end in a closed system. The burden of managing distributed components and assembling them together in a coherent framework is reduced.

The applications of such secure virtual network platform can be enormous. Any new business applications that need to be provisioned across a legacy environment can go to the virtual layer for ease of control, best or good productivity, fast time to market, and ease of security and compliance control. In today's market, many industry verticals are converging and becoming service oriented. There are more and more business collaborations and IT automations across enterprise boundaries. Such a secure virtual network can significantly expedite the business process provisioning and save costs.

As discussed above, hybrid cloud computing is another important application that can be benefited by this new technology. By definition the hybrid cloud infrastructure spans over multiple network domains with more than one authority. The computing resources in such an environment are dynamically created and deleted on demand. Efficiency in doing so is vital to the success of enterprise operations in a hybrid cloud. A virtual network layer is critical to provision various enterprise applications in such a hybrid cloud environment. It is extremely easy for enterprise IT to provision applications in the proposed virtual network platform. Once the application is provisioned, the virtual network connection and deletion are fully automated along with the dynamic provisioning of end points in the cloud.

Figure 16:
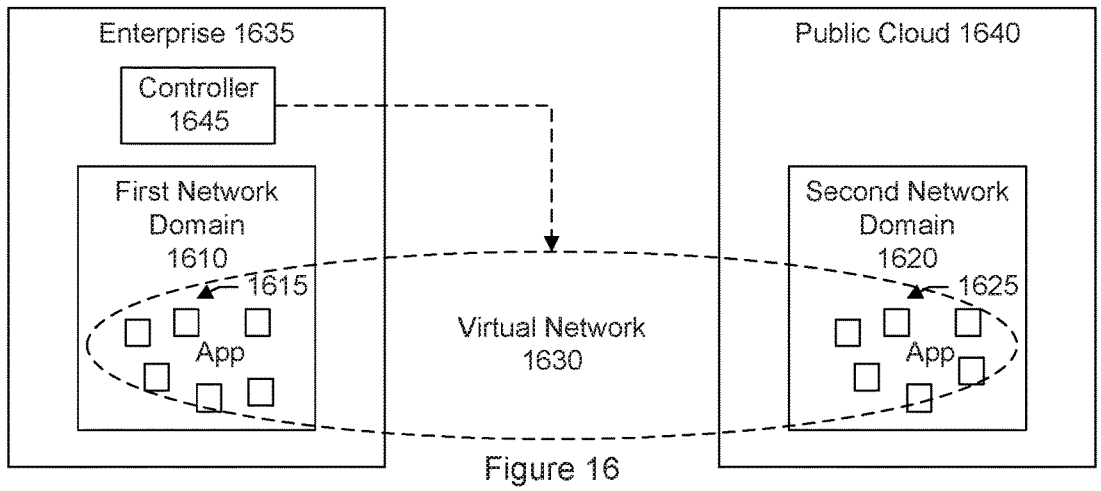
FIG. 16 shows an example of a deployment model for a secure virtual network platform.
Figure 17:
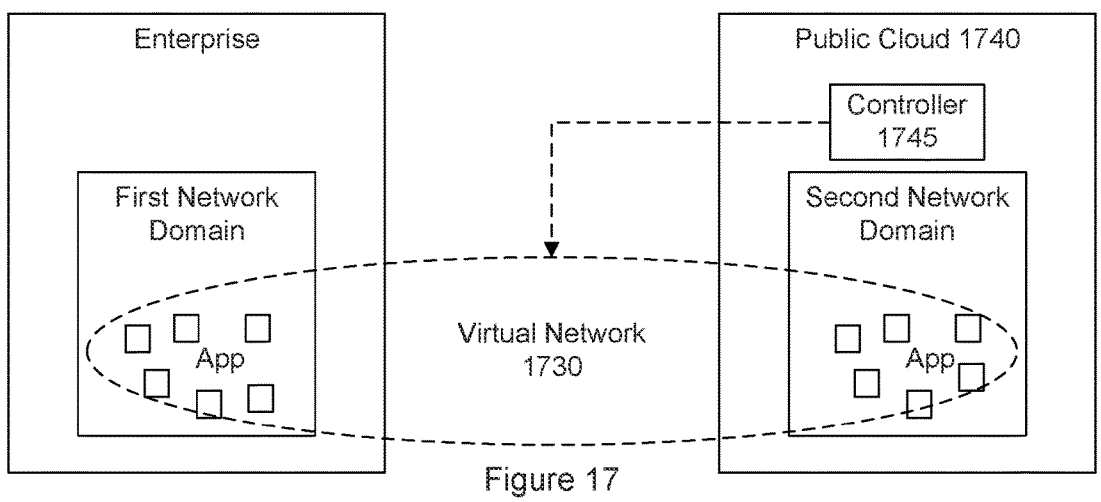
FIG. 17 shows another example of a deployment model for a secure virtual network platform.
Figure 18:
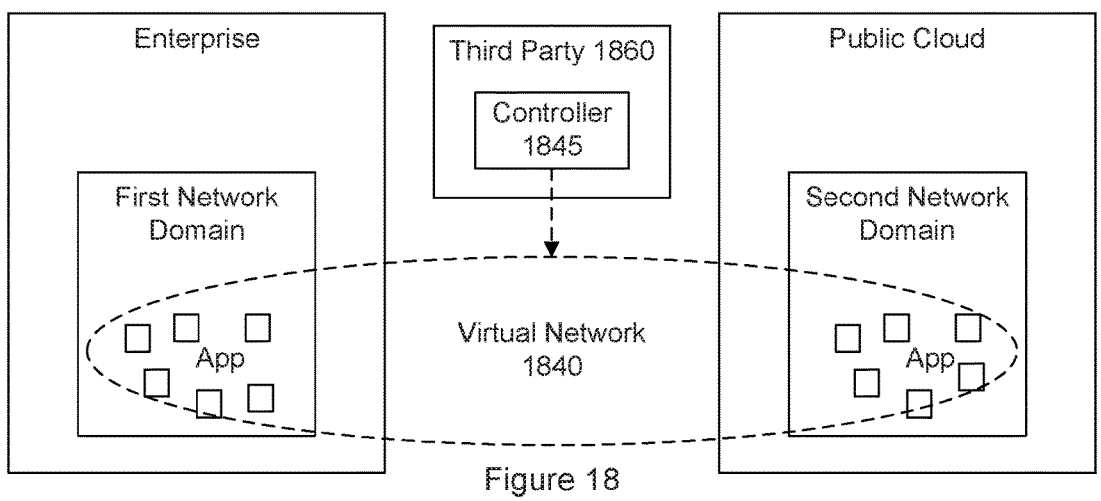
FIG. 18 shows another example of a deployment model for a secure virtual network platform.

FIGS. 16-18 show block diagrams of specific implementations of deployment models for the virtual network platform. FIG. 16 shows a first network domain 1610 including a first set of end points 1615, a second network domain 1620 including a second set of end points 1625, and a virtual network 1630 connecting the first and second end points. The first network domain is part of an enterprise 1635. The second network domain is part of a public cloud provider

1640. In this specific implementation, control 1645 of the virtual network is with the enterprise.

FIG. 17 shows another specific implementation of a deployment model for the virtual network platform. FIG. 17 is similar to FIG. 16. In FIG. 17, however, control 1745 of a virtual network 1730 is with a public cloud provider 1740.

FIG. 18 shows another specific implementation of a deployment model for the virtual network platform. FIG. 18 is similar to FIG. 16. In FIG. 18, however, control 1845 of a virtual network 1840 is with a third party 1860 that provides the services associated with the virtual network.

Referring now to FIG. 11A (step 1125), as discussed above, in a specific implementation, the static routing tables stored at the end points or end point gateways define the traffic that may be allowed to use the virtual network. It should be appreciated, however, that aspects and principles of the system can be applied to implement static routing tables that define traffic not allowed to use the virtual network. For example, in a specific implementation, there can be a static routing table that identifies, by IP address, data that is to be passed to the local TCP/IP network. In this specific implementation, data not having an IP address defined in the static routing table is transmitted through the virtual network.

Figure 19:
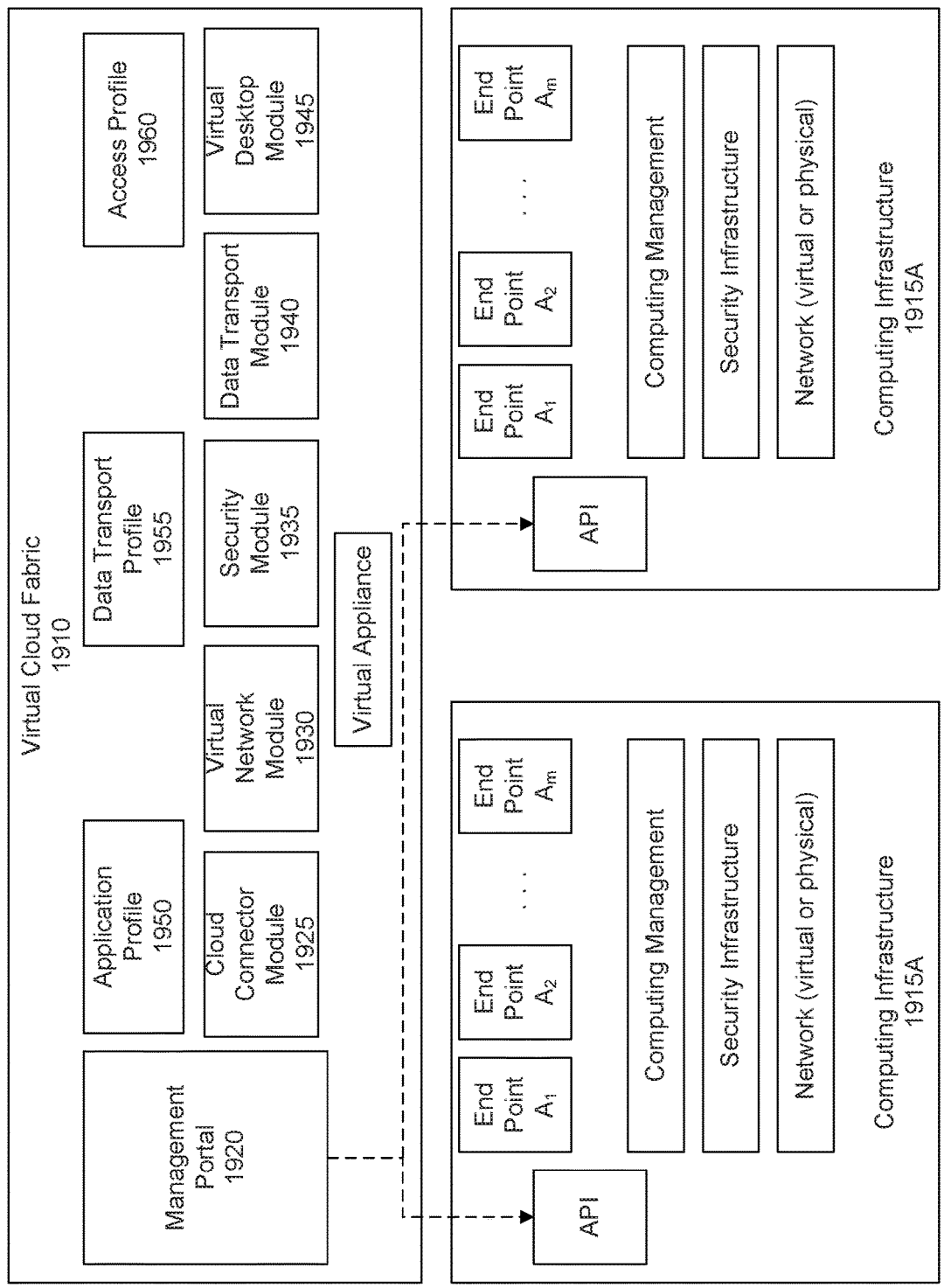
FIG. 19 shows a simplified block diagram of an architecture of a virtual cloud fabric connecting subnets in different network domains.

FIG. 19 shows a block diagram of a specific embodiment of the virtual network platform shown in FIG. 5. In this specific embodiment, the virtual network platform is referred to as a virtual cloud fabric or a cloud federation platform (CFP) 1910. In a specific implementation, the virtual cloud fabric is integrated with a system referred to as zNet 2.0 by Zentera Systems, Inc. of San Jose, Calif. Zentera provides hybrid cloud virtual infrastructure platform solutions to support enterprises extending private computing resources to public cloud datacenters, securely and on demand.

In a specific implementation, zNet can replace a virtual private network (VPN) and operates in the Zentera Virtual Cloud Fabric (VCF) without having to reconfigure any of the lower level infrastructures. For example, the enterprise on premise or cloud datacenter networks or firewalls do not need to change to support the virtual layer implementations. Typically, an enterprise will have an existing under layer infrastructure that was initially designed to meet a set of business goals. Over time, those business goals or business requirements can change. For example, the enterprise may acquire a new company, merge with another company, divest itself of a business unit, create a new business unit, open new branch offices, consolidate offices, and so forth. It can be very difficult and time consuming to reconfigure and merge the underlying physical network infrastructures to accommodate these changes especially when company operations are geographically distributed.

For example, there can be IP address conflicts, incompatible network hardware, different types of firewalls, differing outbound and inbound access rules, and different types of file servers—just to name a few examples. In order to meet a new set of business goals, the system provides a virtual layer infrastructure that can be added to address the new requirements without having to change or impact the existing design with the existing requirements. The virtual layer architecture as described in this patent application helps to significantly reduce corporate IT efforts and costs and facilitates operations in a dynamic business world.

In this specific implementation, zNet includes an "IP forwarding" architecture operating in a hybrid computing environment. The hybrid computing environment can include a physical network environment (e.g., enterprise) and a virtual network environment (e.g., IaaS public cloud), where the two are mixed with multiple instances. zNet operates on the top of the two or more network environments and provides support for easy provisioning, and full compatibility with legacy IT practices. In a specific implementation, the zNet architecture is considered as an OSI L3 device, supporting L4-7 services and is bi-directional. Specific aspects of the system are described with reference to the zNet product. It should be appreciated, however, that the system may be referred to using any name or identifier.

The virtual cloud fabric connects two or more different or separate network domains 1915A and 1915B. For example, each domain may be physically segregated away from another network domain by firewalls and the two domains can be managed by different network administration parties. Each network domain may include computing infrastructure that is separate from the computing infrastructure of the other domain. The computing infrastructure can include a computing management layer, a security infrastructure layer, and a network layer. The network layer can be a virtual network, a physical network, or a combination of a virtual and physical network. Application programming interfaces (APIs), allow communications to be exchanged between the two network domains via the virtual cloud fabric. The discussion above accompanying FIG. 4 provides some further detail and examples of network domains.

As shown in the example of FIG. 19, the virtual cloud fabric includes several modules and profiles that define the implementations of the virtual cloud infrastructure across multiple physical computing infrastructures. In a specific implementation, there is a management portal 1920, a cloud connector module 1925, a virtual network module 1930, a security module 1935, a data transport module 1940, and a virtual desktop module 1945. The profiles can include an application profile 1950, a data transport profile 1955, and an access profile 1960.

Customers can use the management portal to define and provision virtual infrastructures and security policies for a hybrid cloud environment all from a web browser. The features for the secure virtual infrastructure supported under the management module include cloud firewall, virtual network, data encryption and transport. The CFP allows customers to provision secure virtual infrastructures in any public, private and hybrid cloud datacenter, as well as in multiple physical network environments.

The management or provisioning portal also offers management and monitoring capabilities to the enterprise customers. Once the application profile, network provisioning, and security rule settings are defined in the portal, the management module maintains these infrastructure settings and automatically enforces the implementation and policies in dynamically generated components in the cloud. The module can also constantly monitor the cloud status and provide compliance logs for attempted security violations.

The virtual network provides a virtual WAN (Wide Area Network) that is agnostic to the lower layers of the network as well as the legacy enterprise firewall systems. The virtual network is implemented through software agents above the physical network and does not require changes to any of the network routing tables in either the enterprise datacenter or in the cloud. The software agents deployed by the virtual network have minimal or little resource overhead and, in an implementation, are only established when data is being transferred. Software agents provision the virtual network and connect to other system components forming the virtual WAN. Once the virtual WAN is setup applications use the network to connect with each other from remote locations.

The security module creates a peripheral firewall system in a multi-tenant cloud computing environment. Provisioned and controlled by enterprise customers the peripheral firewall system is a virtual shield where all cloud servers and their data flows are protected. The virtual shield may be referred to as a cloud chamber. In an embodiment, the cloud chamber is positioned at the application layer of the cloud solution stack, above the cloud orchestration layer. The peripheral firewall system is further described in U.S. patent application Ser. No. 14/190,019, filed Feb. 25, 2014, which is incorporated by reference along with all other references cited in this application.

The data transport module provides a data encryption and transfer system that is designed to meet the requirements in a hybrid cloud environment. In a specific implementation, a data transport profile is defined along with an application profile in a hybrid cloud environment that specifies how data is encrypted and transferred from local source to remote cloud servers and then from cloud servers to the destination backup system. An encryption key is generated by the system for each profile and owned by the enterprise. This design allows the enterprise to protect their data in the cloud, and even cloud service providers cannot decode the data.

In a specific implementation, the data transport module defines two data transfer paths—upload and download. The data on each path is forward synchronized in and out of the cloud automatically based on a frequency defined by users. The module allows users to define operating directories and all data and file structure within the path are maintained and forward synchronized. Regardless of how many files are placed under the operating directories, the module automatically checks the file version and executes the sync. This mechanism helps users to save a tremendous amount of effort in managing file revision control in the cloud. This mechanism also helps users to minimize or reduce the amount of data transferred to the cloud. Techniques to transfer data are further discussed in U.S. patent application Ser. Nos. 14/290,757 and 14/290,827, filed May 29, 2014, which are incorporated by reference.

In a specific implementation, the module includes a feature referred to as an application interlock. When the data is "at rest" inside the cloud, encryption may not be sufficient for security control. This is because the data is decrypted at the OS level before the application software running in the cloud can use it. This decrypted data in the OS is vulnerable to any malicious intent running in the OS. In this specific implementation, the application interlock feature further strengthens security by allowing decryption only by a predefined whitelist of application software (including OS commands) that are authorized to access the encrypted data. This technology blocks malicious attacks or even viruses from touching the data at the OS level. Under the interlock protection, an attack that has compromised the root of a VM will still not be able to access the encrypted data directly.

The virtual desktop module provides a virtual desktop infrastructure providing secure remote access via terminal display and virtual firewalls for protecting sensitive IP. The module provides a single point of security control and implements advanced features for user and command whitelisting, export control and compliance.

In a specific implementation, rules are applied to the agents and edge gateways. In an embodiment, an agent may be referred to as a Zentera Server Agent (ZSA) and an edge gateway may be referred to as a zNet EG (Edge Gateway). These devices can be similar, but may have different functions being turned on or off and may have different programmability. The agent (e.g., ZSA) is responsible for forwarding and receiving packets between a host (virtual machine or physical server) and another host or gateway (e.g., zNet EG) on the virtual network (e.g., zNet virtual network). The edge gateway or zNet EG is responsible for bridging and forwarding packets between the physical subnet and the virtual or zNet virtual network.

In other words, in a specific implementation, there is the "zNet virtual network plane" and "physical network plane." On the "zNet virtual network plane," there can be multiple zNet subnets. ZSA is the software agent for a cloud server (virtual machine or physical server). ZSA allows a server to communicate with another server or zNet EG via the zNet virtual network. zNet EG is a gateway that "bridges" the TCP/IP traffic between a zNet virtual network plane to a physical network plane. For example, when a ZSA (cloud server) needs to connect to another server that is not on the zNet virtual network, then the ZSA connects to a zNet EG and then forward the packets to the server that is not on the zNet virtual network. In a specific implementation, the largest subnet (virtual or physical) supported by the system is /24 and the total subnets supported per virtual cloud fabric (VCF) implementation (or per application profile) is 256. In another specific implementation, the subnet supported can be much larger than /24. The subnet supported can be greater than /24 or less than /24 (e.g., /30, /29, /28, /27, /26, /25, /23, /22, /21, /20, /19, /18, /17, or /16).

In a specific implementation, the system supports a use model where a subnet can be designed by user. IP assignment is automated by an engine of the system for a virtual subnet. The system provides a solution to detect a network address collision for the virtual network design. In particular, the virtual network architecture helps to assure no IP collision across the VCF.

For example, in other systems user programming error can cause IP address collisions. There can be conflicts between physical addresses which are governed by the underlying network design. Problems with overlapping IP addresses can occur when a company A acquires another company B and wishes to integrate the two networks. The networks of both companies may have a system with the same IP address, e.g., "10.x.y.z." The extent of IP address overlap can range from a single IP address to entire subnets of hundreds of IP address. Connecting the two networks through a VPN can require an extensive amount of reconfiguration.

As discussed above, the virtual network can include many virtual subnets. For example, a virtual network may include 1, 2, 3, 4, 5, 10, 20, 30, 40, 50, 60, or more than 60 virtual subnets. The virtual subnets are all on the virtual network plane, but they are not necessarily connecting together via one physical network because they may belong to different physical network domains.

Figure 20:
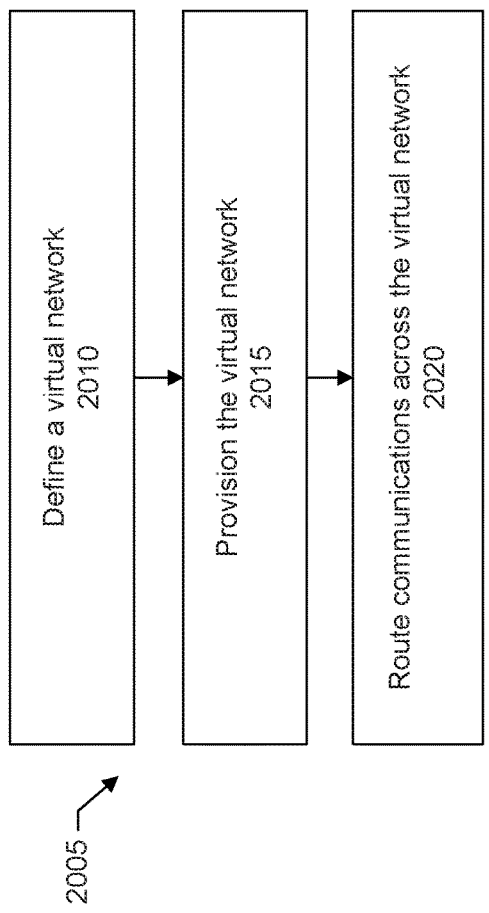
FIG. 20 shows an overall flow diagram of configuring and operating the virtual cloud fabric.

FIG. 20 shows an overall flow 2005 for connecting, through the virtual cloud fabric network, subnets in different or remote network domains. In a step 2010, a user (e.g., administrator) uses the system to define the virtual network with virtual network subnets, physical network subnets, and potential components (definition only, no instances yet) that are required to implement such a virtual network.

The defining may include identifying the two network domains (physical or virtual) to be connected by the virtual network. More particularly, defining may include identifying the server groups or subnets in the domains to be connected. Defining the subnets can be performed before end points or machines (e.g., physical machines, virtual machines, or both) have been assigned or provisioned into the subnets. Defining the subnets before IP addresses have been assigned to specific end points in the subnet helps to avoid conflicts.

A subnet is a logical grouping of IP addresses for connected network devices. Network designers employ subnets as a way to partition networks into logical segments for greater ease of planning and administration. For example, a subnet may represent all the devices at a particular geographic location, building, floor, department, and so forth. Dividing an organization's network into subnets allows the organization to easily manage the implementation and policy for network design, and they are useful for performance and security.

Generally, an IP address includes two parts. A first part of the IP address includes the network part. The network part specifies the unique number assigned to the network and identifies the class of network assigned. A second part of the IP address includes the host part. The host part is the address that is assigned to each host. The host part uniquely identifies the machine on the network. For each host on the network, the network part of the address will be the same, but the host part is different. For example, the network part of the IP address "129.144.50.56" is "129.144." The host part of the address is "50.56."

Networks with large numbers of hosts are sometimes divided into subnets. A portion of the host part of the IP address can be used to identify the subnet. In this case, an IP address includes three parts. The first part includes the network number. The second part includes the subnet number. The third part includes the machine or host number. A specific subnet can be identified by a portion of the bits of the host part of the IP address. Devices on a subnet share contiguous ranges of IP address numbers. A mask (known as the subnet mask or network mask) defines the boundaries of an IP subnet. A subnet is a portion of a network that shares a common address component. On TCP/IP networks, subnets are defined as all devices whose IP addresses have the same prefix. For example, all devices with IP addresses that start with 100.100.100 are part of the subnet 100.100.100.0 with subnet mask 255.255.255.0.

The definition stage can further include generating the appropriate routing tables, mapping information, and rules that will be used to route or forward communications (e.g., data packets) between the subnets in the network domains.

In a step 2015, the virtual network is provisioned. For example, a machine can be assigned to implement a specific virtual edge gateway (e.g., zNet EG Edge Gateway) that connects the virtual network (e.g., zNet virtual network) to a specific physical subnet. Machines may be assigned to the various subnets in the network domains. Virtual IP addresses may be assigned to the machines so that packets can be routed via the virtual network (e.g., zNet virtual network), instead of the physical network. Machines such as a virtual machines may be leased or rented from a cloud services provider. The machines may then be configured as desired with the appropriate software, settings, components, and resources.

In a step 2020, communications are routed between the subnets and across the virtual network as appropriate. For example, as discussed above, in some cases it may or may not be appropriate to route a communication using the virtual network. If the communication should not be forwarded through the virtual network, the communication is passed outside the virtual network such as to the local TCP/IP physical network.

Figure 21:
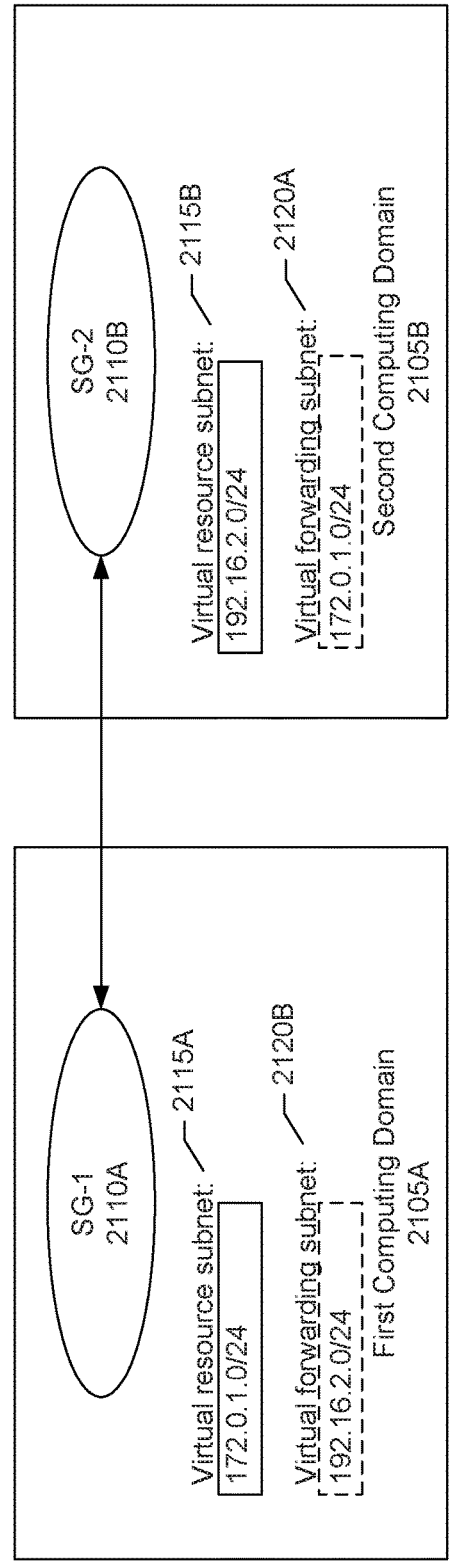
FIG. 21 shows an architecture for a first type of connection involving connecting a server group to another server group.

FIG. 21 shows a simplified block diagram of a first type of virtual network connection that includes connecting a server group in one domain with a server group in another domain. A specific implementation of the virtual network connection is referred to as a type 1 zNet virtual network connection. As shown in the example of FIG. 21, there is a first computing domain 2105A and a second computing domain 2105B.

A "domain" can be virtual or physical. A domain may be referred to as a "computing domain," or a "cloud domain." In a specific embodiment, the zNet "virtual network" or "virtual network plane" can cover both computing domains. A type-1 zNet can connect server groups in the two computing domains or cloud domains. A "plane" can indicate a "virtual network plane," "physical network plane," or both. In a specific embodiment, the (zNet) type-1, type-2, and type-3 are virtual networks that connect server groups to server groups, server groups to a virtual edge gateway, or virtual edge gateway to virtual edge gateway. In other words, a "domain" can refer to a computing infrastructure, either virtual or physical. A "cloud domain" is simply a generic name that may be used to indicate a cloud computing environment. A domain (computing infrastructure) can include computing, networking, storage, security, data transport, and so forth. In a specific embodiment, zNet is a virtual network that connects resources from cloud domains to cloud domains.

The first computing domain includes a first server group SG-1 2110A. The first server group is associated with a virtual resource subnet 2115A having addresses "172.0.1.0/24" (i.e., 255 routable IP addresses). The second computing domain includes a second server group SG-2 2110B. The second server group is associated with a virtual resource subnet 2115B having addresses "192.16.2.0/24." The server group can be a logical set or grouping defined by the system.

In a specific implementation, forwarding subnets are used to exchange communications between the server groups. Conceptually, the forwarding subnets may function as proxies to receive a communication from one machine in a subnet and forward the communication to another machine in another subnet. The forwarding subnet functions as if the two server groups were physically located in one computing domain. Note that the virtual forwarding subnet does not need to be routable in the physical network of the computing domain that the virtual forwarding subnet is assigned to.

Figure 22:
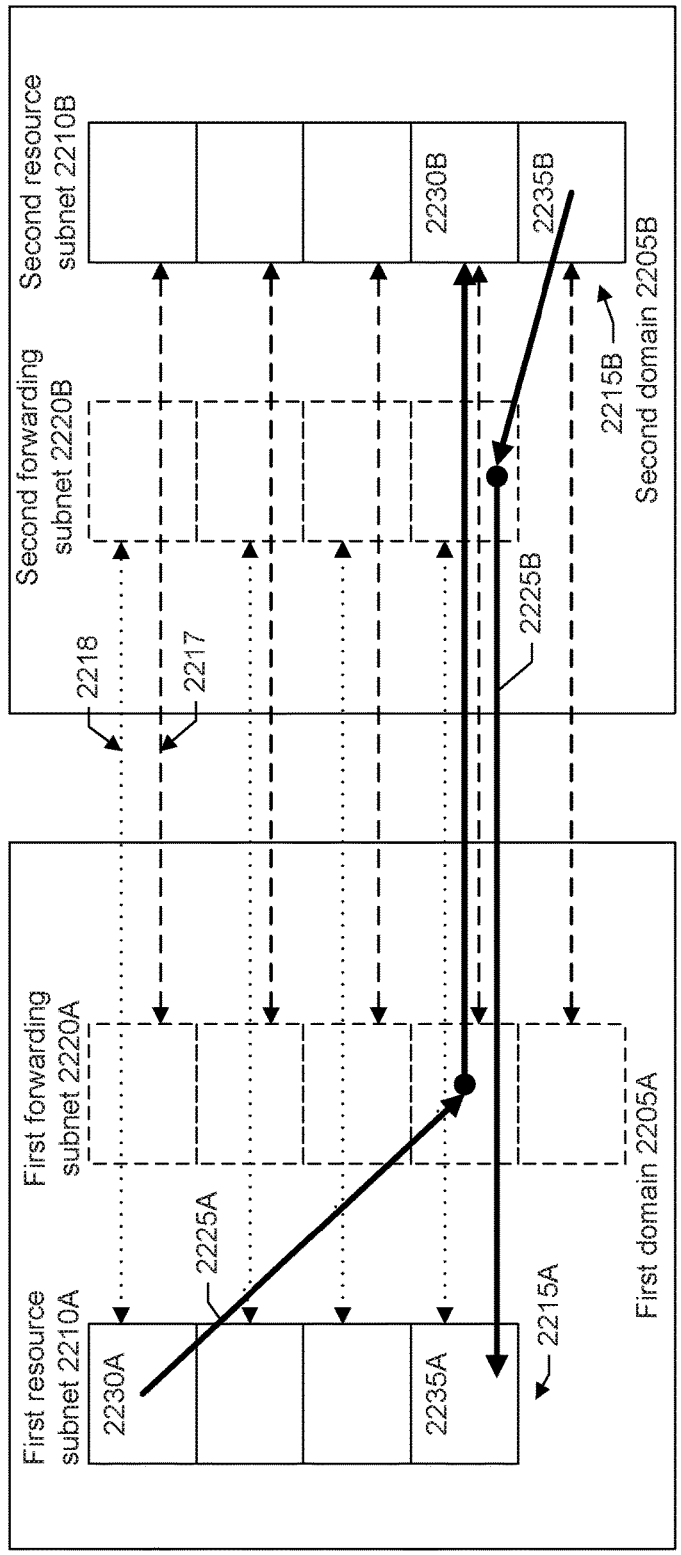
FIG. 22 shows a block diagram of forwarding subnets.

FIG. 22 shows a schematic diagram showing the operation of the forwarding subnets. A first domain 2205A includes a first resource subnet 2210A. The first resource subnet includes a first set of machines 2215A. In this example, there are four machines in the first set of machines as represented by the four boxes.

A second domain 2205B includes a second resource subnet 2210B. The second resource subnet includes a second set of machines 2215B. In this example, there are five machines in the second set of machines as represented by the five boxes. The number of machines in the first subnet may be different from or the same as the number of machines in the second subnet. The number of machines in the first subnet may be greater or less than the number of machines in the second subnet. That is, it is not necessary that there be a one-to-one correspondence between the first and second set of machines in the resource subnets.

The first domain includes a first forwarding subnet 2220A that represents or corresponds to the second resource subnet. For example, in a specific implementation, a size of the first forwarding subnet is the same as the size of the second resource subnet. That is, the number of IP addresses available within the first forwarding subnet is equal to the number of IP addresses available in the second resource subnet.

There can be a one-to-one correspondence between the first forwarding subnet and the second resource subnet as shown by broken dashed lines 2217. The first forwarding subnet can provide a destination to which communications from the first resource subnet can be sent.

For example, a line 2225A shows a forwarding or routing path of a communication from a first machine 2230A in the first resource subnet of the first domain to a second machine 2230B in the second resource subnet of the second domain. As shown in this example, the path is from the first machine in the first resource subnet to the first forwarding subnet to the second machine in the second resource subnet of the second domain.

Likewise, the second domain includes a second forwarding subnet 2220B that represents or corresponds to the first resource subnet. Broken dotted lines 2218 show the one-to-one correspondence between the second forwarding subnet assigned to the second domain and representing the first resource subnet. A line 2225B shows a forwarding or routing path of a communication from a third machine 2235B in the second resource subnet of the second domain to a fourth machine 2235A in the first resource subnet of the first domain. The path is from the third machine in the second resource subnet to the second forwarding subnet to the fourth machine in the first resource subnet of the first domain.

The forwarding subnets may be implemented using tables, lookup tables, arrays, trees, or any other data structure as appropriate. Such a data structure or information may be stored such as stored in memory. In a specific implementation, the forwarding subnets are programmed in a ZSA or zNet EG for zNet virtual network routing or forwarding. Specifying the forwarding subnets indicate the destinations that may be reached using the virtual network platform.

Referring now to FIG. 21, in a specific implementation, the system can provide a default value for the virtual resource subnets. The default value can be changed, programmed, or overridden by the user. Virtual forwarding subnets 2120B and 2120A can be automatically implied or specified by the system. In a specific implementation, the virtual forwarding subnet can be specified by the user.

In other words, in a specific implementation, the virtual resource subnet per server group is programmed by the user. The system can provide a recommended subnet (e.g., "172.16.0.0/24"). This helps to ensure that user programming does not cause an IP address collision with either the virtual network or the physical network. That is, the virtual forwarding subnet may be automatically specified or implied by system or filled by the user.

In FIG. 21, the subnet address values enclosed by boxes drawn using broken lines indicate forwarding addresses that are automatically specified by the system. Subnet address values enclosed by boxes drawn using solid lines indicate default addresses that a user can program. In a specific implementation, a network address translation (NAT) function is embedded via the virtual network forwarding function because the forwarding subnet may be different from the resource subnet in the remote domain. The system can provide for automatic IP address assignment out of the provisioned subnet as a result of adding or deleting a cloud server.

Figure 23:
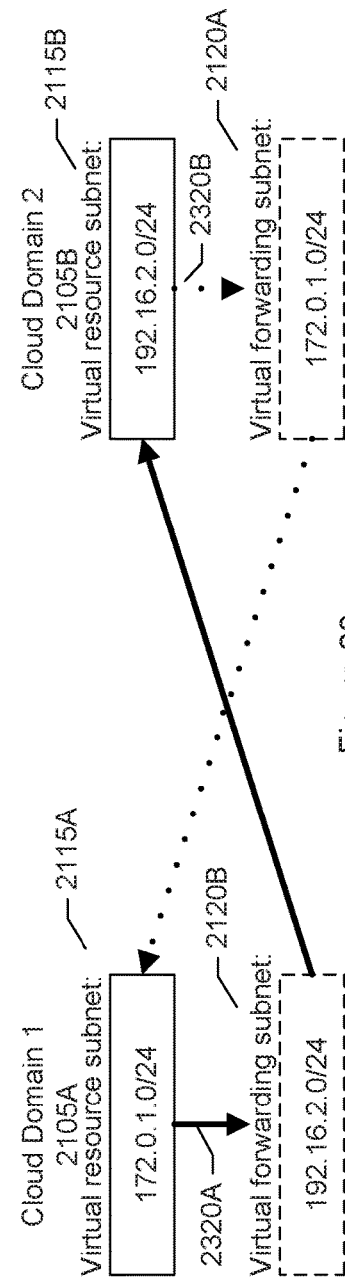
FIG. 23 shows an example for programming the system for the first type of connection.

FIG. 23 shows an example of programming the system based on a type 1 connection. The programming can be accomplished through the management portal of the system. First cloud domain 1 2105A includes the first server group associated with virtual resource subnet 2115A having the value "172.0.1.0/24." Second cloud domain 2 2105B is associated with virtual resource subnet 2115B having the value "192.16.2.0/24."

In a specific implementation, the system recommends or provides the user with a default virtual resource subnet value (which is different from the physical network subnet at the under layer of cloud domain 1). The user or customer may override or program the default subnet. In FIG. 23, a subnet input box having a solid line indicates a value that is recommended by the system and that the user can program. A subnet box having a broken line indicates a value that is specified automatically by the system.

For example, for virtual resource subnet 2115A, the system can automatically provide or specify a value for virtual forwarding subnet 2120B ("192.16.2.0/24"). Similarly, for virtual resource subnet 2115B, the system can automatically provide or specify a value for virtual forwarding subnet 2120A ("172.0.1.0/24"). In this example, the values for the virtual forwarding subnet and corresponding virtual resource subnets are the same because the connection is a type 1 connection (server group to server group). Again, the virtual forwarding subnets do not need to be routable in the local physical network in the cloud domain, as they are only used for routing in the virtual network plane or zNet virtual network plane.

A first routing path 2320A is from virtual resource subnet 2115A to virtual forwarding subnet 2120B to virtual resource subnet 2115B. A second routing path 2320B is from virtual resource subnet 2115B to virtual forwarding subnet 2120A to virtual resource subnet 2115A.

Figure 24:
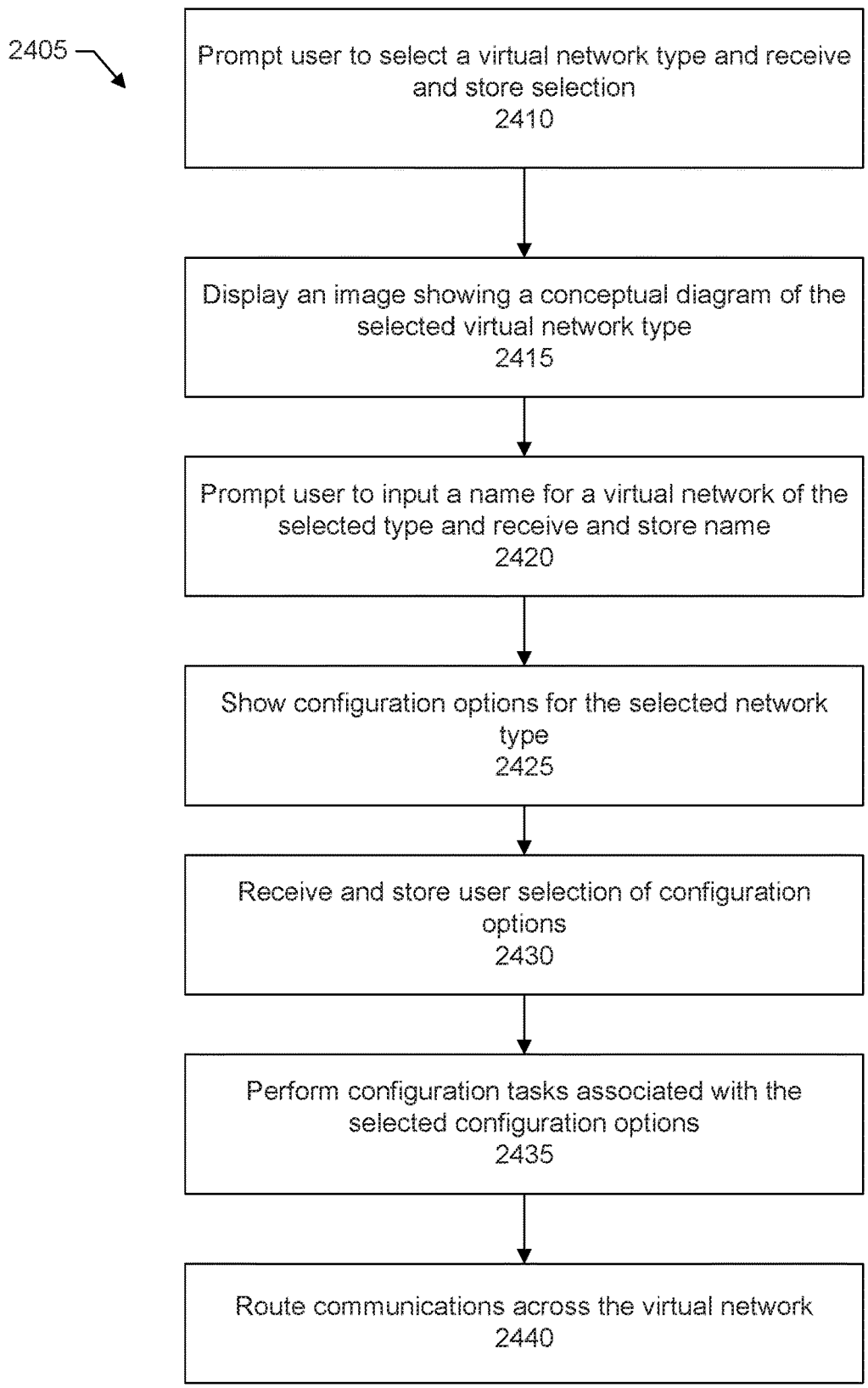
FIG. 24 shows an overall flow diagram for adding a virtual network.

FIG. 24 shows an overall flow 2405 of a specific implementation for adding and defining a virtual network to connect network domains. In this specific implementation, the system provides a tool that a user can use to define the machines, components, devices, server groups, or subnets of the domains that the user wishes to connect. The tool includes a wizard having graphical user interface that the user uses to interact with the system. The wizard prompts the user with a series of easy-to-answer questions to help guide the user through the steps involved in adding and defining the virtual network. The wizard may be referred to as a setup assistant or virtual network setup assistant.

More particularly, in a step 2410, the system prompts a user to select a virtual network type. In a specific implementation, there are three types of virtual networks available. A first type includes connecting a server group to another server group. A second type includes connecting a server group to a virtual edge gateway that connects to a physical network plane. A third type includes connecting two virtual edge gateways, each of which are connected to different physical network planes.

Upon receiving the selection of the virtual network type, the system shows the user a conceptual diagram or image of the selected virtual network type (step 2415). This helps the user to visualize the type virtual network that is being added.

In a step 2420, the system prompts the user input a name for the virtual network. In a step 2425, the system shows configuration options based on the selected network type. Depending upon the network type selected, the configuration options can include identifying the subnet and subnet address ranges to be connected, identifying the forwarding subnets, specifying the virtual edge gateways (EGs) and number of EGs, and the like. Further discussion is provided below. In a step 2430, the system receives and stores the user selection of the configuration options.

In a step 2435, the system performs configuration tasks associated with the selected configuration options. Configuration tasks can include, for example, identifying a machine instance to implement a specific virtual edge gateway, generating a virtual network device in the operating system of this virtual edge gateway that manages the virtual network bridge function, generating the virtual routing tables with the appropriate address and forwarding address entries, distributing the tables to the various network components (e.g., other edge gateways, or end points), associating the tables with the appropriate virtual network interfaces of the machines, and so forth.

In a step 2440, once the virtual network has been added and configured, and at least some end point instances (cloud servers, virtual edge gateways, or both) are provisioned to the system, communications (e.g., data packets) among the end points are routed or forwarded across the virtual network as desired.

Figure 25:
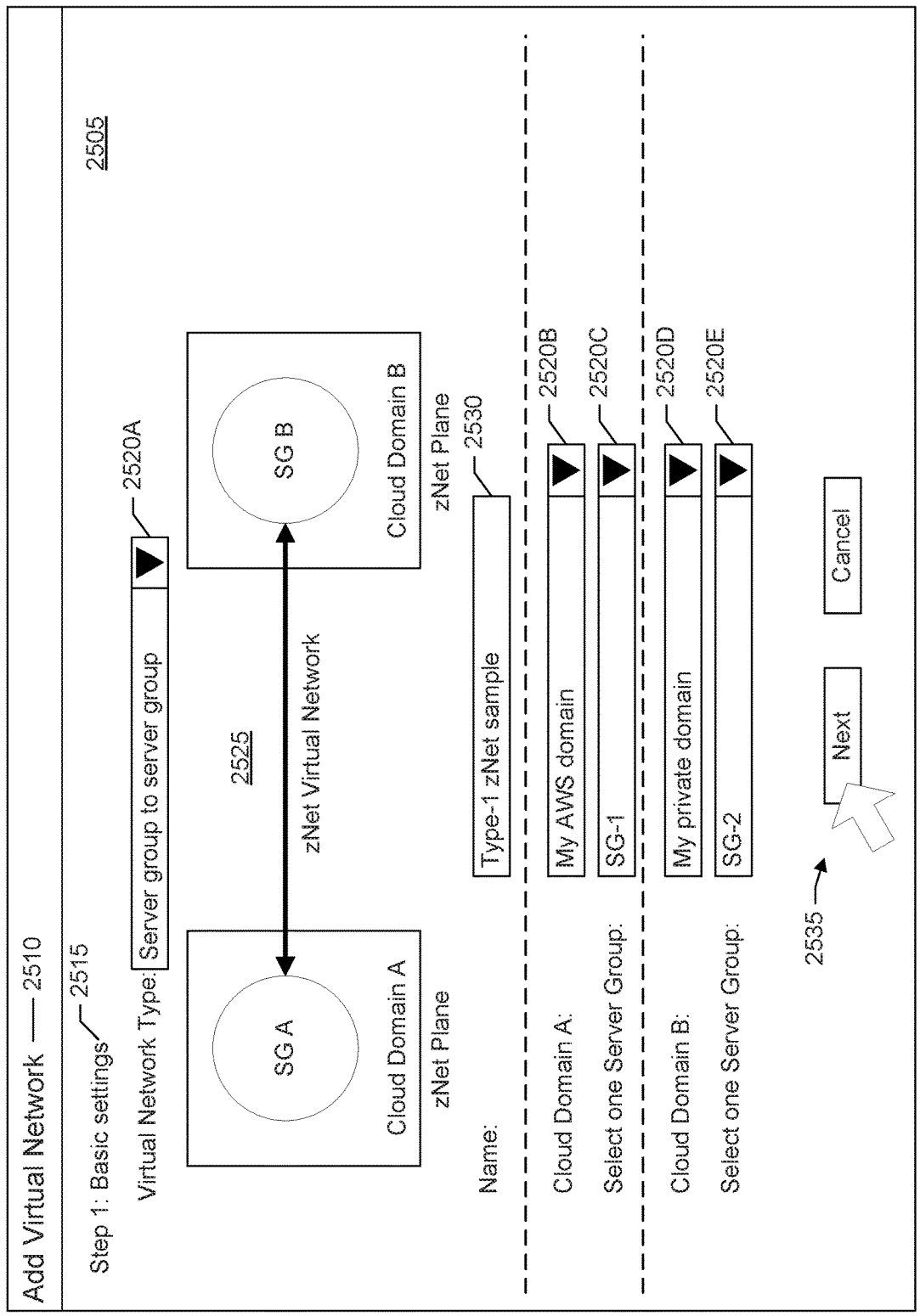
FIG. 25 shows a first dialog box of a wizard for adding a first type of virtual network connection.
Figure 26:
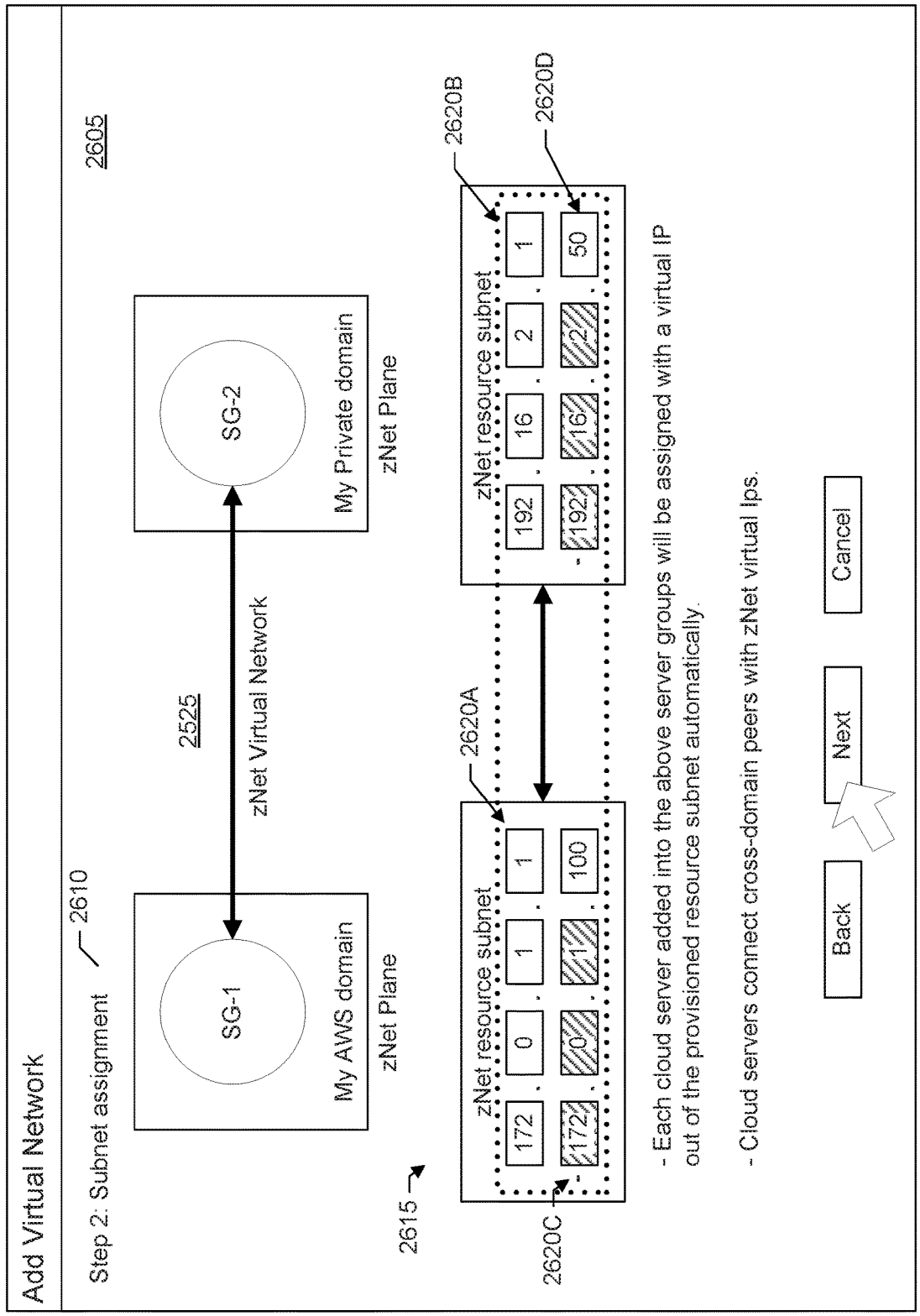
FIG. 26 shows a second dialog box for adding the first type of virtual network connection.
Figure 27:
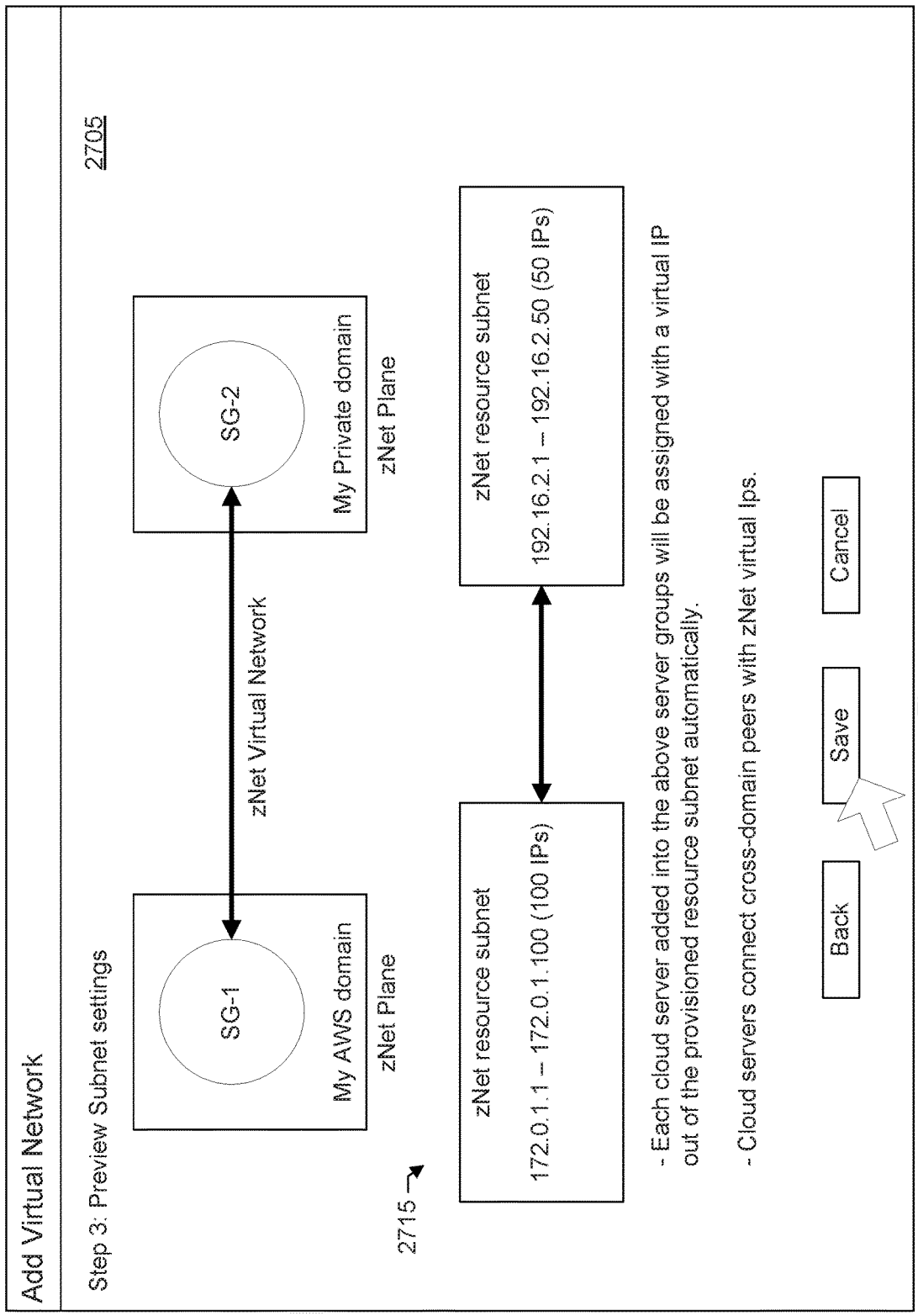
FIG. 27 shows a third dialog box for adding the first type of virtual network connection.

FIGS. 25-27 show specific implementations of a graphical user interface of a wizard tool for adding one routing rule for a virtual network of the first type (server group to server group). The interface may include GUI controls such dropdown menus, user input boxes, checkboxes, list boxes, buttons, or other control widgets, help text, links, and so forth. A user can use an input device such as a keyboard or mouse to make their selections.

The user interfaces shown in FIGS. 25-27 (and FIGS. 30-33, and 37-40) are merely specific examples of an implementation. One of ordinary skill in the art would recognize that there can be other variations, modifications, and alternatives. For example, there may be a set of radio buttons instead of a dropdown menu. Input boxes may be arranged differently from what is shown in the figures. Different labels for the input boxes may be used. In other specific embodiments, the interface may be a programmatic interface where the system receives input through an API. As another example, input may be supplied by uploading a file (e.g., Extensible Markup Language (XML) file or text file) having the specified configuration options.

FIG. 25 shows a first dialog box 2505 of the wizard. The first dialog box includes a title 2510, a step number 2515, dropdown menus 2520A-E, a region 2525, an input box 2530, and buttons 2535. The title includes a label "Add virtual network" to indicate that the user will be adding a virtual network. Step 2515 is the first step that includes configuring the basic settings for the selected network type. In this example, the user has selected from dropdown menu 2520A the first network type "server group to server group." Upon selecting the first network type, region 2525 shows an image of a conceptual diagram for the selected virtual network type.

Input box 2530 allows the user input a name for the virtual network (e.g., "Type-1 zNet sample"). Dropdown menus 2520B-C allow the user to select a first network domain ("My AWS (Amazon Web Services) domain") and a first server group ("SG-1") within the first network domain. Dropdown menus 2520D-E allow the user to select a second network domain ("My private domain") and a second server group ("SG-2") within the second network domain. Once the user has made the selections, the user can click the "Next" button to advance to the next step or click the "Cancel" button to start over.

FIG. 26 shows a second dialog box 2605 of the wizard upon the user selecting the "Next" button. A step 2610 is a second step in the process of adding a virtual network of the first type. The second step provides for "subnet design" or "subnet programming." Typically, during this phase there will not yet be a server instance in the subnet. IP assignment will occur when an end point (e.g., a VM or a cloud server instance) is created and allocated to the virtual network. A region 2615 shows the configuration or subnet programming options available for a type 1 connection.

Region 2615 includes first, second, third, and fourth sets of input boxes 2620A-D. Boxes without shading indicate default values that can be changed by the user. Boxes with shading indicate read-only values that are provided by the system. Again, it should be appreciated that FIG. 26 is merely an example of an implementation and the system is not limited to the example shown in FIG. 26.

The first set of input boxes allow the user to specify a first virtual resource subnet associated with the first server group. For example, the user can specify a beginning address of the subnet address range (e.g., "172.0.1.1"). Upon receiving the address, the system automatically shows in third input box set 2620C a portion of the ending address range identifying the subnet (e.g., "172.0.1"). The address is read-only. In other words, class A, B, and C are read-only. In this specific implementation, the system accepts an IPv4 address range with the same class C. The user can then specify an ending address. In this example, the subnet range ends at the machine or host having the IP address "172.0.1.100." Thus, a size or number of IP addresses in the first virtual resource subnet is 100.

Similarly, the second set of input boxes allow the user to specify a second virtual resource subnet associated with the second server group inside "My Private Domain." For example, the user can specify a beginning address of the virtual resource subnet address range (e.g., "192.16.2.1"). Upon receiving the address, the system automatically shows in fourth input box set 2620D a portion of the ending address range identifying the subnet (e.g., "192.16.2"). The user can then specify an ending address.

In this example, the subnet range ends at the machine or host having the IP address "192.16.2.50." Thus, a size or number of IP addresses in the second virtual resource subnet is 50. If a subnet address range is larger than 255, a second routing rule can be added to this same virtual network to cover an additional address range. The virtual network can include any number of routing rules.

In an embodiment, each cloud server added into the above server groups will be assigned with a virtual IP address from the provisioned resource subnet automatically. Cloud servers connect cross-domain peers with the system assigned virtual IP addresses.

The user can select the "Next" button to advance to the next step. FIG. 27 shows a third dialog box 2705. This dialog box displays a preview 2715 of the subnet settings. The user can review the virtual resource subnet programming and click "Save" to accept the virtual network configuration settings. Alternatively, the user can click "Back" to make changes or "Cancel" to cancel the addition of the virtual network.

Figure 28:
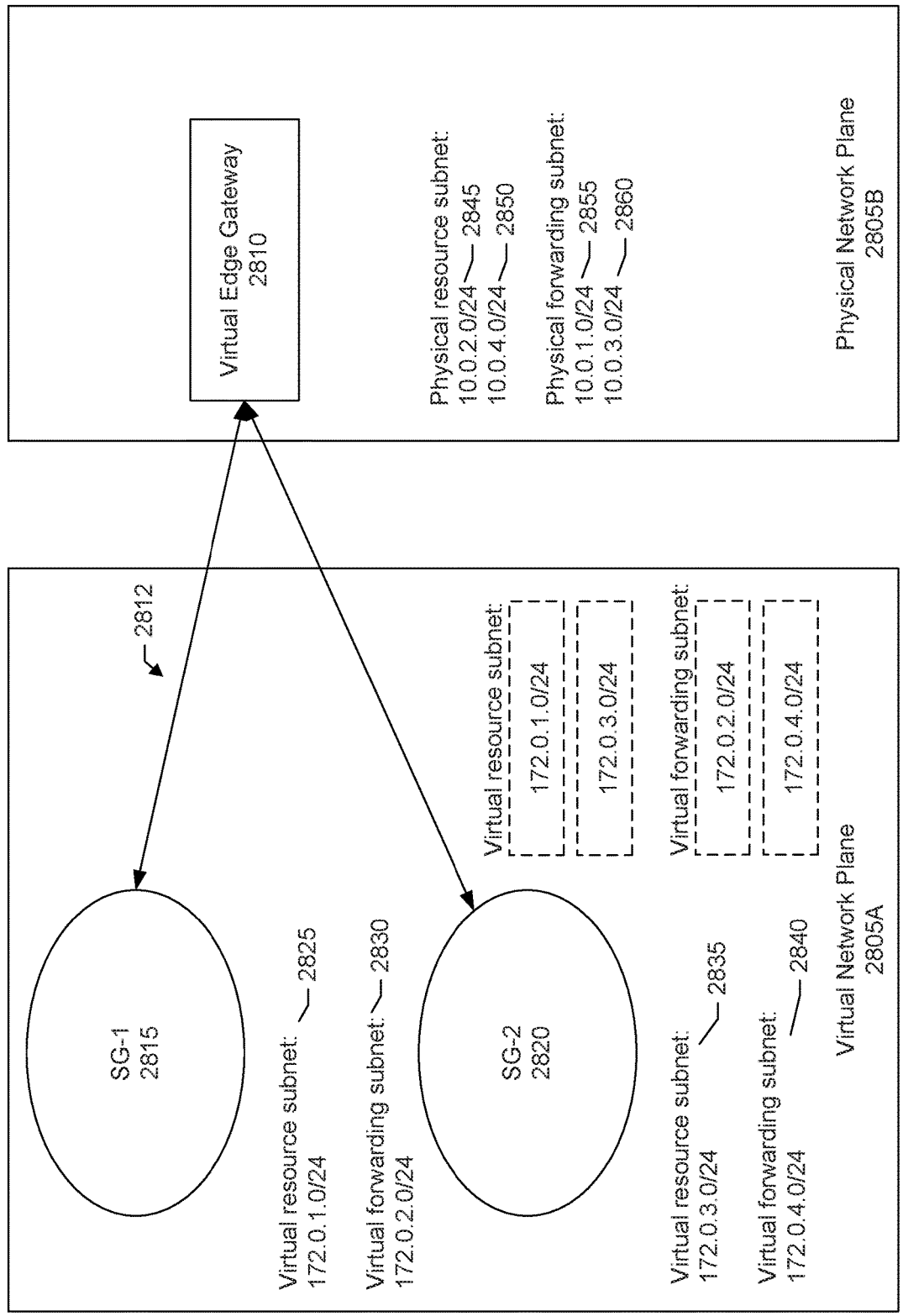
FIG. 28 shows an architecture for a second type of connection involving connecting a server group to a physical domain.

FIG. 28 shows a simplified block diagram of a second type of virtual network connection that includes connecting a server group in one domain to a virtual edge gateway (e.g., a zNet Edge Gateway) in another domain. In a specific embodiment, there are two kinds of "end points" in the virtual network described in this patent application. A first type of end point includes a cloud server. A second type of end point includes a virtual edge gateway (EG). The edge gateway may be referred to as a zNet Edge Gateway.

The edge gateway includes four types of subnets. The edge gateway functions as the IP forwarding "gateway" between the virtual network plane and the physical network plane. Conceptually, the EG is behaving like the "proxy" that represents the subnet or resources in the opposite network plane. When receiving the IP packets, the EG then forwards them to the destination in the opposite network plane, following the IP subnets specified in the subnet rules.

A first type of subnet is on the physical network plane and is referred to as the physical resource subnet. The physical resource subnet includes the physical IP addresses for servers in the physical network plane that the EG is able to connect to. For the IP packets coming from the virtual network plane, this subnet includes all allowed physical IP addresses that the packets can be sent to.

A second type of subnet on the physical network plane is the physical forwarding subnet. The physical forwarding subnet includes the physical IP addresses in the physical network plane that represent the cloud servers hosted in the virtual network plane. When servers in the physical network plane send IP packets to these physical IP addresses, the local TCP/IP network will route these packets to the EG, and the EG will "forward" these packets to the cloud servers in the virtual network plane.

A third type of subnet is on the virtual network plane and is referred to as the virtual resource subnet. The virtual resource subnet includes the virtual IP addresses for cloud servers in the virtual network plane that the EG is able to connect to via the virtual network (e.g., zNet). For the IP packets coming from the physical network plane, this subnet includes all allowed virtual IP addresses that the packets can be forwarded to.

A fourth type of subnet on the virtual network plane is the virtual forwarding subnet. The virtual forwarding subnet includes the virtual IP addresses in the virtual network plane that represent the servers in the physical network plane. When the cloud servers in the virtual network plane send IP packets to these virtual IP addresses, the virtual network (e.g., zNet) will "forward" these packets to the EG, and the EG will then "forward" these packets to the servers in the physical network plane.

The other type of end point is the cloud server. A "cloud server" can be a server or a VM in the cloud datacenter or in an enterprise environment. A "cloud server" can be on the edge of the virtual network as described in this patent application. A cloud server can connect to other cloud server(s), Edge Gateway(s), or both via the virtual network. The routing technology for the virtual network is based on a concept similar to the technique referred to as IP forwarding. However, a major differentiation includes, among others, the decoupling of the underlying network implementation and firewall systems. The virtual network system described in this patent application uses the underlying network fabric as the IP forwarding layer without changing the subnet design, routing tables, IP assignments, firewall settings, and other security configurations.

Subnet definitions for a "Server Group" (i.e., a group of cloud servers) may be as follows. On the virtual network plane there can be a virtual resource subnet and a virtual forwarding subnet. The virtual resource subnet includes the virtual IP addresses (which can be different from the physical IP addresses assigned to the resources at the underlying network fabric) for cloud servers in the Server Group in the first virtual network plane. The virtual forwarding subnet includes the virtual IP addresses, for virtual network routing purposes in the first virtual network plane, that represent the cloud servers in a remote Server Group in the second virtual network plane.

Generally, a Server Group does not "bridge" the virtual network to a physical network plane for IP routing or forwarding (i.e., is not an edge gateway), and therefore does not have a physical network plane property. A cloud server in a Server Group is able to have distinct application traffics (i.e., IP packets) via the virtual network plane and/or the underlying network fabric (i.e., the local TCP/IP network) concurrently. For example, the cloud server may send and receive data via the virtual network plane. The cloud server may send and receive data via the local TCP/IP network. The cloud server may send or receive data via the virtual network plane while sending or receiving data via the local TCP/IP network.

Referring now to the example shown in FIG. 28, a first network domain includes a virtual network plane 2805A. A second network domain includes a physical network plane 2805B. A virtual edge gateway 2810, physically located inside the second network domain, connects the virtual and physical network planes and forwards the packets from the virtual network plane to the physical network plane and vice versa as shown by arrows 2812.

The virtual network plane includes a first server group SG-1 2815 and a second server group SG-2 2820 connected to the gateway. The first server group is associated with a virtual resource subnet 2825 (e.g., "172.0.1.0/24") and a virtual forwarding subnet 2830 (e.g., "172.0.2.0/24"). The second server group is associated with a virtual resource subnet 2835 (e.g., "172.0.3.0/24") and a virtual forwarding subnet 2840 (e.g., "172.0.4.0/24").

The physical network plane includes physical resource subnets 2845 (e.g., "10.0.2.0/24") and 2850 (e.g., "10.0.4.0/24") and physical forwarding subnets 2855 (e.g., "10.0.1.0/24") and 2860 (e.g., "10.0.3.0/24"). In a specific embodiment, from the perspective of virtual edge gateway 2810, a virtual resource subnet is a virtual subnet that represents a remote resource in the virtual network plane. A virtual forwarding subnet is a virtual subnet that represents a remote resource in the physical network plane. A physical resource subnet is a physical subnet that represents a remote resource in the physical network plane. A physical forwarding subnet is a physical subnet that represents a remote resource in the virtual network plane. In this specific embodiment, "forwarding" for the virtual edge gateway (EG) is for IP forwarding "across" the network plane. The virtual resource subnet and the virtual forwarding subnet support the virtual network plane IP forwarding and routing. The physical resource subnet and the physical forwarding subnet support the physical network plane IP forwarding and routing. The virtual network plane IP forwarding and routing is provided by the virtual network platform technology. The physical network plane IP forwarding and routing is provided by the conventional or existing TCP/IP network.

In this example, there are two server groups and two physical resource subnets. It should be appreciated, however, that there can be any number of server groups and any number of physical resource subnets that can be connected by the virtual network platform.

In a specific implementation, resource subnets in both the virtual and physical domains are designed or specified by the user. The physical forwarding subnet is designed or specified by the user. During programming of virtual edge gateway 2810, the system can automatically identify and provide the values for the virtual resource and forwarding subnets, e.g., "172.0.1.0/24," "172.0.3.0/24," "172.0.2.0/24," and "172.0.4.0/24." IP assignment in the provisioned virtual resource subnet when adding or deleting a cloud server in a server group can be automatic.

Figure 29:
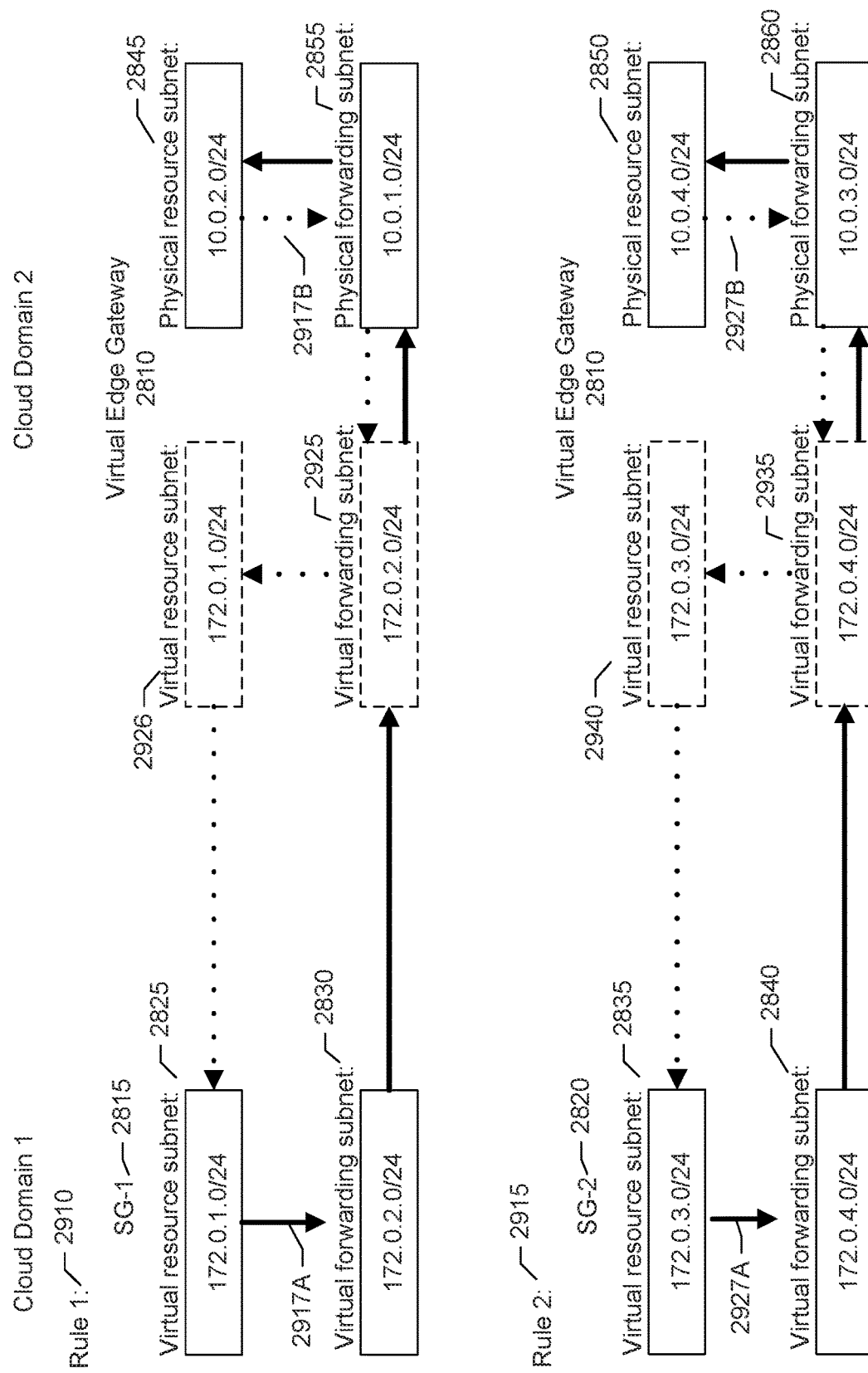
FIG. 29 shows an example for programming the system for the second type of connection.

FIG. 29 shows an example of programming the system based on a type 2 connection. This example includes first and second rules 2910 and 2915 defined for first and second server groups 2815, 2820, respectively. In this specific implementation, both rules are stored at the same virtual edge gateway 2810. That is, the virtual edge gateway is responsible for routing communications between the first server group and the first physical resource subnet and for routing communications between the second server group and the second physical subnet.

A subnet address box having a solid line indicates a value that is recommended by the system and that the user can program. A subnet address box having a broken line indicates a value that is specified automatically by the system. The virtual edge gateway can be programmed to map between the virtual resource subnets and the physical resource subnets. The mapping information allows the gateway to exchange communications between the server groups and physical resource subnets that are behind the gateway. That is, to receive communications from the server group and forward the communications to the physical resource subnet, and to send communications from the physical resource subnet to the server group.

More particularly, in this example, the first rule maps first virtual resource subnet 2825 to first virtual forwarding subnet 2830 which represents first physical resource subnet 2845. The mapping allows communications to be sent from the first to second domain or, more specifically, from the first server group to the first physical resource subnet. A line 2917A indicates a routing path of such a communication. In particular, the path is from first virtual resource subnet 2825 to first virtual forwarding subnet 2830, across the virtual network to a second virtual forwarding subnet 2925 associated with the virtual edge gateway and having the same subnet IP as first virtual forwarding subnet 2830, to first physical forwarding subnet 2855, and to first physical resource subnet 2845.

The first rule also maps first physical resource subnet 2845 to first physical forwarding subnet 2855 which represents the first virtual resource subnet. The mapping allows communications to be sent from the second to the first domain or, more specifically, from the first physical resource subnet to the first server group. A line 2917B indicates a routing path of such a communication. In particular, the path is from first physical resource subnet 2845 to first physical forwarding subnet 2855, to second virtual forwarding subnet 2925, to second virtual resource subnet 2926 associated with the virtual edge gateway and having the same subnet IP as first virtual resource subnet 2825, and across the virtual network to first virtual resource subnet 2825.

The second rule is similar to the first rule but applies instead to the second server group 2820 and second physical resource subnet 2850. In particular, the second rule maps third virtual resource subnet 2835 to third virtual forwarding subnet 2840 which represents second physical resource subnet 2850. The mapping allows communications to be sent from the first to second domain or, more specifically, from the second server group to the second physical resource subnet. A routing path 2927A is from third virtual resource subnet 2835 to the third virtual forwarding subnet 2840, across the virtual network to fourth virtual forwarding subnet 2935 associated with the virtual edge gateway and having the same subnet IP as third virtual forwarding subnet 2840, to second physical forwarding subnet 2860, and to second physical resource subnet 2850.

The second rule also maps second physical resource subnet 2850 to second physical forwarding subnet 2860 which represents third virtual resource subnet 2835. The mapping allows communications to be sent from the second to the first domain or, more specifically, from the second physical resource subnet to the second server group. A routing path 2927B is from second physical resource subnet 2850 to second physical forwarding subnet 2860, to fourth virtual forwarding subnet 2935, to fourth virtual resource subnet 2940 associated with the virtual edge gateway and having the same subnet IP as third virtual resource subnet 2835, and across the virtual network to third virtual resource subnet 2835.

FIGS. 30-33 show specific implementations of a wizard tool for adding a virtual network of the second type (server group to physical network). The steps and dialog boxes are similar to those for adding a virtual network of the first type (server group to server group) and shown in FIGS. 25-27. Thus, the following is generally limited to describing differences.

Figure 30:
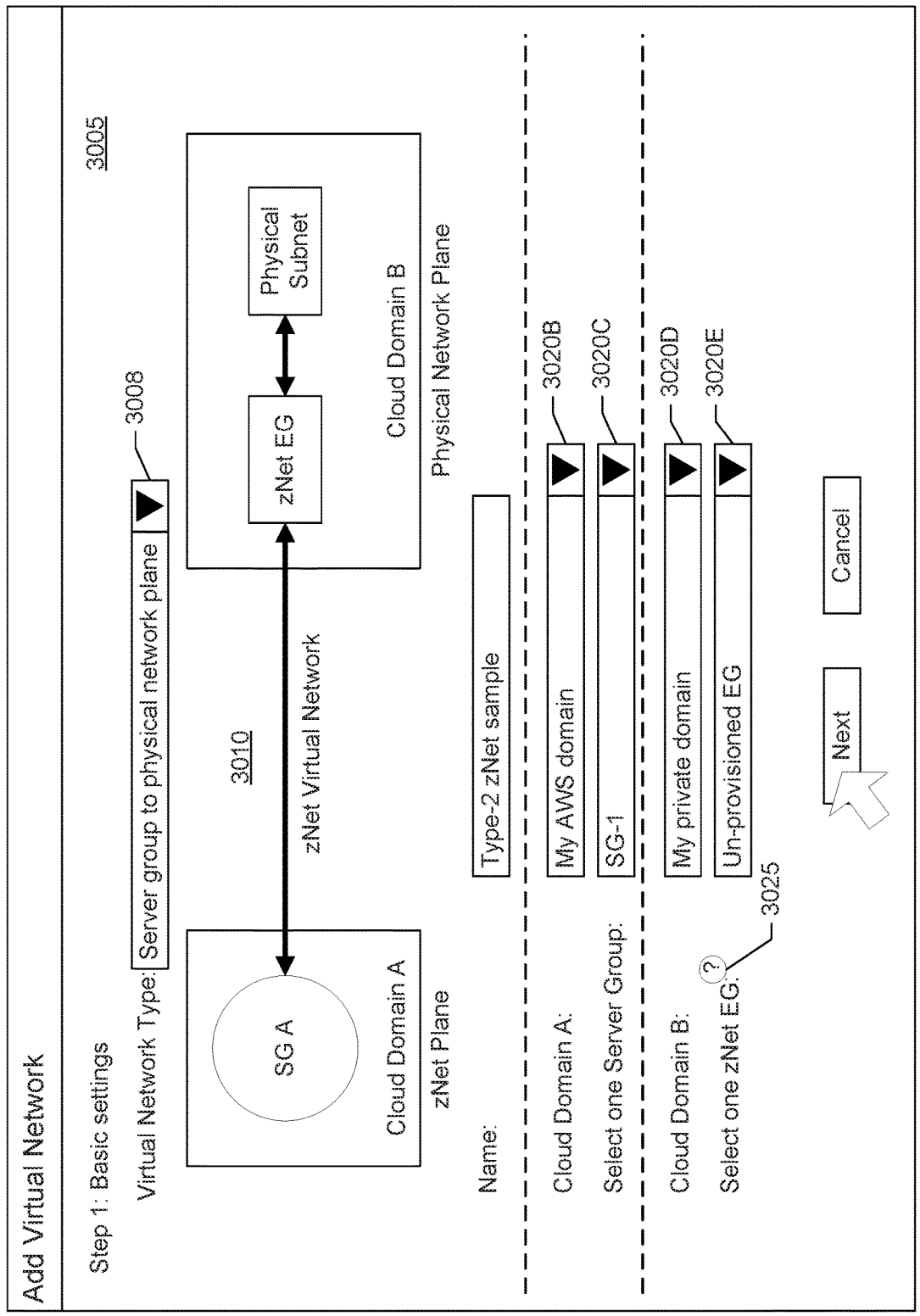
FIG. 30 shows a first dialog box of a wizard for adding a second type of virtual network connection.

FIG. 30 shows a first dialog box 3005 of the wizard. In this example, the user has selected to add a virtual network of the second type (server group to physical network plane) 3008. An image 3010 shows a diagram of the virtual network type to help the user visualize the virtual network that is being created. The diagram shows first domain A as including server group SG-A. The server group is to be connected by the virtual network to a virtual edge gateway provisioned into second domain B and connected to a physical subnet in second domain B.

As shown in the example of FIG. 30, the user has selected as first domain A "My AWS (Amazon Web Services) domain" 3020B and server group SG-1 3020C within the domain to be connected to "My private domain" 3020D in the second domain B. A dropdown menu 3020E allows the user to select a provisioned virtual edge gateway or an unprovisioned virtual edge gateway (i.e., a definition, not a machine instance yet). There can be a help link 3025 that the user can select for an explanation of a virtual edge gateway including a provisioned versus un-provisioned edge gateway.

For example, in some cases a user may not have configured or leased the machine that will host the virtual edge gateway. The system, however, allows the user to continue with the design of the virtual network and provision the gateway at a later time. This helps to accelerate the design and deployment of the virtual network. The system's ability to maintain the definition of a virtual network without any implementation is a desirable capability because it allows implementations or provisioning to be dynamic. Implementations of the virtual infrastructure can therefore be executed and removed any number of times, elastically, reacting to any business needs. The system is flexible in that the definition of the virtual network is decoupled from the instance provisioning.

The virtual infrastructure described in this patent application is an overlay fabric on existing infrastructure. This virtual infrastructure (e.g., implementation of the virtual infrastructure) can be added to another "existing" or "legacy" infrastructure dynamically to implement a "hybrid infrastructure." It can also be removed or decommissioned dynamically. Since it is software-based and is elastic, the "implementation" can be executed and removed many times.

The following are some examples of business scenarios in which the virtual network may be used. These examples illustrate some benefits and advantages of the virtual network. As one of skill in the art would recognize, there are many more examples and scenarios in which the "virtual hybrid infrastructure" technology can be used to reduce cost for industry, accelerate deployment, rapidly adjust to changing business requirements, and improve security.

1) A customer network that is added to an enterprise existing network that allows access and joint development for a specific and critical project or sales. This project only lasts for a short duration (e.g., 6 months) and can repeat intermittently or every now and then.

2) A vender network that is added to an enterprise existing network that allows the specific vendor to access and collaborate with the enterprise (e.g., customer). This virtual network for access is only needed for 6 months due to critical business needs. After that, this network implementation has to be removed due to security controls and concerns. Other vendor networks may be needed and added due to business needs. This particular vendor network may become required at a later time, so it is desirable to maintain the "design," but not the "implementation."

3) A hybrid cloud infrastructure design that a customer of a cloud service provider has designed and owns the control. This hybrid cloud virtual infrastructure design is only "implemented" when the customer has a compute resource capacity need. After the need, the implementation will be removed to save money and reduce costs, and the "design" or "definition" is continuously maintained or stored in the system for future burst needs. In each of these examples, a virtual network, as described in this patent application, is desirable because it can be implemented, decommissioned, and re-implemented very quickly and easily.

Figure 31:
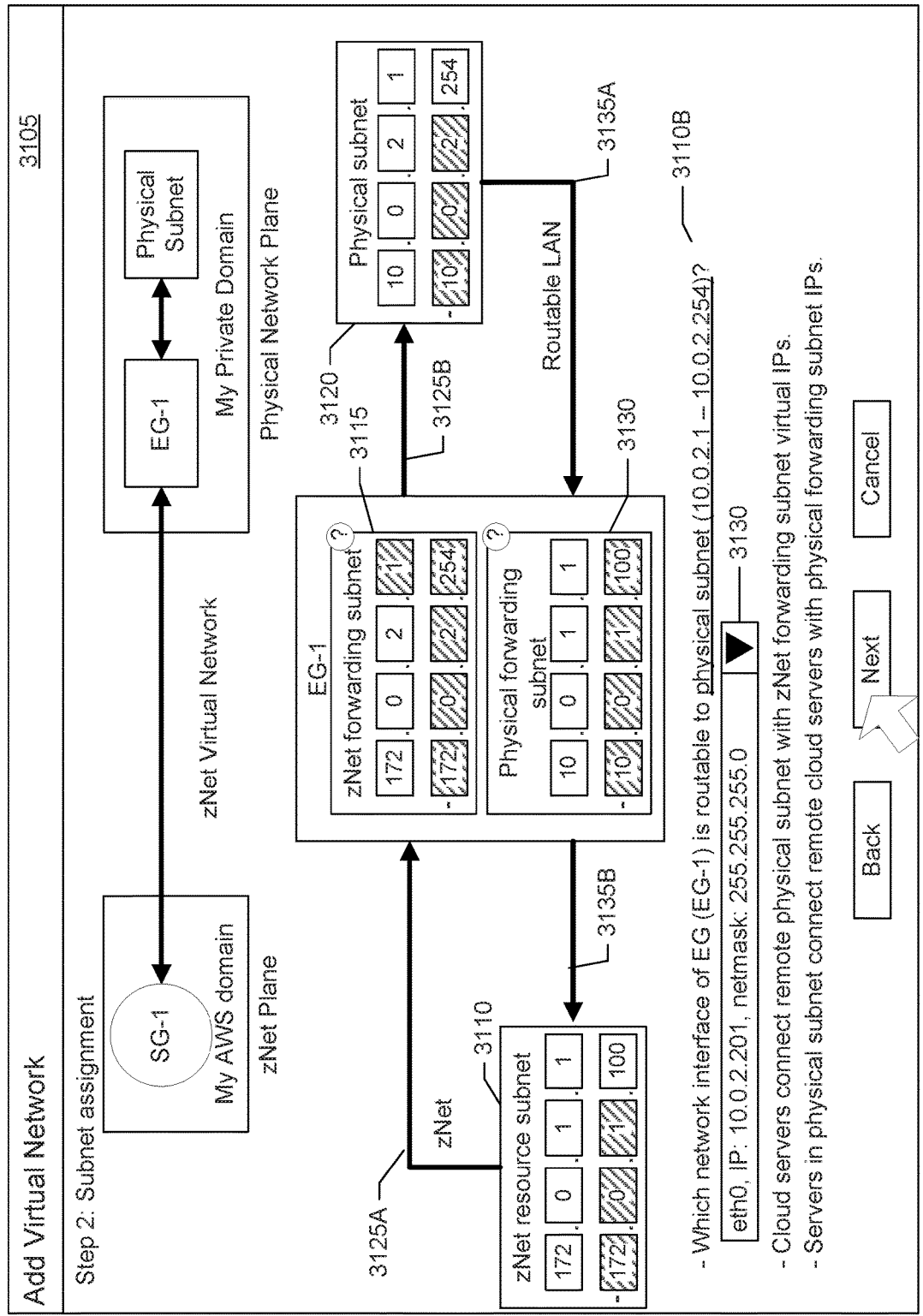
FIG. 31 shows a second dialog box for adding the second type of virtual network connection.
Figure 32:
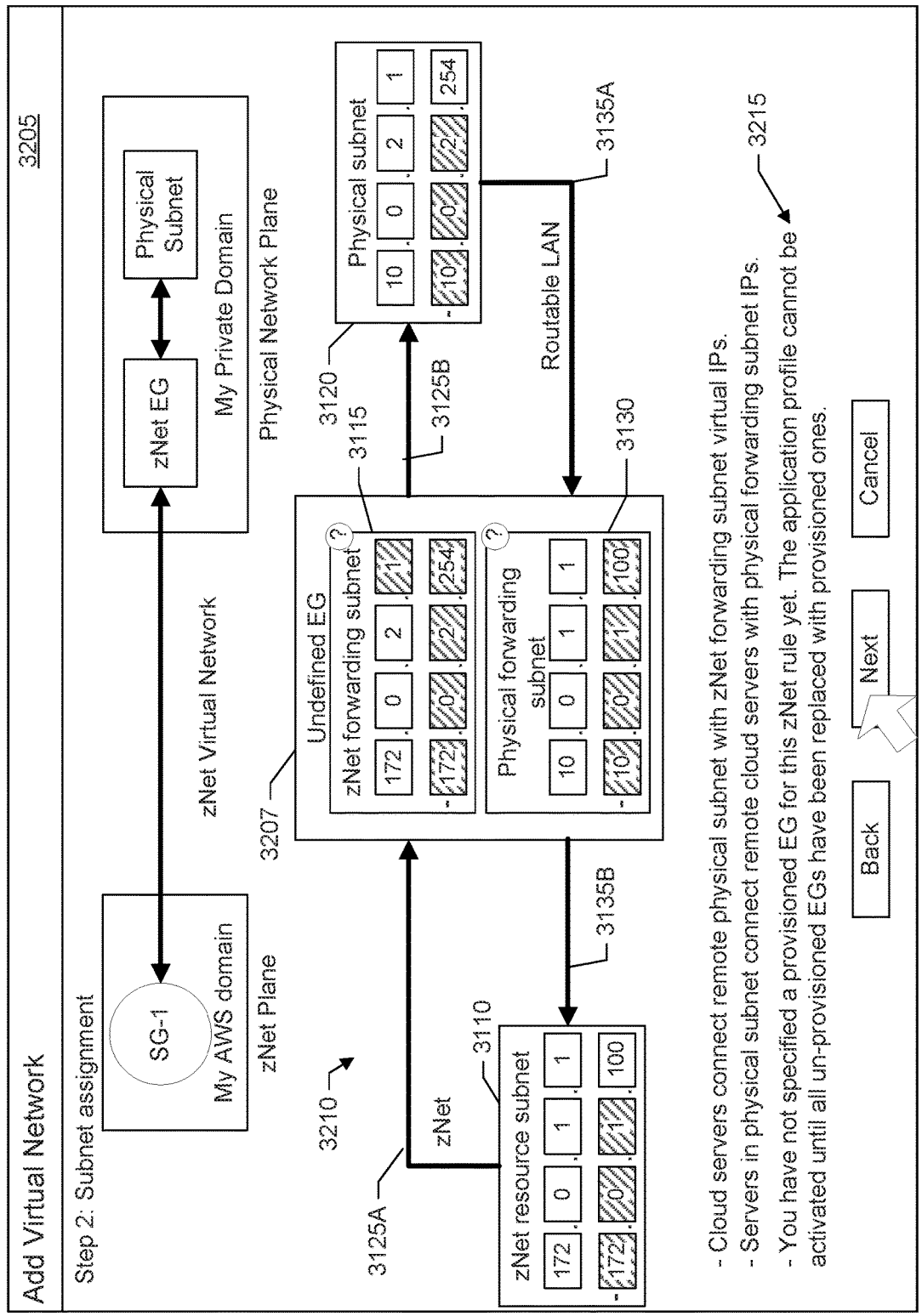
FIG. 32 shows another example of a second dialog box for adding the second type of virtual connection when the virtual edge gateway has not been provisioned.

FIG. 31 shows a second dialog box 3105 for subnet programming when the user selects a provisioned virtual edge gateway. FIG. 32 shows a dialog box when the user selects an unprovisioned virtual edge gateway. As shown in FIG. 31, this example of subnet programming includes specifying a virtual resource subnet 3110 associated with the server group in the first domain, and mapping the virtual resource subnet to a virtual forwarding subnet 3115 representing a physical subnet 3120 in the second domain. As shown by arrows 3125A-B, this mapping allows communications to be sent from the virtual subnet in the first domain to the virtual edge gateway to the physical subnet in the second domain. In this specific embodiment, cloud servers connect remote physical subnets with a forwarding subnet having virtual IPs.

In this specific implementation, the dialog box further includes a dropdown menu 3130. The dropdown menu allows the user to select a network interface of the gateway that is routable to the physical subnet. In this specific implementation, the subnet must be routable because it is in the physical network. To be routable, the network portion of the IP address for the physical forwarding subnet is the same as the network portion of the IP address for the physical subnet. The system can discover in real-time the network interfaces of the specified gateway to populate the menu.

Thus, the subnet programming includes mapping physical subnet 3120 to a physical forwarding subnet 3130, where the physical forwarding subnet represents the virtual resource subnet in the first domain and is routable to the physical resource subnet in the second domain. As shown by arrows 3135A-B, this mapping allows communications to be sent from the physical resource subnet in the second domain to the edge gateway associated with the physical forwarding subnet to the virtual resource subnet in the first domain. In this specific embodiment, servers in a physical subnet connect remote cloud servers with physical forwarding subnet IPs.

FIG. 32 shows an example of a dialog box 3205 where the virtual edge gateway 3207 has not been provisioned, although the subnet definition is completely specified. As shown by subnet programming section 3210, the user is still able to complete a portion of the programming tasks. An alert 3215, however, is displayed informing the user that that the user has not specified a provisioned edge gateway and that the application profile cannot be activated until all un-provisioned edge gateways have been replaced with provisioned gateways.

Figure 33:
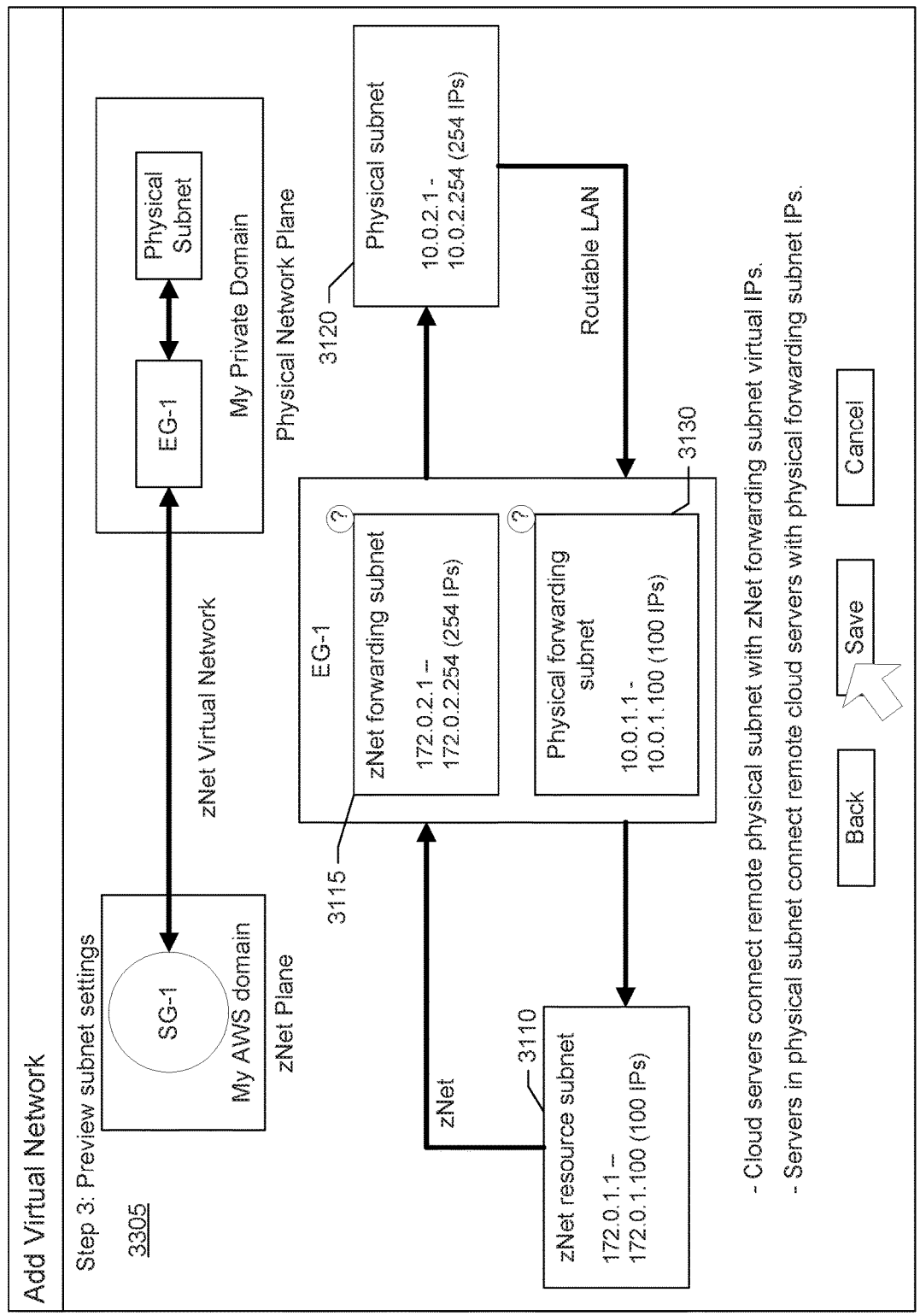
FIG. 33 shows a third dialog box for adding the second type of virtual network connection.

FIG. 33 shows a third dialog box 3305. This dialog box displays a preview of the subnet settings for the type 2 connection (server group to physical network plane). As discussed above, a size of virtual resource subnet 3110 in the first domain can be different (or the same as) a size of physical subnet 3120 in the second domain. In this example, 100 IP addresses are allocated, or reserved for the virtual resource subnet. In the physical subnet, however, there are 254 IP addresses. Virtual forwarding subnet 3115 can act as a bridge or proxy to forward communications from the virtual resource subnet to the physical subnet.

Regarding the reverse direction, physical forwarding subnet 3130 can act as a bridge or proxy to forward communications from the physical subnet to the virtual resource subnet.

Figure 34:
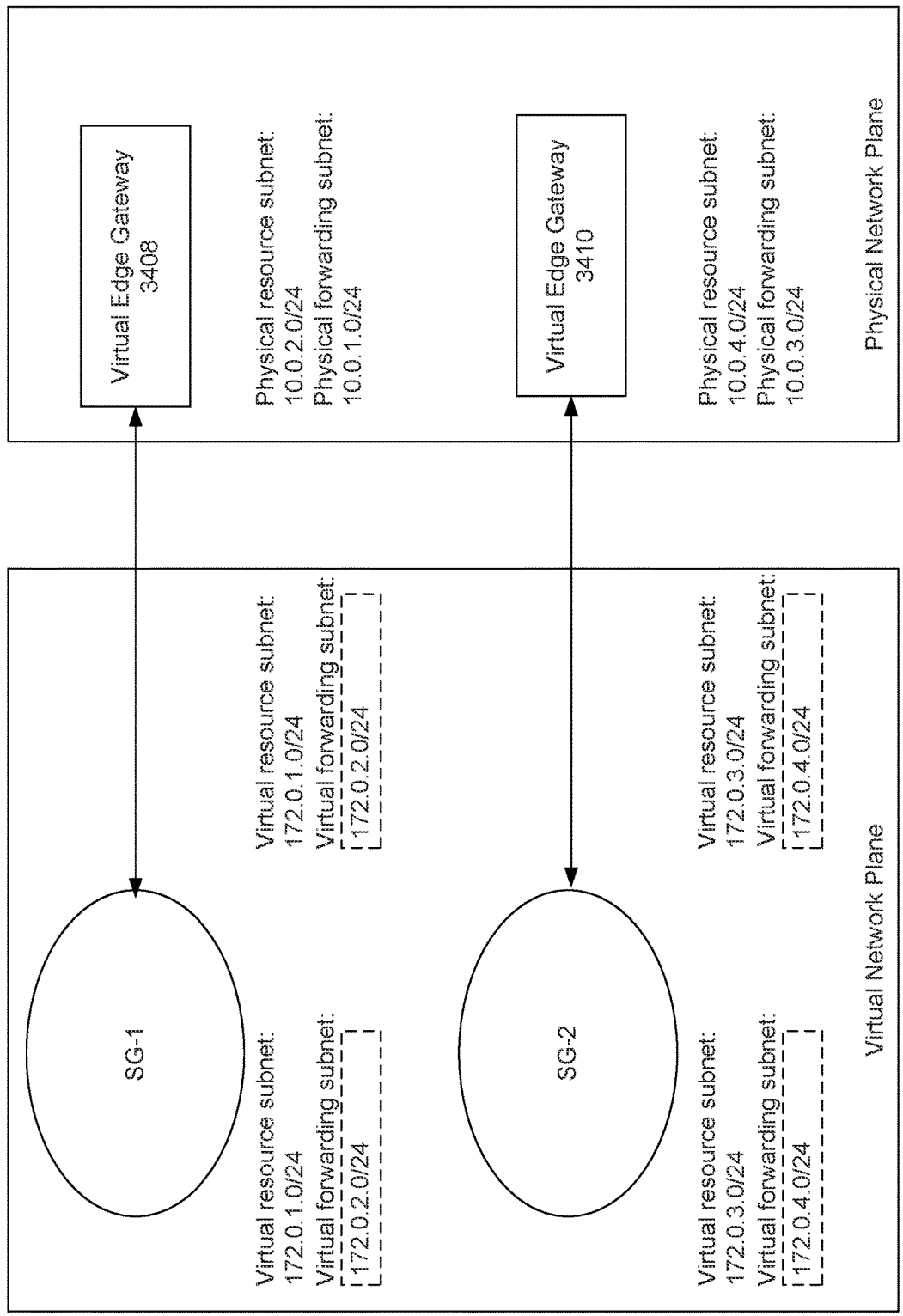
FIG. 34 shows another example of an architecture for the second type of connection.

FIG. 34 shows another specific implementation of a type 2 connection (server group to physical domain. FIG. 34 is similar to FIG. 28. The implementation shown in FIG. 34, however, includes two virtual edge gateways 3408 and 3410. The first edge gateway is responsible for exchanging communications between the first server group and the first physical resource subnet. The second edge gateway is responsible for exchanging communications between the second server group and the second physical resource subnet.

In contrast, the implementation shown in FIG. 28 includes a single virtual edge gateway that is responsible for both exchanging communications between the first server group and the first physical resource subnet, and communications between the second server group and the second physical resource subnet.

Generally, a tradeoff in performance is correlated to the number of edge gateway instances. Increasing the number of edge gateways can allow for a faster exchange of communication between the first and second domains because each gateway manages communication between only one server group and one physical domain. Increasing the number of edge gateways, however, can increase the costs to implement the virtual network because additional machines may need to be leased from a cloud services provider to host the gateways.

Factors to consider in determining the appropriate number of gateways can include the expected network traffic, cost to lease a machine, type of network traffic, and others. For example, if a user does not expect much traffic, the user may provision a single edge gateway that may be responsible for exchanging communication between two or more server groups in a network domain and two or more physical subnets in another network domain. Alternatively, if the user expects that the machines in each domain will be frequently exchanging information, the user can provision two or more edge gateways.

In a specific implementation, determining the number of edge gateways is a manual process where the user estimates their needs. In another specific implementation, the number of edge gateways can be dynamically provisioned. For example, in this specific implementation, the system can include an intelligent module that reviews a number of connections made between the two domains. Based on the number of connections, the system may dynamically increase or decrease the number of edge gateways. Specifically, if many connections are being made, the system may dynamically increase the number of edge gateways to increase network performance. Alternatively, if relatively few connections are being made, the system may dynamically reduce the number of edge gateways to reduce costs.

Figure 35:
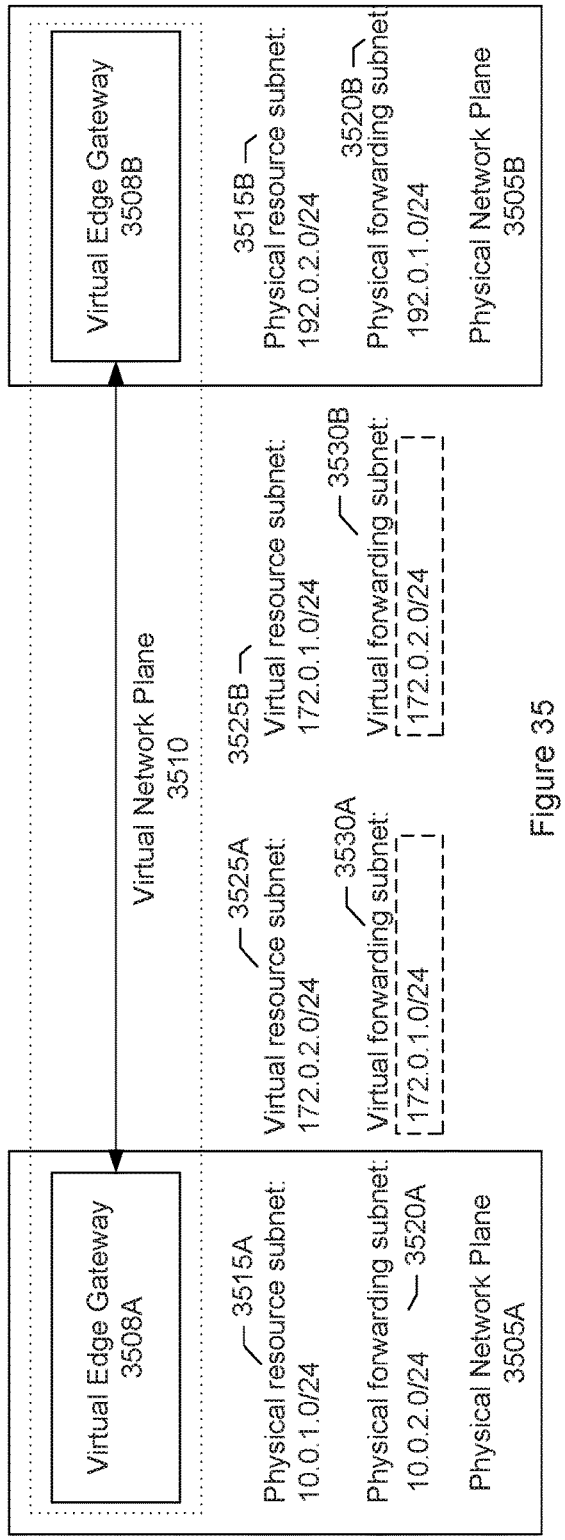
FIG. 35 shows an architecture for a third type of connection involving connecting a physical domain to another physical domain.

FIG. 35 shows a simplified block diagram of a third type of virtual network connection that includes connecting a physical domain to another physical domain. As shown in FIG. 35, there is a first physical network plane 3505A, a second physical network plane 3505B, and a virtual network plane 3510 where first and second virtual edge gateways 3508A and 3508B connect the first and second physical network planes.

The first virtual edge gateway is provided to the first domain and is connected to a first physical resource subnet 3515A (e.g., "10.0.1.0/24"). The second virtual edge gateway is provided to the second domain and is connected to a second physical resource subnet 3515B (e.g., "192.0.2.0/24"). The first edge gateway is associated with a first physical forwarding subnet 3520A (e.g., "10.0.2.0/24"). The first physical forwarding subnet is routable to the first physical resource subnet and represents the second physical resource subnet in the second domain.

Figure 36:
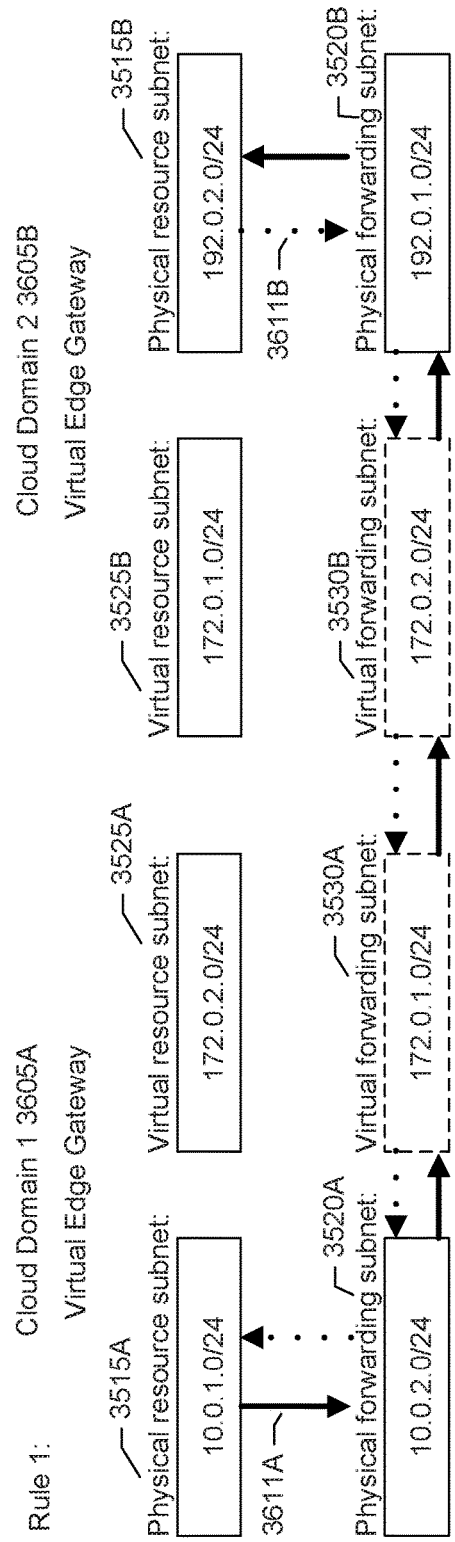
FIG. 36 shows an example for programming the system for the third type of connection.

FIG. 36 shows an example of programming the system based on a type 3 connection. In this example, first and second physical resource subnets 3515A-B have been identified. First physical forwarding subnet 3520A has been selected as the network interface for the first edge gateway routable to the first physical resource subnet. The first physical forwarding subnet is mapped to first virtual forwarding subnet 3530A which translates to second virtual forwarding subnet 3530B which in turn forwards to second physical forwarding subnet 3520B. Thus, a routing path 3611A of a communication from the first to the second physical resource subnet is from first physical resource subnet 3515A to first physical forwarding subnet 3520A, to first virtual forwarding subnet 3530A, across the virtual network to second virtual forwarding subnet 3530B associated with the second virtual edge gateway and having a subnet IP different from first virtual forwarding subnet 3530A of the first virtual edge gateway, to second physical forwarding subnet 3520B, and to second physical resource subnet 3515B.

Referring now to FIG. 35, the programming of subnets to support routing in the reverse direction (e.g., from second to first physical resource subnet) is similar. As shown in FIG. 36, the second virtual edge gateway is associated with second physical resource subnet 3515B, second physical forwarding subnet 3520B, and second virtual forwarding subnet 3530B. The first virtual edge gateway is associated with first physical resource subnet 3515A, first physical forwarding subnet 3520A, and first virtual forwarding subnet 3530A.

More particularly, second physical forwarding subnet 3520B has been selected as the network interface for the second edge gateway routable to the second physical resource subnet. The second physical forwarding subnet is mapped to second virtual forwarding subnet 3530B which translates to first virtual forwarding subnet 3530A which in turn forwards to first physical forwarding subnet 3520A to first physical resource subnet 3515A. Thus, a routing path 3611B of a communication from the second to the first physical resource subnet is from second physical resource subnet 3515B to second physical forwarding subnet 3520B, to second virtual forwarding subnet 3530B, across the virtual network to first virtual forwarding subnet 3530A associated with the first virtual edge gateway and having a subnet IP different from a subnet IP of second virtual forwarding subnet 3530B, to first physical forwarding subnet 3520A, and to first physical resource subnet 3515A.

In a specific implementation, the architecture shown in FIGS. 35-36 can be used to replace a conventional site-to-site VPN that connects two physical networks without having to change any of the local physical network routing or coupling with any under layer network devices. These systems and techniques can be applied to physical subnets behind a complex enterprise network connecting to other physical subnets behind another network domain. In a typical network environment, these physical subnets are protected by firewalls and are not reachable. Connecting the subnets using conventional site-to-site VPN technology in enterprise environments can require enormous efforts. For example, it may require extensive reprogramming and testing of network devices to ensure that there are no IP address conflicts, the purchase of additional networking hardware, and so forth.

In a specific implementation, physical resource subnets are programmable by user. Address values for the physical forwarding subnets are recommended by the system but changeable by the user (if user is to implement a network address translation (NAT) function). Address values for the virtual resource subnets are recommended by system but changeable by the user. Address values for the virtual forwarding subnets are automatically implied and filled by the system as shown by the broken line boxes.

FIGS. 37-40 show specific implementations of a wizard tool for adding a virtual network of the third type (physical network to physical network) 3708. The steps and dialog boxes are similar to those for adding a virtual network of the first type (server group to server group) and shown in FIGS. 25-27. Thus, the following is generally limited to describing the differences.

Figure 37:
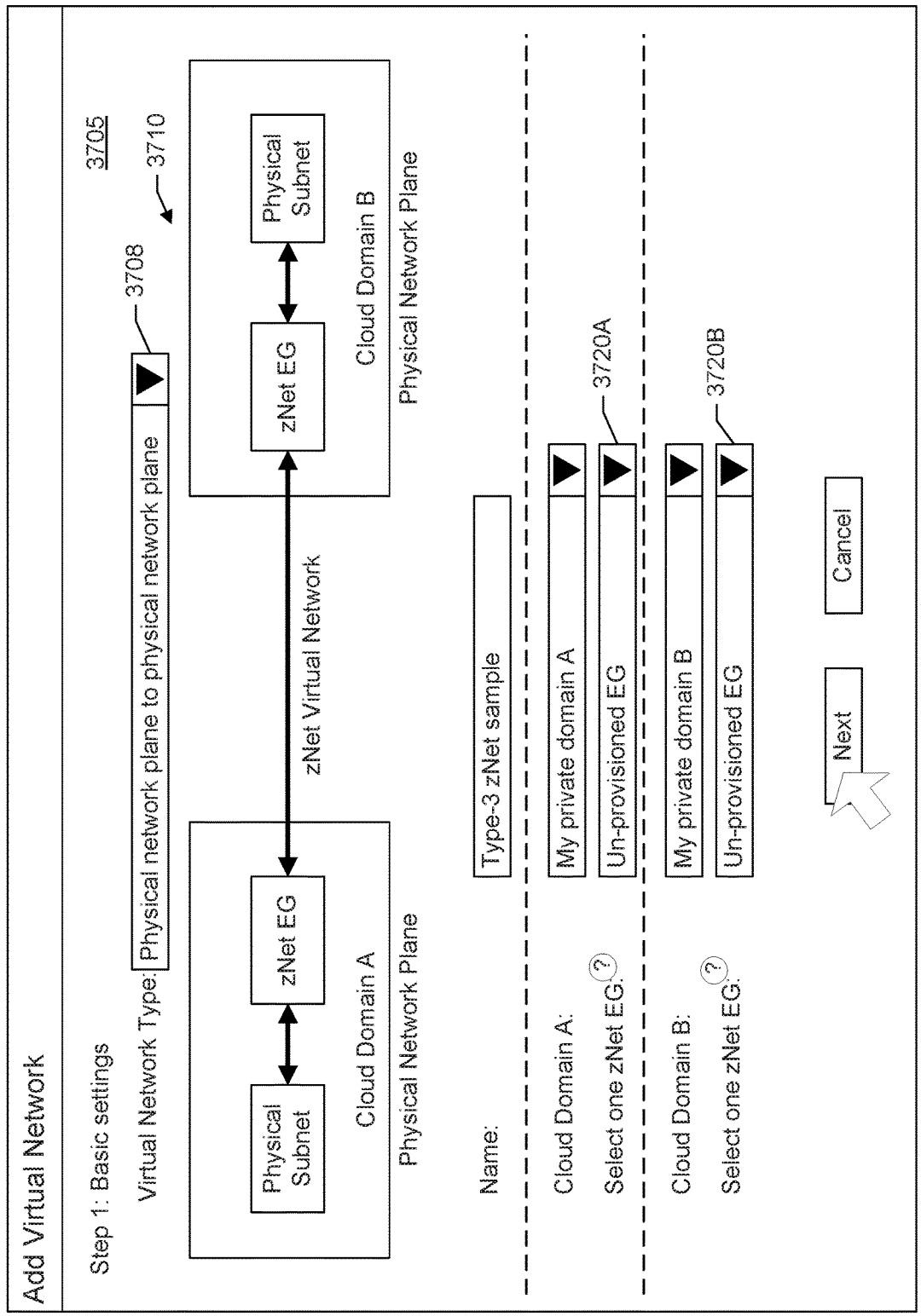
FIG. 37 shows a first dialog box of a wizard for adding a third type of virtual network connection.

FIG. 37 shows a first dialog box 3705 of the wizard. In this example, the user has selected to add a virtual network of the third type (physical network plane to physical network plane) 3708. An image 3710 shows a diagram of the selected virtual network type. The diagram shows first domain A and second domain B. The first domain includes a first physical subnet and a first virtual edge gateway connected to the first physical subnet. The second domain includes a second physical subnet and a second edge gateway connected to the second physical subnet. A virtual network connects the first and second physical subnets via the virtual edge gateways.

As shown in the example of FIG. 37, the user has selected as first domain A "My private domain A" to be connected to a second domain B identified as "My private domain B." As discussed above, in a specific implementation, the virtual network can be used to replace a VPN and save a significant amount of implementation efforts. For example, the first domain may be for the corporate headquarters. The second domain may be a branch office that the corporation as recently acquired. The company can use the virtual network platform to connect the two domains rather than a VPN instantly without changing any of the existing physical network topology or firewall settings in both sites.

Using a VPN which encapsulates packets often requires extensive reconfiguration of the underlying physical network and security rules to ensure physical routing and no IP collisions. The reconfiguration can include and is not limited to subnet design, routing table setting, IP assignment setting, firewall rule setting, reverse NAT (Network Address Translation) insertion along with multiple firewall systems, etc., and many of these configurations can be correlated and intertwined. The virtual network, as an overlay network however, can be implemented as an add-on layer without touching the lower layer network fabric and with more flexibility in the IP assignment in the virtual layer, and therefore has much less disruption. Packets in the virtual network may be unencapsulated. Furthermore, a VPN implementation typically requires a physical hardware device that must be part of the physical network design. It can be difficult to make changes to the physical network design. The virtual network platform as discussed in this patent application reduces the need to make changes to the physical network design as it is an add-on overlay network.

Since the virtual network is an add-on, overlay network, there is much less coupling with the physical network. The virtual network uses the physical network as the "forwarding fabric" to "forward" packets. In contrast, VPN is a "connection" network. It connects two physical networks together, and therefore it is high-touch. When the two networks are segregated and protected by different enterprise grade security infrastructure implementations, building a VPN connection to connect the domains can be very complex and challenging. A VPN implementation frequently triggers intensive multi-level operational review and approval, as it typically involves the business line IT, corporate IT, security team, corporate auditing, and corporate legal to work together to review and approve the process. The virtual network simplifies the design of the network by "adding on" to the existing physical network, rather than "changing" the existing physical network. It can also significantly reduce the review and approval process, as it has much less coupling with the corporate legacy infrastructure and operations.

Dropdown menus 3720A-B allow the user to select provisioned or unprovisioned virtual edge gateways. As discussed above, in some cases a user may not have configured or leased the machine that will host the virtual edge gateway. The system, however, allows the user to continue with the design of the virtual network and provision the gateway at a later time. This helps to speed up and replicate the deployment of the virtual network dynamically.

More particularly, a provisioned virtual edge gateway (EG) is typically implemented by a VM as a virtual appliance, which has its physical IP address, physical network card, limits on 10 G port, 1 G port, etc. When an IT administrator wants to replicate the design of this virtual network to another network location, this kind of VM with this specific hardware limitation and properties may not be matched easily. Thus, the system addresses this problem by allowing implementation of the EG with another VM or server at the new network location.

Consider, as an example a merger and acquisition (M&A) that results in new locations. If there is a design similar to the one shown in FIG. 37 along with the application profile stored in the system, the IT administrator can then easily replicate this design from one remote site to model other remote sites resulting from the M&A. The changes can be limited to the virtual network subnets in FIG. 38. This capability allows a much faster design in an M&A case.

Another example can be a second business line that requires the same hybrid cloud implementation as shown in FIG. 28, but is implemented in a different subnet environment in the same enterprise. The IT administrator can immediately replicate the same virtual cloud fabric design in the second subnet environment and implement the edge gateway with a different VM.

Figure 38:
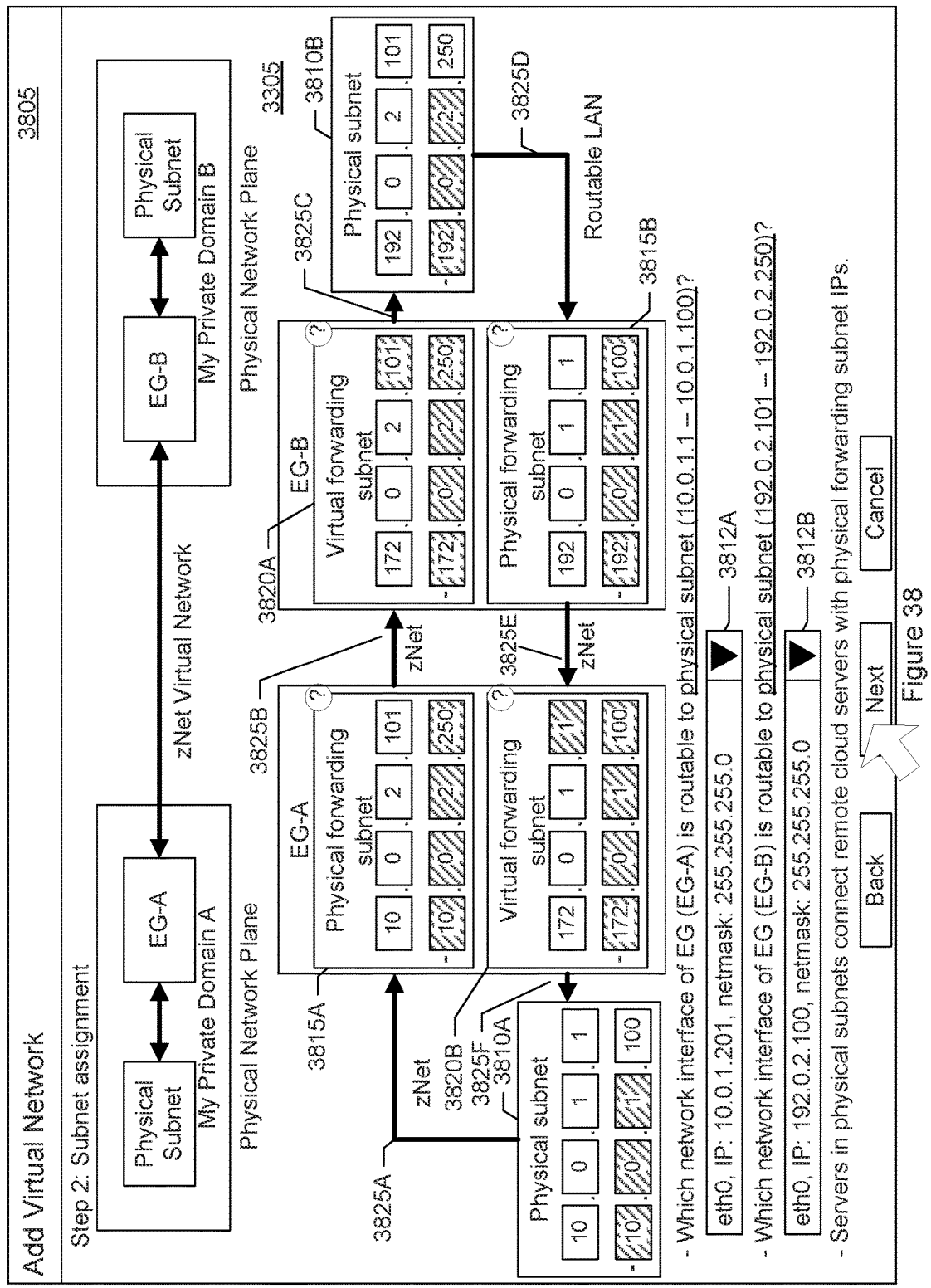
FIG. 38 shows a second dialog box for adding the third type of virtual network connection.
Figure 39:
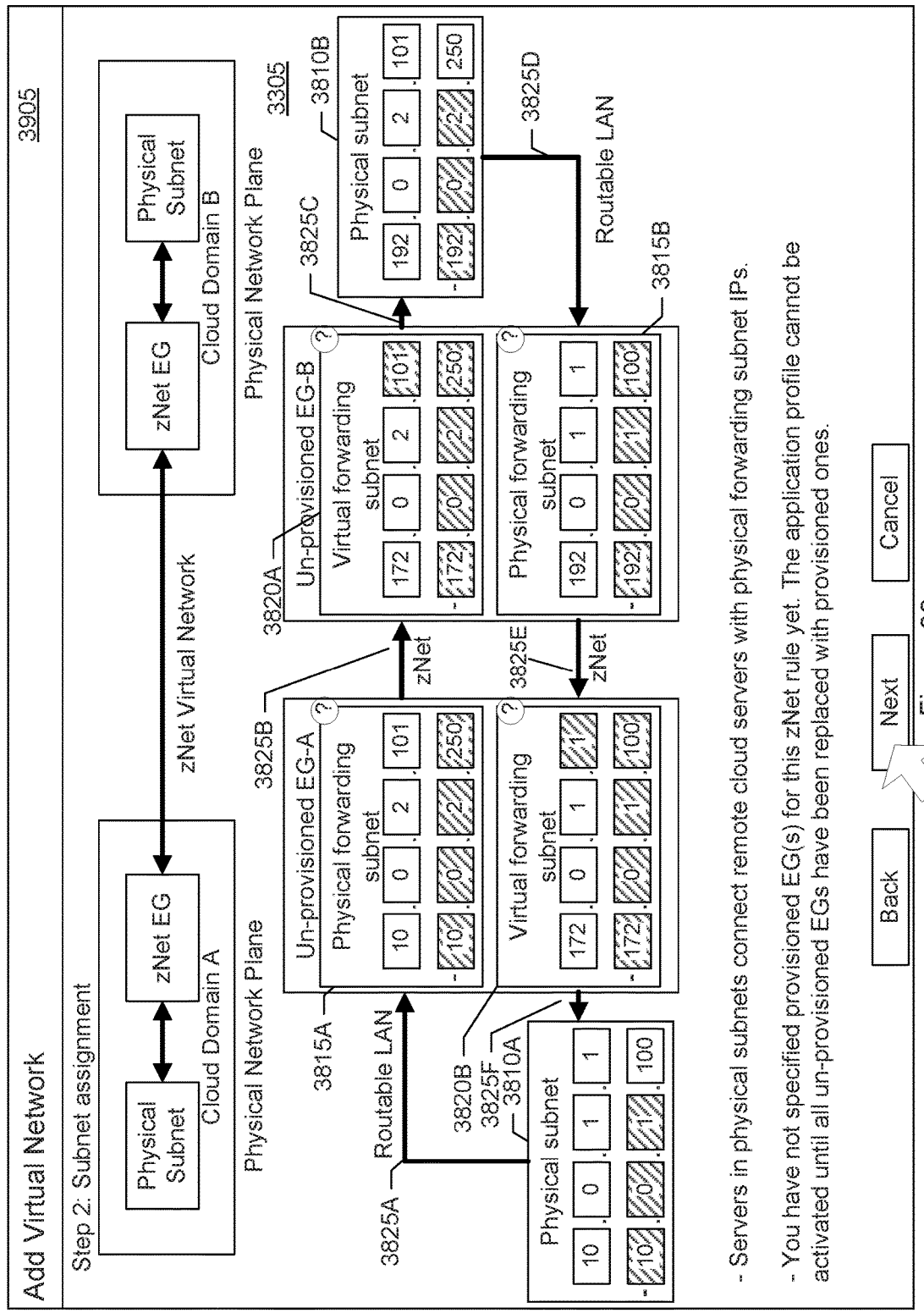
FIG. 39 shows another example of a second dialog box for adding the third type of virtual network connection when the virtual edge gateway has not been provisioned.

FIG. 38 shows a second dialog box 3805 for subnet programming when the user selects a provisioned virtual edge gateway. FIG. 38 shows an interface that an administrator can use to define how a group of addresses in a first group will map to a second group of addresses in a remote domain, where each IP address in the first group is connecting to another one IP address in the second group, following the address forwarding tables defined in FIG. 11C. FIG. 39 shows a dialog box when the user selects an unprovisioned virtual edge gateway.

As shown in FIG. 38, subnet programming includes identifying a first physical subnet 3810A in the first domain, and identifying a second physical subnet 3810B in the second domain. The virtual edge gateways are configured, associated with, or assigned forwarding subnets to forward communications between the two physical subnets. Servers in physical subnets connect remote servers with physical forwarding subnet IPs.

More particularly, to configure the first virtual edge gateway, the user is prompted 3812A to select a network interface that is routable to the first physical subnet. In this example, the user has selected a first physical forwarding subnet 3815A which as shown by the sample network address is routable to the first physical subnet. The first physical forwarding subnet represents or corresponds to the second physical subnet.

The second virtual edge gateway is associated with a second virtual forwarding subnet 3820A to translate between the first physical forwarding subnet and the second physical subnet. Arrows 3825A-C show a routing or forwarding path. A path is from the first physical subnet to the first virtual edge gateway associated with the first physical forwarding subnet to the second virtual edge gateway associated with the second virtual forwarding subnet to the second physical subnet.

As an example, consider FIGS. 11C and 36 in which client 1175A (FIG. 11C) is behind the first virtual edge gateway and wishes to connect with application server 1175B which is behind the second virtual edge gateway. Client 1175A is in the first physical subnet of the first domain. Server 1175B is in the second physical subnet of the second domain, different from the first domain. Client 1175A is assigned an IP address within the first physical subnet.

For example, the first physical subnet may be 10.0.1.0/24 (abbreviated as "10.0.1") and client 1175A may have the IP "10.0.1.A." The second physical subnet may be "192.0.2." A request to connect to the application server (e.g., app-server-IP) at 192.0.2 subnet is routed to an address (e.g., Ipa1) in the first physical forwarding subnet 10.0.2 (e.g., Ipa1 as 10.0.2.107). The first static routing table for the proposed virtual network platform is consulted to determine whether an IP address of the application server is listed. In this example, the first physical forwarding subnet 10.0.2 (including Ipa1) is listed and it is assumed that permission to use the virtual network is granted.

The entries in the routing table specify the forwarding, mapping, or translations. Table M below shows sample IP values for the first entry including source physical IP (Ipa1), source virtual IP (vIpa1), destination virtual IP (vIPb1), destination physical IP (IPb1), and the application server IP (app-server-IP). Note that the designation of the "source" and "destination" in this example is based on or relative to the first virtual network gateway 1180A. When the packets are forwarded through the virtual network platform system, the designation of "source" and "destination" can change from stage to stage, respectively, along the forwarding path.

TABLE M

| Source physical IP | Source virtual IP | Destination virtual IP | Destination physical IP | Application Server IP |
|---|---|---|---|---|
| IPa1 (10.0.2.107) | vIPa1 (172.0.1.A) | vIPb1 (172.0.2.107) | IPb1 (192.0.1.A) | app-server-IP (192.0.2.107) |

Referring now to FIG. 36, in a specific embodiment, the virtual network uses a technique referred to as IP forwarding. In this example, connecting from the source machine (e.g., client 1175A) to the destination machine (e.g., server 1175B) includes four stages. Each stage includes a source IP and destination IP. It should be appreciated that this example of connecting a subnet in one domain to another subnet in a different domain is merely one example of a network connection provided by the virtual network. All machines in such a subnet may connect as follows.

A first stage includes the client machine in the first physical subnet forwarding a packet to a destination in the first physical forwarding subnet associated with the first virtual edge gateway. The first physical forwarding subnet and the first physical subnet are in the first network domain. The first physical forwarding subnet is routable to the first physical subnet via the underlying TCP/IP network. In other words, the packet from the first physical subnet is received at the first physical forwarding subnet.

In this example, client 1175A having IP address "10.0.1.A" in first physical resource subnet 3515A ("10.0.1") sends to destination Ipa1 ("10.0.2.107") which is in first physical forwarding subnet 3520A. Thus, for stage 1, the source IP is "10.0.1.A" and the destination IP is Ipa1 ("10.0.2.107"), where Ipa1 is bound to the first virtual edge gateway (EG-A). The local TCP/IP network will be responsible for routing this connection.

A second stage includes two forwarding actions. A first forwarding includes on the first virtual edge gateway (EG-A) forwarding from first physical forwarding subnet 3520A to first virtual forwarding subnet 3530A.

In this example, the first forwarding is from Ipa1 ("10.0.2.107") in the first physical forwarding subnet to a destination vIpa1 ("172.0.1.A") in the first virtual forwarding subnet, where vIpa1 is bound to EG-A. The virtual device on EG-A will route this connection. Thus, the source IP is Ipa1 ("10.0.2.107") and the destination IP is vIpa1 ("172.0.1.A").

A second forwarding in the second stage includes forwarding from first virtual forwarding subnet 3530A of the first virtual edge gateway (EG-A) across the virtual network to second virtual forwarding subnet 3530B of the second virtual edge gateway (EG-B).

In this example, the second forwarding is from vIpa1 ("172.0.1.A") to destination IP vIPb1 ("172.0.2.107"), where vIPb1 is bound to EG-B. The virtual network switch (VNS1 820 shown in FIG. 11C) will route this connection. Thus, the source IP is vIpa1 ("172.0.1.A") and the destination IP is vIPb1 ("172.0.2.107").

A third stage includes two forwarding actions. A first forwarding of the third stage includes on the second virtual edge gateway (EG-B) forwarding from second virtual forwarding subnet 3530B to second physical forwarding subnet 3520B associated with the second virtual edge gateway.

In this example, the first forwarding is from vIPb1 ("172.0.2.107") in the second virtual forwarding subnet to a destination IPb1 ("192.0.1.A"), where IPb1 is bound to EG-B. The virtual device on EG-B will route this connection. Thus, the source is vIPb1 ("172.0.2.107") and the destination is IPb1 ("192.0.1.A").

A second forwarding of the third stage includes forwarding from second physical forwarding subnet 3520B to second physical resource subnet 3515B.

In this example, the second forwarding is from IPb1 ("192.0.1.A") in the second physical forwarding subnet to a destination IP app-server-IP (e.g. "192.0.2.107"). The local TCP/IP network will route this connection. Thus, the source is IPb1 ("192.0.1.A") and the destination is app-server-IP ("192.0.2.107").

A fourth stage includes the destination in the second physical resource subnet receiving the packet. In other words, in this example, server 1175B having the IP "app-server-IP" (e.g., "192.0.2.107") receives the packet. The reverse connection uses a similar technique.

In a specific embodiment, the subnet to subnet mapping follows a consecutive, sequential or linear mapping. For example, referring now to FIG. 22, first forwarding subnet 2220A can be representative of the first physical forwarding subnet (e.g., "10.0.2") and the second virtual forwarding subnet (e.g., "172.0.2"). Second forwarding subnet 2220B can be representative of the second physical forwarding subnet (e.g., "192.0.1") and the first virtual forwarding subnet (e.g., "172.0.1"). Consider, as an example, that a source machine having an IP address "10.0.1.5" in the first domain is connecting to a destination machine having an IP address "192.0.2.107" in the second domain. In this specific embodiment, all subnet addresses map to each other following numbered sequences. In this specific embodiment, the mapping is a linear mapping.

In the example above, the linear mapping forces that the source machine having the IP address "10.0.1.5" (the fifth position in 10.0.1.1/16 subnet, e.g., first physical resource subnet) maps to the fifth position in the 172.0.1.1/16 subnet (e.g., first virtual forwarding subnet) and the fifth position in the 192.0.1.1/16 subnet (e.g., second physical forwarding subnet). Likewise, the linear mapping forces that the destination machine having the IP address "192.0.2.107" (the hundred and seventh position in 192.0.2.1/24 subnet, e.g., second physical resource subnet) maps to the hundred and seventh position in 172.0.2.1/24 subnet (e.g., second virtual forwarding subnet) and 10.0.2.1/24 subnet (e.g., first physical forwarding subnet).

To further extend the concept, the condition for a subnet can be extended and referred to as a group of IP addresses or ordered IP addresses. Under the linear mapping, the linear position in a subnet (e.g., the fifth position in 10.0.1.1/16 subnet, which is 10.0.1.5) is equivalent to the linear position in an IP address group (e.g., the fifth position in the IP address group (10.0.1.1 to 10.0.255.255, total 65,279 IP addresses) is 10.0.1.5). In the IP forwarding virtual network platform discussed in this application, the definition of a subnet can be considered as a group of IP addresses that are listed in a specified order or specific sequence. The linear mapping applies to the orders or positions between IP address groups (i.e., the subnet definitions).

In a specific embodiment, the second physical resource subnet includes a first set of IP addresses, and the destination machine has a destination IP address (e.g., "192.0.2.107") included in the first set of IP addresses. The second virtual forwarding subnet includes a second set of IP addresses. The first physical forwarding subnet includes a third set of IP addresses. The destination IP address has a corresponding IP address in the second set of IP addresses, and a corresponding IP address in the third set of IP addresses. A position of the destination IP address in the first set of IP addresses matches a position of the corresponding IP address in the second set of IP addresses, and matches a position of the corresponding IP address in the third set of IP addresses.

In another specific embodiment, the first physical resource subnet includes a fourth set of IP addresses, and the source machine has a source IP address (e.g., "10.0.1.5") included in the fourth set of IP addresses. The first virtual forwarding subnet includes a fifth set of IP addresses. The second physical forwarding subnet includes a sixth set of IP addresses. The source IP address has a corresponding IP address in the fifth set of IP addresses, and a corresponding IP address in the sixth set of IP addresses. A position of the source IP address in the fourth set of IP addresses matches a position of the corresponding IP address in the fifth set of IP addresses, and matches a position of the corresponding IP address in the sixth set of IP addresses. In another specific embodiment, the subnet to subnet mapping may be non-linear.

Referring to FIG. 22, the linear mapping between the related IP address groups (also the subnets) implies the same size for these groups. FIG. 22 presents a forward mapping and a reverse mapping. The size for one direction has to be consistent. The size for one direction does not necessarily correlate with the size in the other direction. In the example on FIG. 36, the sizes for IP address groups for the first physical resource subnet, first virtual forwarding subnet, and the second physical forwarding subnet are the same. A number of IP addresses in the first physical resource subnet, first virtual forwarding subnet, and the second physical forwarding subnet are the same. The sizes for IP address groups for the second physical resource subnet, the second virtual forwarding subnet, and the first physical forwarding subnet are the same. A number of IP addresses in the second physical resource subnet, the second virtual forwarding subnet, and the first physical forwarding subnet are the same.

A similar programming process is performed for the reverse direction, i.e., from the second to the first domain. More particularly, referring now to FIG. 38, to configure the second gateway, the user is prompted 3812B to select a network interface that is routable to the second physical subnet. In this example the user has selected a second physical forwarding subnet 3815B which as shown by the sample network address is routable to the second physical subnet. The second physical forwarding subnet represents or corresponds to the first physical subnet.

The first edge gateway is associated with a first virtual forwarding subnet 3820B and a first physical forwarding subnet 3815A. The second edge gateway is associated with a second virtual forwarding subnet and a second physical forwarding subnet 3815B. Arrows 3825D-F show a routing or forwarding path. A path is from the second physical subnet to the second edge gateway associated with the second physical forwarding subnet and second virtual forwarding subnet to the first edge gateway associated with the first virtual forwarding subnet and the first physical forwarding subnet to the first physical subnet.

FIG. 39 shows an example of a dialog box 3905 when an edge gateway has not been provisioned. The dialog box is similar to the dialog box shown in FIG. 32 and described in the discussion accompanying FIG. 32. As discussed above, the system allows the user to continue with portions of the subnet programming without having to provision the virtual gateways. That is, the gateways can be provisioned after the subnet programming.

Figure 40:
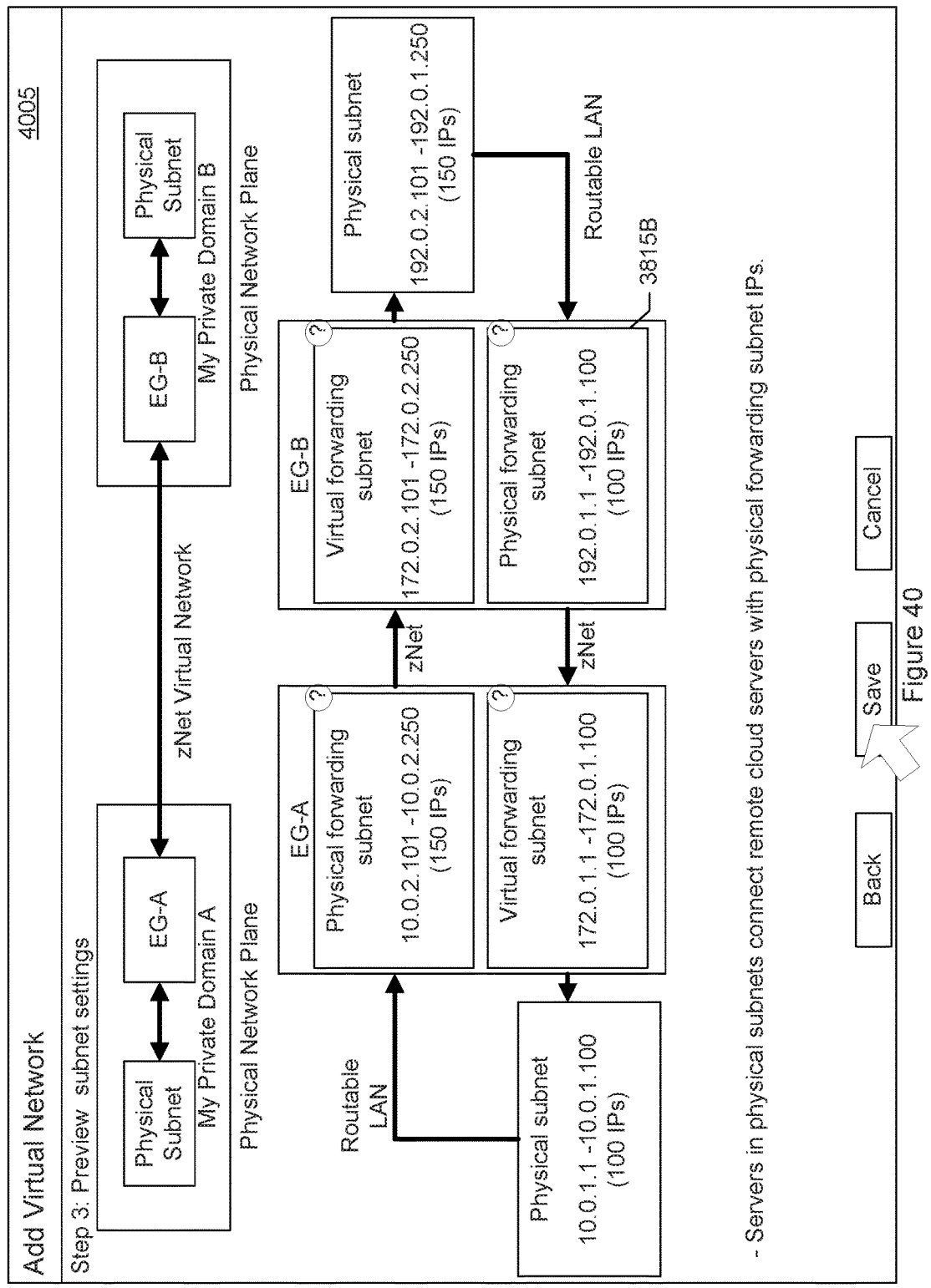
FIG. 40 shows a third dialog box for adding the third type of virtual network connection.

FIG. 40 shows a third dialog box 4005. This dialog box displays a preview of the subnet settings for the type 3 connection (physical network plane to physical network plane). Sizes of the first and second physical subnet can be the same or different. In this example, the first physical subnet includes 100 IP addresses. The second physical subnet includes 150 IP addresses. The forwarding subnets correspond to the remote destination that a communication is to be forwarded. Thus, the first physical and first virtual forwarding subnets have been assigned 150 IP addresses because these subnets forward to the second physical subnet. Conversely, the second physical and second virtual forwarding subnets have been assigned 100 IP addresses because these subnets forward to the first physical subnet.

In a specific implementation, if the user programs a virtual forwarding subnet that has collision with low level physical network, the virtual network takes a higher priority than the local network routing in an end point device. If the user programs a virtual forwarding subnet that does not match with the virtual forwarding subnet programmed on the virtual enterprise gateway (EG), the virtual EG will not forward the packets properly. An error message may be generated to alert the user. "Automated" in type-1 virtual forwarding subnet programming refers to the system automatically calculating all the forwarding IP addresses from the server group (SG). The system will also program these forwarding IP addresses in the virtual address table at the local VM. Instead of programming a physical subnet, a user can program a single IP address on the virtual EG to represent an application server device in the physical domain. The corresponding forwarding subnet should then be programmed with one IP address instead of a subnet. In a specific implementation, the system can allow the user to program more than one individual IP addresses, instead of a subnet, for the consideration of virtual network connection and forwarding. That is, rather than programming a subnet, a user may program any number of individual IP addresses.

In the description above, aspects of the system have been described in the context of a client in one network domain communicating with a server in another network domain. It should be appreciated, however, that aspects of the system can also be applied to the server communicating with the client. Aspects of the system can be applied to a computing node in one network domain communicating with a computing node in another network domain, and vice-versa.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for using a wide area network (WAN) virtual network platform to connect first and second network domains that are physically segregated from each other by firewalls and managed by different network administration parties comprising:

prompting a user to select a first server group within the first network domain, the first server group being associated with a first virtual subnet;

prompting the user to select a second server group within the second network domain, remote from the first network domain;

mapping the first virtual subnet of the first server group to a first virtual forwarding subnet representing the second server group; and forwarding a first communication from the first network domain to the second network domain, wherein a forwarding path of the first communication is from the first server group to the first virtual forwarding subnet, through the WAN virtual network platform, and to the second server group, and wherein the forwarding a first communication comprises:

creating at a first end point in the first server group of the first network domain a first dynamic routing table having first routing information, the first routing information comprising a first identifier that identifies a virtual network connection over which the first communication will be forwarded; and transmitting the first routing information to a virtual network switch between the first and second network domains, wherein the virtual network switch consults a second dynamic routing table having second routing information, the second routing information comprising a second identifier, wherein when the second identifier matches the first identifier, the virtual network switch transmits the first communication to the second network domain according to the second routing information.

2. The method of claim 1 wherein the second server group is associated with a second virtual subnet, and the method comprises:

mapping the second virtual subnet of the second server group to a second virtual forwarding subnet representing the first server group; and forwarding a second communication from the second network domain to the first network domain, wherein a forwarding path of the second communication is from the second server group to the second virtual forwarding subnet, through the WAN virtual network platform, and to the first server group.

3. The method of claim 2 wherein a size of the second virtual forwarding subnet is the same as a size of the first virtual subnet.

4. The method of claim 2 wherein a size of the first virtual forwarding subnet is the same as a size of the second virtual subnet.

5. The method of claim 1 wherein the forwarding a first communication comprises:

receiving a request to transmit the first communication to a destination;

determining that an Internet Protocol (IP) address of the destination is within a range of IP addresses defined by the first virtual forwarding subnet representing the second server group;

after the determination, seeking permission to use the WAN virtual network platform connecting the first and second network domains; and receiving permission to use the WAN virtual network platform.

6. The method of claim 1 wherein the first and second network domains are connected by the Internet.

* * * * *